United States Patent
Wang et al.

(10) Patent No.: US 9,864,103 B2
(45) Date of Patent: *Jan. 9, 2018

(54) PHOSPHINE-CONTAINING HYDROGEL CONTACT LENSES

(71) Applicant: CooperVision International Holding Company, LP, St. Michael (BB)

(72) Inventors: Guigui Wang, Livermore, CA (US); Yun Zhang, Dublin, CA (US); Yuwen Liu, Dublin, CA (US); Ye Hong, Pleasanton, CA (US); Charlie Chen, San Ramon, CA (US); Peter Zhu, Cupertino, CA (US)

(73) Assignee: CooperVision International Holding Company, LP, St. Michael (BB)

(*) Notice: Subject to any disclaimer, the term of this patent is extended or adjusted under 35 U.S.C. 154(b) by 649 days.

This patent is subject to a terminal disclaimer.

(21) Appl. No.: 14/158,879

(22) Filed: Jan. 20, 2014

(65) Prior Publication Data

US 2014/0131227 A1    May 15, 2014

Related U.S. Application Data

(63) Continuation of application No. 13/404,028, filed on Feb. 24, 2012, now Pat. No. 8,642,677.
(Continued)

(51) Int. Cl.
  *G02B 1/04* (2006.01)
  *A45C 11/00* (2006.01)
  *B65D 81/22* (2006.01)

(52) U.S. Cl.
  CPC ............ *G02B 1/043* (2013.01); *A45C 11/005* (2013.01); *B65D 81/22* (2013.01)

(58) Field of Classification Search
  None
  See application file for complete search history.

(56) References Cited

U.S. PATENT DOCUMENTS

| 2,393,266 A | 1/1946 | Riddell |
| 2,989,894 A | 6/1961 | Gordon |

(Continued)

FOREIGN PATENT DOCUMENTS

| CN | 1212630 A | 3/1999 |
| CN | 1351629 A | 5/2002 |

(Continued)

OTHER PUBLICATIONS

Two Photon absorption spectrum of the photoinitiator Lucirin TPO L, Mendonca et al., Appl. Phys. A 90. 633-636 (2008).*

(Continued)

*Primary Examiner* — Peter A Salamon
(74) *Attorney, Agent, or Firm* — Kilyk & Bowersox, P.L.L.C.

(57) ABSTRACT

Hydrogel contact lenses that are derived from a polymerizable composition including at least one hydrophilic monomer and at least one phosphine-containing component are described. The hydrogel of the contact lenses can be a silicone hydrogel or a non-silicone hydrogel. Use of polymerizable compositions comprising a phosphine-containing component can be cured under both inert and air atmospheres, and can be used to form hydrogel contact lenses having improved shape retention properties, having improved resistance to discoloration. Batches of hydrogel contact lenses and methods of making hydrogel contact lenses are also described.

30 Claims, 3 Drawing Sheets

Related U.S. Application Data

(60) Provisional application No. 61/447,152, filed on Feb. 28, 2011.

(56) References Cited

U.S. PATENT DOCUMENTS

| | | | | |
|---|---|---|---|---|
| 3,079,311 | A | 2/1963 | Hettinger, Jr. | |
| 3,228,741 | A | 1/1966 | Becker | |
| 3,246,941 | A | 4/1966 | Moss | |
| 3,431,046 | A | 3/1969 | Conrad et al. | |
| 3,594,074 | A | 7/1971 | Rosen | |
| 3,808,178 | A | 4/1974 | Gaylord | |
| 3,907,851 | A | 9/1975 | Boersma et al. | |
| 4,038,264 | A | 7/1977 | Rostoker et al. | |
| 4,099,859 | A | 7/1978 | Merrill | |
| 4,113,839 | A | 9/1978 | Maki et al. | |
| 4,120,570 | A | 10/1978 | Gaylord | |
| 4,121,896 | A | 10/1978 | Shepherd | |
| 4,136,250 | A | 1/1979 | Mueller et al. | |
| 4,150,058 | A | 4/1979 | Hestermann et al. | |
| 4,153,641 | A | 5/1979 | Deichert et al. | |
| 4,166,088 | A | 8/1979 | Neefe | |
| 4,168,112 | A | 9/1979 | Ellis et al. | |
| 4,182,822 | A | 1/1980 | Chang | |
| 4,208,365 | A | 6/1980 | LeFevre | |
| 4,217,038 | A | 8/1980 | Letter et al. | |
| 4,246,389 | A | 1/1981 | LeBoeuf | |
| 4,259,467 | A | 3/1981 | Keogh et al. | |
| 4,260,725 | A | 4/1981 | Keogh et al. | |
| 4,293,397 | A | 10/1981 | Sato et al. | |
| 4,353,849 | A | 10/1982 | Lewison | |
| 4,401,371 | A | 8/1983 | Neefe | |
| 4,440,918 | A | 4/1984 | Rice et al. | |
| 4,450,264 | A | 5/1984 | Cho | |
| 4,487,905 | A | 12/1984 | Mitchell | |
| 4,605,712 | A | 8/1986 | Mueller et al. | |
| 4,640,594 | A | 2/1987 | Berger | |
| 4,649,184 | A | 3/1987 | Yoshikawa et al. | |
| 4,703,097 | A | 10/1987 | Wingler et al. | |
| 4,711,943 | A | 12/1987 | Harvey, III | |
| 4,879,072 | A | 11/1989 | Bourset et al. | |
| 4,890,911 | A | 1/1990 | Sulc et al. | |
| 4,954,586 | A | 9/1990 | Toyoshima et al. | |
| 4,997,897 | A | 3/1991 | Melpolder | |
| 5,009,497 | A | 4/1991 | Cohen | |
| 5,010,141 | A | 4/1991 | Mueller | |
| 5,023,305 | A | 6/1991 | Onozuka et al. | |
| 5,034,461 | A | 7/1991 | Lai et al. | |
| 5,070,169 | A | 12/1991 | Robertson et al. | |
| 5,070,215 | A | 12/1991 | Bambury et al. | |
| 5,079,319 | A | 1/1992 | Mueller | |
| 5,104,213 | A | 4/1992 | Wolfson | |
| 5,158,717 | A | 10/1992 | Lai | |
| 5,166,710 | A | 11/1992 | Hofer et al. | |
| 5,258,490 | A | 11/1993 | Chang | |
| 5,260,000 | A | 11/1993 | Nandu et al. | |
| 5,274,008 | A | 12/1993 | Lai | |
| 5,312,690 | A | 5/1994 | Fukuda et al. | |
| 5,314,960 | A | 5/1994 | Spinelli et al. | |
| 5,321,108 | A | 6/1994 | Kunzler et al. | |
| 5,337,888 | A * | 8/1994 | Morrison | 206/5.1 |
| 5,347,326 | A | 9/1994 | Volk | |
| 5,352,714 | A | 10/1994 | Lai et al. | |
| 5,358,995 | A | 10/1994 | Lai et al. | |
| 5,387,632 | A | 2/1995 | Lai et al. | |
| 5,407,062 | A | 4/1995 | Shannon et al. | |
| 5,451,617 | A | 9/1995 | Lai et al. | |
| 5,483,304 | A | 1/1996 | Porat | |
| 5,486,579 | A | 1/1996 | Lai et al. | |
| 5,496,871 | A | 3/1996 | Lai et al. | |
| 5,539,016 | A | 7/1996 | Kunzler et al. | |
| 5,598,233 | A | 1/1997 | Haralambopoulos et al. | |
| 5,641,437 | A | 6/1997 | Williams et al. | |
| 5,650,464 | A | 7/1997 | Brunner et al. | |
| 5,712,327 | A | 1/1998 | Chang et al. | |
| 5,760,100 | A | 6/1998 | Nicolson et al. | |
| 5,776,999 | A | 7/1998 | Nicolson et al. | |
| 5,789,461 | A | 8/1998 | Nicolson et al. | |
| 5,807,927 | A | 9/1998 | Stockinger et al. | |
| 5,807,944 | A | 9/1998 | Hirt et al. | |
| 5,817,924 | A | 10/1998 | Tuomela et al. | |
| 5,849,811 | A | 12/1998 | Nicolson et al. | |
| 5,871,675 | A | 2/1999 | Muller et al. | |
| 5,939,489 | A * | 8/1999 | Muller | 525/61 |
| 5,944,853 | A | 8/1999 | Molock et al. | |
| 5,945,498 | A | 8/1999 | Hopken et al. | |
| 5,959,117 | A | 9/1999 | Ozark et al. | |
| 5,962,548 | A | 10/1999 | Vanderlaan et al. | |
| 5,965,631 | A | 10/1999 | Nicolson et al. | |
| 5,969,076 | A | 10/1999 | Lai et al. | |
| 5,981,675 | A | 11/1999 | Valint, Jr. et al. | |
| 5,998,498 | A | 12/1999 | Vanderlaan et al. | |
| 6,020,445 | A | 2/2000 | Vanderlaan et al. | |
| 6,043,328 | A | 3/2000 | Domschke et al. | |
| 6,087,415 | A * | 7/2000 | Vanderlaan et al. | 523/105 |
| 6,200,626 | B1 | 3/2001 | Globe, III et al. | |
| 6,303,687 | B1 * | 10/2001 | Muller | 525/61 |
| 6,310,116 | B1 | 10/2001 | Yasuda et al. | |
| 6,359,024 | B2 | 3/2002 | Lai | |
| 6,367,929 | B1 | 4/2002 | Maiden et al. | |
| 6,436,481 | B1 | 8/2002 | Chabrecek et al. | |
| 6,635,730 | B1 | 10/2003 | Jiang et al. | |
| 6,638,991 | B2 | 10/2003 | Baba et al. | |
| 6,649,742 | B1 | 11/2003 | Better et al. | |
| 6,652,095 | B2 | 11/2003 | Tung | |
| 6,689,480 | B2 | 2/2004 | Shimoyama et al. | |
| 6,727,336 | B1 | 4/2004 | Ito et al. | |
| 6,779,888 | B2 | 8/2004 | Marmo | |
| 6,849,671 | B2 * | 2/2005 | Steffen et al. | 523/107 |
| 6,861,123 | B2 | 3/2005 | Turner et al. | |
| 6,867,245 | B2 | 3/2005 | Iwata et al. | |
| 6,886,936 | B2 | 5/2005 | Marmo et al. | |
| 6,891,010 | B2 | 5/2005 | Kunzler et al. | |
| 6,902,812 | B2 | 6/2005 | Valint, Jr. et al. | |
| 6,914,086 | B2 | 7/2005 | Hong | |
| 6,921,802 | B2 | 7/2005 | Kunzler et al. | |
| 6,940,580 | B2 | 9/2005 | Winterton et al. | |
| 6,943,203 | B2 | 9/2005 | Vanderlaan et al. | |
| 6,951,894 | B1 | 10/2005 | Nicolson et al. | |
| 6,992,118 | B2 | 1/2006 | Sulc et al. | |
| 7,216,975 | B2 | 5/2007 | Hong | |
| 7,348,022 | B1 * | 3/2008 | Clayton et al. | 424/427 |
| 7,368,072 | B2 | 5/2008 | Gemert et al. | |
| 7,426,993 | B2 | 9/2008 | Coldrey et al. | |
| 7,521,488 | B2 * | 4/2009 | Steffen et al. | 523/107 |
| 7,540,609 | B2 | 6/2009 | Chen et al. | |
| 7,572,841 | B2 | 8/2009 | Chen et al. | |
| 7,825,170 | B2 * | 11/2010 | Steffen et al. | 523/106 |
| 7,934,830 | B2 | 5/2011 | Blackwell et al. | |
| 8,101,701 | B2 * | 1/2012 | Itoh et al. | 526/279 |
| 2002/0016383 | A1 | 2/2002 | Iwata et al. | |
| 2002/0045706 | A1 | 4/2002 | Houston et al. | |
| 2002/0107324 | A1 | 8/2002 | Vanderlaan et al. | |
| 2002/0120066 | A1 | 8/2002 | Soane et al. | |
| 2002/0120084 | A1 | 8/2002 | Valint, Jr. et al. | |
| 2002/0137811 | A1 | 9/2002 | Turek et al. | |
| 2003/0008154 | A1 | 1/2003 | Aguado et al. | |
| 2003/0039748 | A1 | 2/2003 | Valint, Jr. et al. | |
| 2003/0095232 | A1 | 5/2003 | Mitsui | |
| 2003/0109390 | A1 | 6/2003 | Salpekar et al. | |
| 2003/0109637 | A1 | 6/2003 | Kunzler et al. | |
| 2003/0125498 | A1 | 7/2003 | McCabe et al. | |
| 2003/0134132 | A1 | 7/2003 | Winterton et al. | |
| 2003/0162862 | A1 | 8/2003 | McCabe et al. | |
| 2004/0039077 | A1 | 2/2004 | Baba et al. | |
| 2004/0209973 | A1 * | 10/2004 | Steffen et al. | 523/107 |
| 2004/0214914 | A1 | 10/2004 | Marmo | |
| 2004/0241130 | A1 | 12/2004 | Tamareselvy et al. | |
| 2005/0053642 | A1 | 3/2005 | Ulbricht et al. | |
| 2005/0056954 | A1 | 3/2005 | Devlin et al. | |
| 2005/0154080 | A1 | 7/2005 | McCabe et al. | |
| 2005/0159502 | A1 * | 7/2005 | Steffen et al. | 523/107 |
| 2005/0165187 | A1 | 7/2005 | Kunzler et al. | |
| 2005/0179862 | A1 | 8/2005 | Steffen et al. | |
| 2005/0228065 | A1 | 10/2005 | Nicolson et al. | |

(56) References Cited

U.S. PATENT DOCUMENTS

| | | |
|---|---|---|
| 2005/0237480 A1* | 10/2005 | Allbritton et al. ........ 351/160 R |
| 2006/0001184 A1 | 1/2006 | Phelan et al. |
| 2006/0007391 A1 | 1/2006 | McCabe et al. |
| 2006/0012751 A1 | 1/2006 | Rosenzweig et al. |
| 2006/0063852 A1 | 3/2006 | Iwata et al. |
| 2006/0072069 A1 | 4/2006 | Laredo et al. |
| 2006/0074208 A1 | 4/2006 | Laredo |
| 2007/0035693 A1 | 2/2007 | Back |
| 2007/0066706 A1 | 3/2007 | Manesis et al. |
| 2007/0231292 A1 | 10/2007 | Vanderlaan et al. |
| 2007/0291223 A1 | 12/2007 | Chen et al. |
| 2007/0296914 A1 | 12/2007 | Hong et al. |
| 2008/0048350 A1 | 2/2008 | Chen et al. |
| 2008/0067702 A1 | 3/2008 | Yao et al. |
| 2008/0114090 A1* | 5/2008 | Clayton et al. ................ 522/99 |
| 2008/0132666 A1* | 6/2008 | Itoh et al. ..................... 526/258 |
| 2009/0012205 A1 | 1/2009 | Nakada et al. |
| 2009/0091704 A1* | 4/2009 | Steffen et al. ............ 351/160 R |
| 2009/0108478 A1 | 4/2009 | Lawton et al. |
| 2009/0234089 A1 | 9/2009 | Ueyama et al. |
| 2009/0295004 A1 | 12/2009 | Pinsly et al. |
| 2009/0299022 A1 | 12/2009 | Ichinohe |
| 2010/0084775 A1 | 4/2010 | McCabe et al. |
| 2010/0101724 A1* | 4/2010 | Schuft et al. ................ 156/325 |
| 2010/0140114 A1 | 6/2010 | Pruitt et al. |
| 2010/0249356 A1 | 9/2010 | Rathore et al. |
| 2011/0009587 A1 | 1/2011 | Awasthi et al. |
| 2011/0059874 A1 | 3/2011 | Rooijmans et al. |
| 2011/0230588 A1 | 9/2011 | Devlin et al. |
| 2012/0216489 A1* | 8/2012 | Lee et al. ....................... 53/428 |
| 2012/0220688 A1 | 8/2012 | Wang et al. |

FOREIGN PATENT DOCUMENTS

| | | |
|---|---|---|
| CN | 1929811 A | 3/2007 |
| CN | 101970583 A | 2/2011 |
| DE | 2546692 | 4/1977 |
| EP | 0080539 A1 | 6/1983 |
| EP | 0330616 A1 | 8/1989 |
| EP | 0330617 A1 | 8/1989 |
| EP | 0908476 A2 | 4/1999 |
| EP | 0908744 A1 | 4/1999 |
| EP | 1870736 A1 | 12/2007 |
| EP | 1663628 B1 | 4/2008 |
| GB | 1399301 | 7/1975 |
| JP | 54-081363 | 5/1979 |
| JP | S59-093708 A | 5/1984 |
| JP | S63-207805 A | 8/1988 |
| JP | 63-297411 | 12/1988 |
| JP | 64-084219 | 3/1989 |
| JP | 05-019214 | 1/1993 |
| JP | 06-170857 | 6/1994 |
| JP | 08-025378 | 1/1996 |
| JP | 08-245737 | 9/1996 |
| JP | 08-245790 | 9/1996 |
| JP | 08-304746 | 11/1996 |
| JP | H11-183703 A | 7/1999 |
| JP | 11-320699 | 11/1999 |
| JP | 2001-509522 A | 7/2001 |
| JP | 2005-525590 A | 8/2005 |
| JP | 2006-257282 A | 9/2006 |
| JP | 2006-526807 A | 11/2006 |
| JP | 2011-024916 A | 2/2011 |
| WO | 91-04283 A1 | 4/1991 |
| WO | 93-05085 A1 | 3/1993 |
| WO | 92-24076 A1 | 8/1996 |
| WO | 3731659 A1 | 9/1997 |
| WO | 03082367 A2 | 10/2003 |
| WO | 2009-009527 A1 | 1/2009 |
| WO | 2009079245 A2 | 6/2009 |
| WO | 2011-037893 A2 | 3/2011 |
| WO | 2011-041523 A2 | 4/2011 |

OTHER PUBLICATIONS

The International Search Report and Written Opinion issued in corresponding International Patent Application No. PCT/US2012/026211 dated May 2, 2012 (9 pages).

Weiss, "Photo-Induced Polymerization," Pure and Applied Chemistry, vol. 15, Issue 3-4, Jan. 1967, pp. 587-600.

Declaration of Eri Ito dated Mar. 30, 2010 (4 pages).

Suminoe et al., "Study of new non-water containing soft contact lenses, First Report: Basic physical properties of the material," 1983, pp. 100-104 (in Japanese with English translation attached) (18 pages).

Communication of a notice of opposition for European Patent Application No. 00981765.1 issued by the European Patent Office dated Jun. 2, 2010 (1 page).

John Wiley & Sons, Inc., "Polyesters, Films," Encyclopedia of Polymer Science and Engineering, vol. 12, pp. 193-200, 217, and 225-229 (17 pages).

Holden et al., "Critical Oxygen Levels to Avoid Corneal Edema for Daily and Extended Wear Contact Lenses," Investigative Ophthalmology & Visual Science, vol. 25, Oct. 1984, pp. 1161-1167 (7 pages).

Terry et al., "CCLRU Standards for Success of Daily and Extended Wear Contact Lenses," Optometry and Vision Science, vol. 70, No. 3, pp. 234-243 (10 pages).

Jones et al., "Silicone hydrogel contact lenses Part 1 Evolution and current status," www.optometry.co.uk, pp. 26-32, Sep. 20, 2002 (7 pages).

Grant et al., "The Oxygen Transmissibility Profile of Siloxane Hydrogel Contact Lenses," (Poster presentation obtained from the Internet in Oct. 2005. Applicant is unaware of the publication date of the poster, but according to document properties of the electronic poster, it was created and last modified in 2002) (3 pages).

Steffen et al., "Finding the Comfort Zone With the Newest Silicone Hydrogel Technology," Contact Lens Spectrum (obtained from the internet in Oct. 2005; applicant is unaware of the publication date) (5 pages).

Nicolson et al., "Soft contact lens polymers: an evolution," Biomaterials, No. 22, 2001, pp. 3273-3283 (11 pages).

Bausch & Lomb (R) PureVision (TM) Contact Lenses (product information page dated Apr. 21, 1999) (1 page).

"Ciba promotes merits of new 30-night lens," (applicant is unaware of publisher and date of this article) (1 page).

Grobe III, et al., "Surface chemical structure for soft contact lenses as a function of polymer processing," Journal of Biomedical Materials Research, vol. 32, 1996, pp. 45-54 (10 pages).

Office Action received in corresponding Chinese Patent Application No. 201280010864.0 dated Aug. 6, 2015 (in Chinese with English translation attached) (12 pages).

Office Action received in corresponding Japanese Patent Application No. 2013-556728 dated Jan. 18, 2016 with partial English translation (12 pages).

Office Action received in corresponding Japanese Patent Application No. 2013-556728 dated Feb. 20, 2017 with partial English translation (5 pages).

* cited by examiner

PHOSPHINE-CONTAINING HYDROGEL CONTACT LENSES

This application is a continuation of U.S. patent application Ser. No. 13/404,028, filed Feb. 24, 2012, which claims the benefit under 35 U.S.C. §119(e) of prior U.S. Provisional Patent Application No. 61/447,152, filed Feb. 28, 2011, which is incorporated in its entirety by reference herein.

FIELD

The present disclosure is directed to silicone hydrogel contact lenses and related compositions and methods.

BACKGROUND

Commercially and clinically, hydrogel contact lenses, including silicone hydrogel contact lenses, currently dominate the contact lens market. The maturation of the hydrogel lens market increases the pressure on lens manufacturers to increase quality while reducing cost.

Some documents describing silicone hydrogel contact lenses include: U.S. Pat. No. 4,711,943, U.S. Pat. No. 5,712,327, U.S. Pat. No. 5,760,100, U.S. Pat. No. 7,825,170, U.S. Pat. No. 6,867,245, US20060063852, US20070296914, U.S. Pat. No. 7,572,841, US20090299022, US20090234089, and US20100249356, each of which is incorporated in its entirety by reference herein.

In free radical polymerization of polymerizable compositions, reaction inhibition can occur as a result of the presence of oxygen, either in the form of dissolved oxygen gas present in the polymerizable composition, or in the form of oxygen gas present in the vapor space surrounding the mold before or during the curing process. Nitrogen purging and/or the use of vacuum conditions for removing unwanted oxygen from the polymerizable composition, from the mold cavity, and/or from the curing oven can be used to keep oxygen levels low before and during the curing process. However, the use of nitrogen purging and vacuum conditions can add significantly increase the cost of the manufacturing process, of the manufacturing equipment, and thus of the final lens product.

Additionally, regardless of the type of atmosphere present during filling and curing, many polymerizable compositions do not result in hydrogel contact lens that are ophthalmically acceptable as the lenses formed from these polymerizable compositions do not adequately retain their molded shape after hydration or after autoclaving. In other words, many polymerizable compositions produce contact lenses having undesirable characteristics such as being discolored, misshaped or distorted, or not retaining their molded shapes, etc., even when the polymerizable compositions are prepared and cured under low oxygen conditions or an inert atmosphere. Thus, there continues to be a need for new hydrogel contact lens formulations and manufacturing methods, particularly lens formulations that do not require expensive inert atmospheres to be provided during curing, or that use inexpensive ingredients to improve lens shelf life, reduce lens distortion, or improve lens shape retention.

SUMMARY

The present disclosure is directed to polymerizable compositions, to hydrogel contact lenses that are formed by reacting the polymerizable compositions to form polymeric lens bodies, to batches of the hydrogel contact lenses, to packages of the hydrogel contact lenses, and to methods of manufacturing hydrogel contact lenses from the polymerizable compositions.

The polymerizable compositions of the present disclosure comprise (a) at least one hydrophilic monomer, and (b) at least one phosphine-containing compound, wherein the phosphine-containing compound is present in an unoxidized form at the time it is combined with the at least one hydrophilic monomer in the polymerizable composition. The phosphine-containing compound which is present in an unoxidized form when combined with the hydrophilic monomer of the polymerizable composition can be a compound of structure (1):

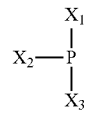

(1)

where $X_1$, $X_2$, and $X_3$ are the same or different and are an alkyl group or an aryl group, or a polymerizable group. As used herein, an aryl group is understood to refer to a functional group of substituent derived from an aromatic ring. In one example, the phosphine-containing compound can be a polymerizable phosphine-containing compound. The structure of structure (1) can comprise one polymerizable group, or can comprise more than one polymerizable group. The one or more polymerizable group of structure (1) can comprise an acrylate group such as, for example, a methacrylate group. The one or more polymerizable group of structure (1) can comprise a non-acrylate vinyl-containing functional group, i.e., a functional group having a carbon-carbon double bond which is not part of an acrylate functional group. The phosphine-containing compound can comprise a tertiary phosphine-containing compound, i.e., a compound having a tertiary phosphine group as part of its molecular structure. As used herein, a tertiary phosphine is understood to refer to an organophosphorous compound wherein the phosphorus atom is bonded to three alkyl groups or three aryl groups or polymerizable groups or any combination of three groups selected from alkyl groups, aryl groups and polymerizable groups. The phosphine-containing compound can comprises triphenylphosphine. The phosphine-containing compound can comprise diphenyl (4-vinylphenyl)phosphine. phosphine-containing compound comprises both triphenylphosphine and diphenyl (4-vinylphenyl)phosphine. The phosphine compound can be present in the polymerizable composition in an amount from 0.01 to 5 unit parts by weight.

The polymerizable composition can contain an amount of the phosphine-containing compound which is present in an unoxidized form when combined with the hydrophilic monomer that is effective to scavenge at least a portion of oxygen present in the polymerizable composition during manufacturing of a contact lens.

The polymerizable composition can contain an amount of the phosphine-containing compound which is present in an unoxidized form when combined with the hydrophilic monomer that is effective to produce a polymeric lens body having a reduced amount of axial edge lift (AEL) as compared to a second hydrogel contact lens body formed from a second polymerizable composition substantially identical to the polymerizable composition except without the phosphine-containing compound and using a manufacturing process substantially identical to the manufacturing process of the hydrogel contact lens.

The polymerizable composition can contain an amount of the phosphine-containing compound which is present in an unoxidized form when combined with the hydrophilic monomer that is effective to reduce distortion of the hydrogel contact lens as compared to a second hydrogel contact lens body formed from a second polymerizable composition substantially identical to the polymerizable composition except without the phosphine-containing compound and using a manufacturing process substantially identical to the manufacturing process of the hydrogel contact lens.

The polymerizable composition can contain an amount of the phosphine-containing compound which is present in an unoxidized form when combined with the hydrophilic monomer that is effective to reduce discoloration of the contact lens for at least 1 year when stored at room temperature, as compared to a second contact lens formed from a second polymerizable composition substantially identical to the first polymerizable composition except without the phosphine-containing compound and using a manufacturing process substantially identical to the manufacturing process of the hydrogel contact lens.

The polymerizable composition can optionally comprise at least one siloxane monomer. The polymerizable composition can optionally comprise at least one cross-linking agent. The polymerizable composition can further comprise at least one hydrophobic monomer. Optionally, the ingredients of the polymerizable composition can further include at least one initiator, or at least one organic diluent, or at least one surfactant, or at least one tinting agent, or at least one UV absorber, or at least one chain transfer agent, or combinations thereof.

As previously stated, the polymerizable composition is reacted to form a polymeric lens body which is further processed to prepare a hydrogel contact lens. A batch of hydrogel contact lenses can be prepared by preparing a plurality of hydrogel contact lenses. The batch of contact lenses can have lens properties making them acceptable for use as contact lenses. For example, the contact lenses can have adequate levels of shape retention. In one example, the level of shape retention of the hydrogel contact lens can be determined by measuring the axial edge lift (AEL) exhibited by an individual lens, or by measuring the average axial edge lift (AEL) variance for a batch of lenses. In a particular example, a batch of lenses can have an average axial edge lift (AEL) variance of less than plus or minus 50% over a time period from two weeks to seven years when stored at room temperature, or, when stored under accelerated shelf life conditions for a time period and temperature equivalent to storage from two weeks to seven years at room temperature, as determined based on at least 20 individual lenses of the batch, the AEP variance percentage determined for each of the individual lenses by the following equation (A):

$$((AEL_{Final} - AEL_{Initial})/AEL_{Initial}) \times 100 \qquad (A).$$

The present disclosure is also directed to hydrogel contact lens packages. The hydrogel contact lens package can comprise a polymeric lens body that is the reaction product of a polymerizable composition, the polymerizable composition comprising (a) at least one hydrophilic monomer, and (b) at least one phosphine containing compound, wherein the phosphine-containing compound is present in an unoxidized form at the time it is combined with the at least one hydrophilic monomer in the polymerizable composition; a packaging solution comprising a lens hydrating agent; and a contact lens package base member having a cavity configured to hold the contact lens body and the packaging solution, and a seal attached to the base member configured to maintain the contact lens and the packaging solution in a sterile condition for a duration of time equivalent to a room temperature shelf life of the contact lens.

The present disclosure is also directed to a method of manufacturing a hydrogel contact lens. The method can comprise providing a polymerizable composition comprising (a) at least one hydrophilic monomer, and (b) at least one phosphine-containing compound, wherein the phosphine-containing compound is present in an unoxidized form at the time it is combined with the at least one hydrophilic monomer in the polymerizable composition; and reacting the polymerizable composition to form a polymeric lens body. In one example, the reacting of the polymerizable composition is conducted in an atmosphere comprising air. In another example, the reacting of the polymerizable composition is conducted in an atmosphere consisting essentially of air. In another example, the reacting of the polymerizable composition is conducted in an atmosphere comprising an inert gas at a concentration greater than is found in air. In another example, the reacting comprises cast molding the polymerizable composition in a contact lens mold assembly to form a polymeric lens body.

The present method can further comprise contacting the polymeric lens body with a washing liquid to remove extractable material from the polymeric lens body. In some examples, the contacting removes a portion of the at least one phosphine compound from the polymeric lens body.

The present method can further comprise oxidizing at least a portion of the phosphine-containing compound present in the polymeric lens body, or in the hydrogel contact lens. The oxidizing can occur after the phosphine-containing compound has been combined with the hydrophilic monomer in the polymerizable composition. The oxidizing can occur before the polymerizable composition is filled into a contact lens mold section. The oxidizing can occur after the polymerizable composition has been filled into a contact lens mold section. The oxidizing can occur before the polymerizable composition is cured to form a polymeric lens body. The oxidizing can occur during the curing of the polymerizable composition to form a polymeric lens body.

It is to be understood that both the foregoing general description and the following detailed description are exemplary and explanatory only and are intended to provide a further explanation of the present invention, as claimed.

The accompanying figures, which are incorporated in and constitute a part of this application, are exemplary illustrations of the present invention and, together with the description, serve to explain the principles of the present invention.

DETAILED DESCRIPTION

Figure 1:
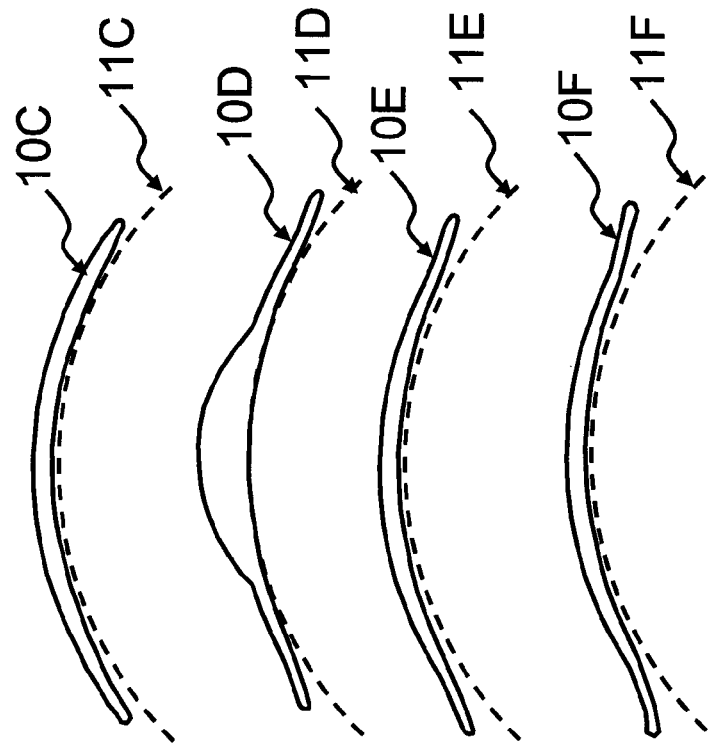
FIG. 1 is a series of illustrations of hydrogel contact lenses.
Figure 1:
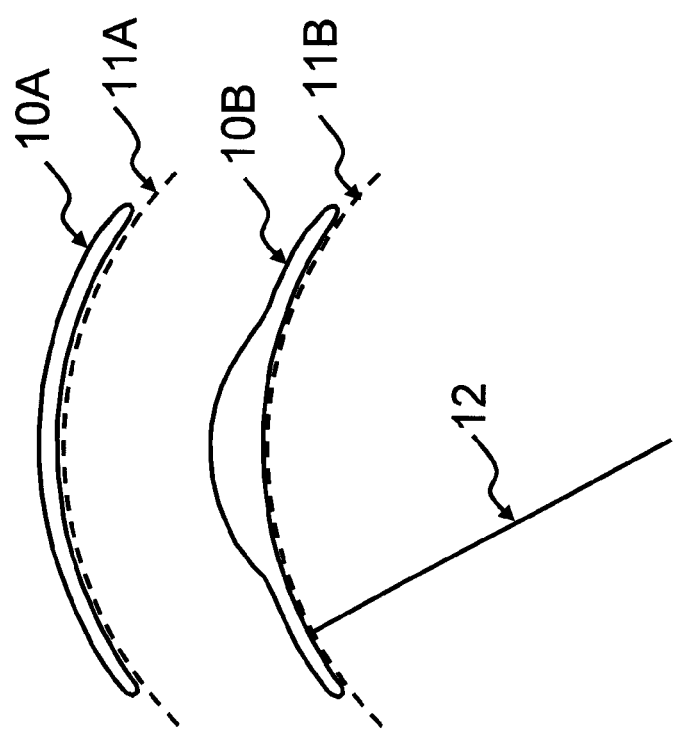

As described herein, it has now been discovered that hydrogel contact lenses can be formed from polymerizable compositions comprising (a) at least one hydrophilic monomer, and (b) at least one phosphine-containing compound, wherein the phosphine-containing compound is present in an unoxidized form at the time it is combined with the at least one hydrophilic monomer in the polymerizable composition.

The present hydrogel contact lenses comprise, or consist of, hydrated lens bodies comprising a polymeric component and a liquid component. The polymeric component comprises units of the at least one hydrophilic monomer. The hydrophilic monomer is understood to be a non-silicone polymerizable ingredient having only one polymerizable functional group present in its molecular structure. It can therefore be understood that the polymeric component is the reaction product of a polymerizable composition comprising one or more hydrophilic monomers, and can optionally include units of any additional polymerizable ingredients present in the polymerizable composition. The ingredients of the polymerizable composition can optionally further comprise additional monomers or macromers or pre-polymers or polymers, or combinations thereof. The additional monomers or macromers or pre-polymers or polymers, or combinations thereof, can be silicon-containing compounds or can be non-silicon compounds. As used herein, a non-silicon compound is understood to be a compound which does not have a silicon atom in its molecular structure. The phosphine-containing compound which is present in an unoxidized form when combined with the hydrophilic monomer, as well as optional additional ingredients of the polymerizable composition, can be polymerizable ingredients or non-polymerizable ingredients. As used herein, a polymerizable ingredient is understood to be a compound which has a polymerizable double bond as part of its molecular structure. Thus, a non-polymerizable ingredient does not have a polymerizable double bond as part of its molecular structure. When present in the polymerizable composition, the at least one cross-linking agent, the at least one hydrophilic monomer, and the at least one hydrophobic monomer of the polymerizable composition are understood to be silicon-free polymerizable ingredients. As used herein, the at least one cross-linking agent can be understood to comprise a single cross-linking agent, or to comprise a cross-linking agent component composed of two or more cross-linking agents. Similarly, the optional at least one hydrophilic monomer can be understood to comprise a single hydrophilic monomer, or to comprise a hydrophilic monomer component composed of two or more hydrophilic monomers. The optional at least one hydrophobic monomer can be understood to comprise a single hydrophobic monomer, or to comprise a hydrophobic monomer component composed of two or more hydrophobic monomers. The optional at least one siloxane monomer can be understood to comprise a single siloxane monomer, or to comprise a siloxane monomer component composed of two or more siloxane monomers. Additionally, the polymerizable composition can optionally include at least one initiator, or at least one organic diluent, or at least one surfactant, or at least one oxygen scavenger, or at least one tinting agent, or at least one UV absorber, or at least one chain transfer agent, or any combination thereof. The optional at least one initiator, at least one organic diluent, at least one surfactant, at least one oxygen scavenger, at least one tinting agent, at least one UV absorber, or at least one chain transfer agent are understood to be non-silicon ingredients, and can be either non-polymerizable ingredients or polymerizable ingredients (i.e., ingredients having a polymerizable functional group as part of their molecular structure).

The combination of the polymeric component and the liquid component are present as a hydrated lens body, which is suitable for placement on an eye of a person. The hydrated lens body has a generally convex anterior surface and a generally concave posterior surface, and has an equilibrium water content (EWC) greater than 10% weight by weight (wt/wt). Thus, the present contact lenses can be understood to be soft contact lenses, which as used herein, refers to contact lenses that, when fully hydrated, can be folded upon themselves without breaking.

As understood in the industry, a daily disposable contact lens is an unworn contact lens that is removed from its sealed, sterilized package (primary package) produced by a contact lens manufacturer, placed on a person's eye, and is removed and discarded after the person is done wearing the lens at the end of the day. Typically, the duration of lens wear for daily disposable contact lenses is from eight to fourteen hours, and they are then disposed of after wear. Daily disposable lenses are not cleaned or exposed to cleaning solutions prior to placement in the eye since they are sterile prior to opening the package. A daily disposable silicone hydrogel contact lens is a disposable silicone hydrogel contact lens that is replaced daily. In contrast, non-daily disposable contact lenses are disposable contact lenses that are replaced less frequently than daily (e.g., weekly, bi-weekly, or monthly). Non-daily disposable contact lenses are either removed from the eye and cleaned with a cleaning solution on a regular basis, or are worn continuously without removal from the eye. The present contact lenses can be either daily disposable contact lenses or non-daily disposable contact lenses. The present disclosure relates to polymerizable compositions comprising at least one phosphine-containing compound which is present in an unoxidized form when combined with the hydrophilic monomer in the polymerizable composition, polymeric lens bodies that are the reaction products of these polymerizable compositions, hydrogel contact lenses comprising these polymeric lens bodies in hydrated form, packages comprising these hydrogel contact lenses and a packaging solution in a sealed package, and methods of manufacturing these hydrogel contact lenses.

In one example, the present disclosure is directed to a polymerizable composition comprising at least one hydrophilic monomer and at least one phosphine-containing compound, wherein the phosphine-containing compound is present in an unoxidized form at the time it is combined with the at least one hydrophilic monomer in the polymerizable composition.

As previously stated, the phosphine-containing compound is present in an unoxidized form at the time it is combined with the at least one hydrophilic monomer in the polymerizable composition. In other words, the phosphine-containing compound is not a phosphine oxide-containing compound, as it does not have an oxygen atom bound to the phosphorous atom of the phosphine group at the time it is added to the polymerizable composition. However, during the manufacturing process, the phosphine-containing compound may be oxidized and become a phosphine oxide-containing compound, such as, for example, by reacting with oxygen present in the polymerizable composition, or by reacting with oxygen present in a contact lens mold during a filling process, or by reacting with oxygen present in an atmosphere of a curing oven during a curing process, or by reacting with oxygen present in a washing solution following demolding and delensing, or combinations thereof. The oxygen which reacts with the phosphine-containing compound during the manufacturing process can be present as dissolved oxygen gas, or as oxygen gas present in a mixture of gasses such as air, or as an oxidizer such as hydrogen peroxide, or as a reactive oxygen species such as singlet oxygen, or combinations thereof.

The phosphine-containing compound can be an organophosphorous compound. The phosphine-containing compound can be an organophosphorous compound having a tertiary phosphine present in its molecular structure. i.e., an organophosphorous compound wherein the phosphorus atom is bonded to three alkyl groups or three aryl groups or polymerizable groups or any combination of three groups selected from alkyl groups, aryl groups and polymerizable groups. In one example. The phosphine-containing compound can have the structure represented by formula (1):

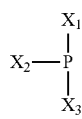

(1)

where $X_1$, $X_2$, and $X_3$ are the same or different and are an alkyl group or an aryl group or a polymerizable group. The alkyl group and aryl group can be unsubstituted or substituted. The alkyl group can be a C1 to C10 alkyl, or C1 to C5 alkyl, or C1 to C3 alkyl. The alkyl group can be a straight chain or a branched chain. The aryl group can be any functional group or substituent derived from a simple aromatic ring. The aryl group can comprise a single aromatic ring or a fused ring structure. The aryl group can be non-heterocyclic or heterocyclic. In an example, the aryl group can be phenyl, benzyl, tolyl, naphthalenyl, pyridyl, or quinolinyl. As shown by the structure, in this example phosphine oxides are not encompassed by the tertiary phosphine of structure (1).

In another example, the tertiary phosphine is trimethyl phosphine, triethyl phosphine, triisopropyl phosphine, tributyl phosphine, triisobutyl phosphine, tripentyl phosphine, triisopentyl phosphine, diethyl methyl phosphine, dimethyl phenyl phosphine, dimethyl ethyl phosphine, diethyl propyl phosphine, triphenyl phosphine, tritolyl phosphine, tribenzyl phosphine, diethyl phenyl phosphine, and dipropyl phenyl phosphine.

Triphenyl phosphine (TPP) has the following general structure of formula (2):

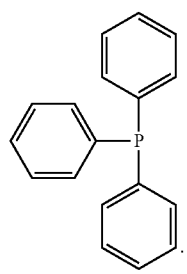

(2)

Methods for preparing tertiary phosphine compounds of formula (1) are known, such as the methods illustrated in U.S. Pat. Nos. 3,079,311, and 4,150,058, both of which are incorporated in their entireties herein by reference.

The phosphine-containing compound of the present disclosure which is present in an unoxidized form when combined with the hydrophilic monomer can, in some examples, be a polymerizable phosphine-containing compound. In other words, the structure of the phosphine-containing compound can include a polymerizable group, such as, for example, a vinyl group or an acrylate or methacrylate group. In one example, the phosphine-containing compound comprises a vinyl polymerizable group which is not part of an acrylate or methacrylate polymerizable group. The polymerizable phosphine-containing compound can be a phosphine-containing compound comprising at least one vinylic substituted aryl group. In an example, one, two or three of the $X_1$, $X_2$, and $X_3$ are a vinylic-group substituted aryl group wherein the phosphine-containing compound can comprise at least one vinylic group substituted aryl group. In a further example, the vinylic group can be vinyl, allyl, or other ethylenically unsaturated carbon chain group. In one particular example, the phosphine-containing compound can be diphenyl(4-vinylphenyl)phosphine (pTPP). Diphenyl(4-vinylphenyl)phosphine can be represented by formula (3):

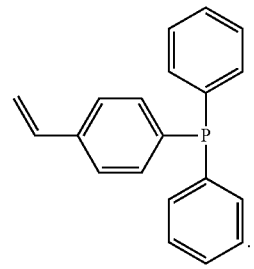

(3)

The styrenic structure diphenyl(4-vinylphenyl)phosphine (pTPP) undergoes polymerization with curing of the lens formulation.

In some examples, the phosphine-containing compound which is present in an unoxidized form when combined with the hydrophilic monomer can be present in the polymerizable composition in an amount from about 0.01 to 5 unit parts, such as from 0.02 to 2 unit parts, or from 0.05 to 1 unit part. In an example where the phosphine-containing compound is a tertiary phosphine (such as TPP or pTPP), a relatively small amount of the tertiary phosphine, for example, can be used in the polymerizable lens formulation. The phosphine-containing compound can be used, for example, in the polymerizable composition in amounts of from about 0.1 to about 1 unit part, or from about 0.2 to about 0.8 unit part, or from about 0.25 to about 0.75 unit parts, or from about 0.3 to about 0.6 unit parts, or other amounts.

The use of phosphine oxide-containing compounds as polymerization initiators in polymerizable compositions for forming contact lenses is known. In accordance with the present disclosure, when the phosphine-containing composition is oxidized to a phosphine oxide-containing compound during the manufacturing process, such as, for example, by scavenging oxygen, the amount of the phosphine oxide-containing compound in the polymerizable composition at the start of the polymerization process can be below an amount of the phosphine oxide initiator required to effectively polymerize the polymerizable composition and form a polymeric lens body having acceptable properties for use as a contact lens. In other words, were all of the phosphine-containing compound present in the polymerizable composition to be converted to the phosphine oxide-containing compound prior to initiation of polymerization of the polymerizable composition, and the phosphine oxide-containing compound were the only initiator present in the polymerizable composition, the phosphine oxide-containing compound would not be present in a high enough level to adequately polymerize the polymerizable composition and form a polymeric lens body having acceptable properties, such as shape retention, modulus, dimensional stability over time, etc.

The present disclosure is directed to a polymerizable composition comprising at least one hydrophilic monomer and at least one phosphine-containing compound which is present in an unoxidized form when combined with the hydrophilic monomer, wherein the at least one phosphine-containing compound is present in the polymerizable composition in an amount effective to scavenge at least a portion of oxygen present in the polymerizable composition during the manufacturing process. The amount of the phosphine-containing compound can be effective to scavenge oxygen from the polymerizable composition when the polymerizable composition is initially prepared, or can be an amount effective to scavenge oxygen from the polymerizable composition and the head space in the polymerizable composition vessel as the polymerizable composition waits to be filled into mold sections, or can be an amount effective to scavenge oxygen from the polymerizable composition, from the mold section and from the atmosphere during the process of filling and closing the mold sections, or the amount can be effective to scavenge oxygen from the polymerizable composition, the mold sections and the atmosphere during the curing process, or combinations thereof. In other words, the oxidation of the phosphine-containing compound to a phosphine oxide-containing compound can occur after the phosphine-containing compound has been combined with the hydrophilic monomer in the polymerizable composition, or before the polymerizable composition is filled into a contact lens mold section, or after the polymerizable composition has been filled into a contact lens mold section, or before the polymerizable composition is cured to form a polymeric lens body, or during the curing of the polymerizable composition to form a polymeric lens body, or any combination thereof.

In one example, the amount of the phosphine-containing compound which is present in an unoxidized form when combined with the hydrophilic monomer that is present in the polymerizable composition can be an amount which is effective to allow the composition to be filled into molds in the presence of an oxygen-containing atmosphere, and to produce ophthalmically acceptable contact lenses when cured. The ophthalmically acceptable contact lenses can be contact lenses having adequate retention of their molded shape, or contact lenses having properties similar to lenses made by filling the polymerizable composition under an inert atmosphere or contact lenses having both adequate shape retention and similar lens properties to contact lenses made by a fill process under an inert atmosphere. For example, the oxygen-containing atmosphere can be air at ambient pressure, or an atmosphere containing more than about 1% oxygen gas by volume, an atmosphere containing less than about 20% nitrogen gas by volume. The inert atmosphere can comprise a low oxygen atmosphere, such as an atmosphere containing less than 80% nitrogen gas by volume, or a low pressure atmosphere, such as a vacuum. The similar lenses can be lenses formed of a substantially identical polymerizable composition.

In another example, the amount of the phosphine-containing compound which is present in an unoxidized form when combined with the hydrophilic monomer that is present in the polymerizable composition can be an amount which is effective to allow the composition to be reacted in the presence of an oxygen-containing atmosphere, and still produce ophthalmically acceptable contact lenses, such as contact lenses having adequate retention of their molded shape, or having properties similar to lenses cured under an inert atmosphere, or having both adequate shape retention and similar lens properties. For example, the oxygen-containing atmosphere can be air at ambient pressure, or an atmosphere containing more than about 1% oxygen gas by volume, or an atmosphere containing less than about 20% nitrogen gas by volume. The inert atmosphere can comprise a low oxygen atmosphere, such as an atmosphere containing less than 80% nitrogen gas by volume, or a low pressure atmosphere, such as a vacuum. The similar lenses can be lenses formed of a substantially identical polymerizable composition.

In yet another example, the amount of the phosphine-containing compound which is present in an unoxidized form when combined with the hydrophilic monomer that is present in the polymerizable composition can be an amount effective to allow the composition to be both filled into molds and reacted in the presence of an oxygen-containing atmosphere without need for an inert atmosphere, and still produce ophthalmically acceptable contact lenses, such as contact lenses having adequate retention of their molded shape, or having properties similar to lenses filled and cured under an inert atmosphere, or having both adequate shape retention and similar lens properties. For example, the oxygen-containing atmosphere can be air at ambient pressure, or an atmosphere containing more than about 1% oxygen gas by volume, or an atmosphere containing less than about 20% nitrogen gas by volume. The inert atmosphere can comprise a low oxygen atmosphere, such as an atmosphere containing less than 80% nitrogen gas by volume, or a low pressure atmosphere, such as a vacuum. The similar lenses can be lenses formed of a substantially identical polymerizable composition.

The present disclosure is also directed to a polymerizable composition comprising at least one hydrophilic monomer and at least one phosphine-containing compound which is present in an unoxidized form when combined with the hydrophilic monomer, wherein the polymerizable composition contains an amount of the phosphine-containing compound effective to produce a polymeric lens body having a reduced amount of axial edge lift (AEL) as compared to a second hydrogel contact lens body formed from a second polymerizable composition substantially identical to the polymerizable composition except without the phosphine-containing compound and using a manufacturing process substantially identical to the manufacturing process of the hydrogel contact lens.

FIG. 1 is a series of illustrations of hydrogel contact lenses having no axial edge lift (lens 10A and lens 10B) and of contact lenses having some degree of edge lift, ranging from minimal (lens 10C) to progressively more severe, (lens 10D, lens 10E and lens 10F, respectively). The illustrations of FIG. 1 include dashed lines illustrating the back optic zone curve of each lens. Thus, 11A is the back optic zone curve of lens 10A, 11B is the back optic zone curve of lens 10B, 11C is the back optic zone curve of lens 10C, 11D is the back optic zone curve of lens 10D, 11E is the back optic zone curve of lens 10E, and 11F is the back optic zone curve of lens 10F. The back optic zone radius (BOZR) is illustrated by radius 12, which is the radius of the back optic zone cure of lens 10B (and which is the same curve, and the BOZR, for all of lenses 10A-10F).

Figure 2:
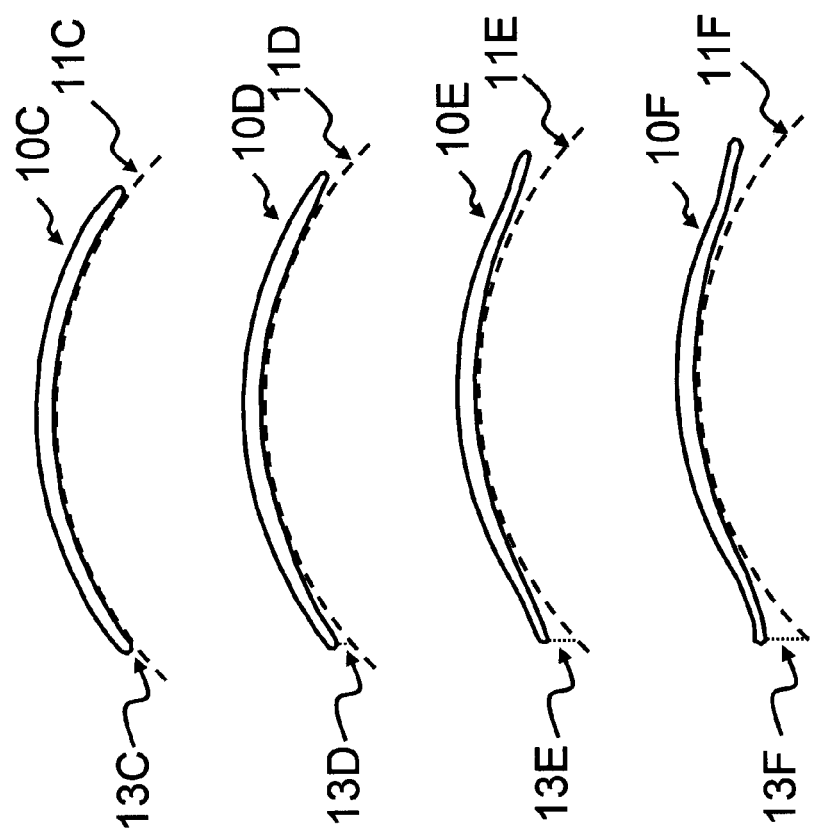
FIG. 2 is a series of drawings illustrating measurement of axial edge lift (AEL) for different hydrogel contact lenses.

FIG. 2 is an, illustration of the hydrogel contact lenses of FIG. 1 having some degree of edge lift. The vertical lines 13C, 13D, 13E and 13F illustrate the axial edge lift (AEL) of respective lenses 10C, 10D, 10E, and 10F as measured from the back optic zone curve 11C, 11D, 11E and 11F. The AEL can be measured on sectioned lenses or using other means known in the art. Some lens designs may intentionally include a small amount of edge lift. An acceptable level of AEL can be less than about 40 micrometers, or less than about 30 micrometers. Lenses having poor shape retention often 'flare out' at the edge, displaying AEL values greater than about 50 micrometers, such as, for example, greater than about 75 micrometers or greater than about 100 micrometers.

In another example, the polymerizable composition contains an amount of the phosphine-containing compound which is present in an unoxidized form when combined with the hydrophilic monomer that is an amount effective to reduce distortion of the hydrogel contact lens. For example, the amount of phosphine-containing compound can be effective to reduce distortion of the hydrogel contact lens as compared to a second hydrogel contact lens body formed from a second polymerizable composition substantially identical to the polymerizable composition except without the phosphine-containing compound, and using a manufacturing process substantially identical to the manufacturing process of the hydrogel contact lens. The distortion can be shape distortion, or can be optical distortion.

In a specific example, contact lenses formed from a polymerizable composition comprising a phosphine-containing compound which is present in an unoxidized form when combined with the hydrophilic monomer have acceptable levels of shape retention without impairment of the final lens properties. The presence of the phosphine containing compound in the polymerizable composition, and in the resulting polymerized lens bodies, is effective in stabilizing the shape of the hydrogel contact lenses, while still providing a hydrogel contact lens having ophthalmically acceptable physical properties, such as, for example, an equilibrium water content greater than 30%, or an oxygen permeability greater than 55 buffers, or a tensile modulus from 0.2 MPa to 0.85 MPa, or combinations thereof. Such contact lenses retain their molded shapes after being autoclaved and fully hydrated.

Figure 3:
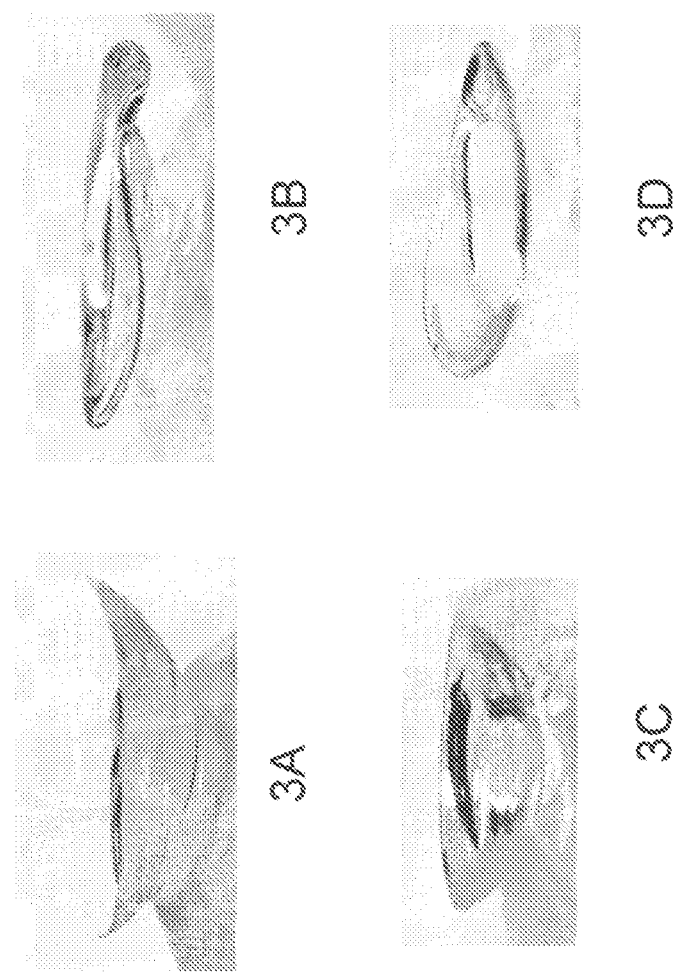
FIG. 3 is a series of photographs showing hydrogel contact lenses having acceptable shape retention and having unacceptable levels of shape distortion.

FIG. 3 is a series of photographs of hydrogel contact lenses formed from polymerizable compositions having the same components, except with (3A and 3C) and without (3B and 3D) a phosphine-containing compound. Lenses 3A and 3B were manufactured using the same process, including polymerization in an air atmosphere. Lenses 3C and 3D were manufactured using the same process, including polymerization in an inert atmosphere. The lenses formed from compositions comprising the phosphine-containing compound had acceptable shapes (3A and 3C), while the lenses formed from compositions without the phosphine-containing compound had distorted shapes (3B and 3D).

In accordance with the lenses and methods of manufacturing lenses disclosed herein, the polymerizable composition can be reacted in an atmosphere comprising air. The polymerizable composition can be reacted in an atmosphere consisting essentially of air. The polymerizable composition can be reacted in an atmosphere comprising air. The polymerizable composition can also be reacted in an atmosphere comprising an inert gas at a concentration greater than is found in air. The polymerizable composition can also be reacted in an atmosphere comprising a low concentration of an inert gas, such as an atmosphere containing less than 80% nitrogen gas by volume. Alternatively, the polymerizable composition can be reacted under an atmosphere containing a high concentration of an inert gas, such as a nitrogen atmosphere, including an atmosphere comprising greater than 80% nitrogen gas by volume.

Similarly, the polymerizable composition can be stored in an atmosphere comprising air. The polymerizable composition can be stored in an atmosphere consisting essentially of air. The polymerizable composition can be stored in an atmosphere consisting of air. The polymerizable composition can also be stored in an atmosphere comprising an inert gas at a concentration greater than is found in air. The polymerizable composition can also be stored in an atmosphere comprising a low concentration of an inert gas, such as an atmosphere containing less than 80% nitrogen gas by volume. Alternatively, the polymerizable composition can be stored under an atmosphere containing a high concentration of an inert gas, such as a nitrogen atmosphere, including an atmosphere comprising greater than 80% nitrogen gas by volume.

Additionally, in some examples, the polymerizable composition can be filled into the mold sections in an atmosphere comprising air. The polymerizable composition can be filled into the mold sections in an atmosphere consisting essentially of air. The polymerizable composition can be filled into the mold sections in an atmosphere consisting of air. The polymerizable composition can also be filled in an atmosphere comprising an inert gas at a concentration greater than is found in air. The polymerizable composition can also be filled in an atmosphere comprising a low concentration of an inert gas, such as an atmosphere containing less than 80% nitrogen gas by volume. Alternatively, the polymerizable composition can be filled under an atmosphere containing a high concentration of an inert gas, such as a nitrogen atmosphere, including an atmosphere comprising greater than 80% nitrogen gas by volume.

In another example, the polymerizable composition can contain an amount of the phosphine-containing compound which is present in an unoxidized form when combined with the hydrophilic monomer that is an amount effective to reduce discoloration of the contact lens for at least 1 year when stored at room temperature, or for an equivalent period of time under accelerated testing conditions. In some formulations, it has been found that the presence of low concentrations of phosphine-containing compounds is effective to eliminate or reduce yellowing of the hydrogel contact lenses when stored for long periods of time. The amount of phosphine-containing compound can be effective to reduce discoloration of the contact lens as compared to a second hydrogel contact lens body formed from a second polymerizable composition substantially identical to the polymerizable composition except without the phosphine-containing compound and using a manufacturing process substantially identical to the manufacturing process of the hydrogel contact lens.

The reduction in discoloration can comprise a reduction in the level of yellowness of the lenses. The level of yellowness can be detected using a color analyzer. For example, the color analyzer can be based on a multiple-coordinate color system such as the CIE L*a*b* system. The three coordinates of the CIE L*a*b* system represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow). When using such a system, the reduction in the level of yellowness of the lenses can comprise a reduction in the L* value, or a reduction in a positive b* value, or an increase in a negative b* value.

As stated above, the phosphine-containing compound which is present in an unoxidized form when combined with the hydrophilic monomer is part of or within the unitary construction of the lens body. In one example, when the phosphine-containing compound is a polymerizable phosphine-containing compound, the phosphine-containing compound is present as a unit of the copolymer comprising the polymerized lens body. In such an example, the phosphine-compound can be immobilized chemically, physically, or both chemically and physically, in the lens body.

The phosphine-containing compound which is present in an unoxidized form when combined with the hydrophilic monomer can be present throughout the entire polymerized lens body. Various gradients of concentrations of the phosphine-containing compound can be present throughout the lens body, such that the concentration of the phosphine-containing compound is uniform throughout the lens body or is non-uniform throughout the lens body. The concentration of the phosphine-containing compound can be substantially uniform throughout the lens body and this can be achieved by adding the phosphine-containing compound in the polymerizable composition and distributing the phosphine-containing compound uniformly throughout the composition prior to formation of the lens, for example, prior to filling the polymerizable composition into a mold. As an option, the phosphine-containing compound can be added to the composition at least in part or completely before polymerization commences with the reactive components forming the lens composition. As an option, a larger concentration of the phosphine-containing compound can be present at a surface(s) of the lens body where oxygen exposure can occur.

With the present invention, the phosphine-containing compound which is present in an unoxidized form when combined with the hydrophilic monomer is not present due to a post-treatment on the lens body already formed, such as by a surface coating. Though, as an option, a coating of a phosphine-containing compound can be present in addition to the phosphine-containing component in the polymerizable composition. As stated, the phosphine containing compound is part of the polymerizable composition used to form the lens body, is part of the polymerized lens body following polymerization and remains part of the lens body, at least until the polymerizable composition, the lens body, or both, are exposed to conditions that oxidize the phosphine-containing compound to become a phosphine oxide-containing compound. Similarly, the phosphine containing compound remains part of the polymerized lens body at least until the polymerizable lens body is contacted by a liquid, for example as part of a demolding process, a delensing process, a process to oxidize remaining phosphine-containing component, a washing or extraction process, contact with a packaging solution, a sterilization process, etc., that comprise part of the process of transforming the polymeric lens body into a finished hydrogel contact lens.

While it is optional to include an additional layer on the lens surface of the lens body that may include a phosphine-containing compound, it is to be understood that this is not necessary and, in fact, with the present invention, by having a phosphine-containing compound incorporated as part of the overall lens composition and part of the overall lens, there is no need to have a separate coating or layer of the phosphine-containing compound for any purpose.

As previously discussed, the phosphine-containing compound which is present in an unoxidized form when combined with the hydrophilic monomer is part of the polymerizable composition which is reacted to polymerize and form the lens body. In addition to at least one phosphine-containing component, the polymerizable composition comprises at least one hydrophilic monomer. The polymerizable composition can be reacted to form a polymeric lens body. The polymer of the lens body can be a homopolymer, or a copolymer comprising units of the hydrophilic monomer, including a crosslinked copolymer or a branched chain copolymer or a linear copolymer, or an inter-penetrating polymer network of two polymers or copolymers, each of which is crosslinked to itself, or a pseudo-interpenetrating polymer network of two polymers or copolymers, only one of which is crosslinked to itself. When the phosphine-containing component comprises a polymerizable phosphine-containing component, the copolymer of the polymeric lens body includes polymerized units of the phosphine-containing component in addition to polymerized units of the hydrophilic monomer. Optionally, the polymerizable composition can further comprise at least one siloxane monomer, at least one cross-linking agent, at least one initiator, at least one tinting agent; at least one UV blocking agent, and combinations and subsets thereof.

As used herein, the hydrophilic monomer of the polymerizable composition is understood to be a non-silicon hydrophilic monomer, and thus is different from a siloxane monomer. The hydrophilicity or hydrophobicity of a monomer (including silicon-containing and non-silicon monomers) can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams or more of the monomer are visibly fully soluble in 1 liter of water at 20 degrees C. (i.e., the monomer is soluble at a level of at least 5% wt/wt in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20 degrees C. (i.e., the monomer is soluble at a level of less than 5% wt/wt in water).

Examples of hydrophilic monomers which can be included in the present polymerizable compositions can include, for example, N,N-dimethylacrylamide (DMA), or 2-hydroxyethyl acrylate, or 2-hydroxyethyl methacrylate (HEMA), or 2-hydroxypropyl methacrylate, or 2-hydroxybutyl methacrylate (HOB), or 2-hydroxybutyl acrylate, or 4-hydroxybutyl acrylate glycerol methacrylate, or 2-hydroxyethyl methacrylamide, or polyethyleneglycol monomethacrylate, or methacrylic acid, or acrylic acid, or any combination thereof.

In one example, the hydrophilic monomer or hydrophilic monomer component can comprise or consist of a vinyl-containing monomer. Examples of hydrophilic vinyl-containing monomers which can be provided in the polymerizable compositions include, without limitation, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or N-vinyl-N-ethyl formamide, or N-vinyl formamide, or N-2-hydroxyethyl vinyl carbamate, or N-carboxy-β-alanine N-vinyl ester, 1,4-butanediol vinyl ether (BVE), or ethylene glycol vinyl ether (EGVE), or diethylene glycol vinyl ether (DEGVE), or any combination thereof.

In another example, the hydrophilic monomer or hydrophilic monomer component of the polymerizable composition can comprise or consist of a hydrophilic amide monomer. The hydrophilic amide monomer can be a hydrophilic amide monomer having one N-vinyl group, such as, for example, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the hydrophilic monomer or hydrophilic monomer component comprises N-vinyl-N-methyl acetamide (VMA). For example, the hydrophilic monomer or monomer component can comprise or consist of VMA. In one particular example, the hydrophilic monomer can be VMA.

In another example, the hydrophilic vinyl-containing monomer or monomer component can comprise or consist of a vinyl ether-containing monomer. Examples of vinyl ether-containing monomers include, without limitation, 1,4-butanediol vinyl ether (BVE), or ethylene glycol vinyl ether (EGVE), or diethylene glycol vinyl ether (DEGVE), or any combination thereof. In one example, the hydrophilic monomer component comprises or consists of BVE. In another example, the hydrophilic monomer component comprises or consists of EGVE. In yet another example, the hydrophilic vinyl component comprises or consists of DEGVE.

In yet another example, the hydrophilic vinyl-containing monomer component can comprise or consist of a combination of a first hydrophilic monomer or monomer component, and a second hydrophilic monomer or hydrophilic monomer component. In one example, the first hydrophilic monomer has a different polymerizable functional group than the second hydrophilic monomer. In another example, each monomer of the first hydrophilic monomer has a different polymerizable functional group than the second hydrophilic monomer. In another example, the first hydrophilic monomer has a different polymerizable functional group than each monomer of the second hydrophilic monomer component. In yet another example, each monomer of the first hydrophilic monomer component has a different polymerizable functional group than each monomer of the second hydrophilic monomer component.

For example, when the first hydrophilic monomer or monomer component comprises or consists of one or more amide-containing monomers, the second hydrophilic monomer or monomer component can comprise or consist of one or more non-amide monomers (i.e., one or more monomers each of which do not have an amide functional group as part of their molecular structures). As another example, when the first hydrophilic monomer or monomer component comprises or consists of one or more vinyl-containing monomers, the second hydrophilic monomer or monomer component can comprise one or more non-vinyl monomers (i.e., one or more monomers each of which do not have a vinyl polymerizable functional group as part of their molecular structures). In another example, when the first hydrophilic monomer or monomer component comprises or consists of one or more amide monomers each having an N-vinyl group, the second hydrophilic monomer or monomer component can comprise or consist of one or more non-amide monomers. When the first hydrophilic monomer or monomer component comprise or consists of one or more non-acrylate monomers (i.e., one or more monomers each of which do not have an acrylate or methacrylate polymerizable functional group as part of their molecular structures), the second hydrophilic monomer or monomer component can comprise or consist of one or more acrylate-containing monomers, or one or more methacrylate-containing monomers, or any combination thereof. When the first hydrophilic monomer or monomer components comprises or consists of one or more non-vinyl ether-containing monomers (i.e., one or more monomers each of which do not have a vinyl ether polymerizable functional group as part of their molecular structures), the second hydrophilic monomer or monomer component can comprise or consist of one or more vinyl ether-containing monomers. In a particular example, the first hydrophilic monomer or monomer component can comprise or consist of one or more amide-containing monomers each having an N-vinyl group, and the second hydrophilic monomer or monomer component can comprise or consist of one or more vinyl ether-containing monomers.

In one example, when the first hydrophilic monomer or monomer component comprises or consists of a hydrophilic amide-containing monomer having one N-vinyl group, the second hydrophilic monomer or monomer component can comprise or consist of a vinyl ether-containing monomer. In a particular example, the first hydrophilic monomer can comprise VMA, and the second hydrophilic monomer or monomer component can comprise BVE or EGVE or DEGVE or any combination thereof. The first hydrophilic monomer can comprise VMA and the second hydrophilic monomer can comprise BVE. The first hydrophilic monomer can comprise VMA and the second hydrophilic monomer can comprise EGVE. The first hydrophilic monomer can comprise VMA and the second hydrophilic monomer can comprise DEGVE. The first hydrophilic monomer can comprise VMA, and the second hydrophilic monomer component can comprise EGVE and DEGVE.

Similarly, the first hydrophilic monomer can be VMA, and the second hydrophilic monomer or monomer component can comprise BVE or EGVE or DEGVE or any combination thereof. The first hydrophilic monomer can be VMA and the second hydrophilic monomer can be BVE. The first hydrophilic monomer can be VMA and the second hydrophilic monomer can be EGVE. The first hydrophilic monomer can comprise VMA and the second hydrophilic monomer can be DEGVE. The first hydrophilic monomer can be VMA, and the second hydrophilic monomer component can be a combination of EGVE and DEGVE.

In another example, the non-silicon hydrophilic vinyl-containing monomer can have any molecular weight, such as a molecular weight less than 400 daltons, or less than 300 daltons, or less than 250 daltons, or less than 200 daltons, or less than 150 daltons, or from about 75 to about 200 daltons.

When a hydrophilic monomer or a hydrophilic monomer component is present in the polymerizable composition, the hydrophilic monomer or monomer component can be present in the polymerizable composition in an amount from 30 to 60 unit parts of the polymerizable composition. The hydrophilic monomer or monomer component can be present in the polymerizable composition from 40 to 55 unit parts, or from 45 to 50 unit parts by weight. When the hydrophilic monomer component of the polymerizable composition comprises a first hydrophilic monomer or monomer component and a second hydrophilic monomer or monomer component, the second hydrophilic monomer or monomer component can be present in the polymerizable composition in an amount from 0.1 to 20 unit parts of the polymerizable composition. For example, of the total amount of from 30 to 60 unit parts of hydrophilic monomer or monomer component present in the polymerizable composition, 29.9 to 40 unit parts can comprise the first hydrophilic monomer or monomer component, and 0.1 to 20 unit parts can comprise the second hydrophilic monomer or monomer component. In another example, the second hydrophilic monomer or monomer component can be present in the polymerizable composition from 1 to 15 unit parts, or from 2 to 10 unit parts, or from 3 to 7 unit parts.

As used herein, a vinyl-containing monomer is a monomer having a single polymerizable carbon-carbon double bond (i.e., a vinyl polymerizable functional group) present in its molecular structure, where, under free radical polymerization, the carbon-carbon double bond in the vinyl polymerizable functional group is less reactive than the carbon-carbon double bond present in an acrylate or a methacrylate polymerizable functional group. In other words, although a carbon-carbon double bond is present in acrylate groups and methacrylate groups, as understood herein, monomers comprising a single acrylate or methacrylate polymerizable group are not considered to be vinyl-containing monomers. Examples of polymerizable groups having carbon-carbon double bonds which are less reactive than the carbon-carbon double bonds of acrylate or methacrylate polymerizable groups include vinyl amide, vinyl ether, vinyl ester, and allyl ester polymerizable groups. Thus, as used herein, examples of vinyl-containing monomers include monomers having a single vinyl amide, a single vinyl ether, a single vinyl ester, or a single allyl ester polymerizable group.

In any or each of the foregoing examples, as previously discussed, the amount of the hydrophilic monomer or monomer component (e.g., the one or more hydrophilic monomers present in the polymerizable composition) can be from 30 to 60 unit parts of the polymerizable composition. In certain examples, the hydrophilic monomer or mixture of monomers component can constitute from 40 to 55 unit parts of the polymerizable composition, or from 45 to 50 unit parts of the composition. When VMA is present in the polymerizable composition, it can be present in an amount from 30 unit parts to 60 unit parts. In certain examples, VMA is present in the polymerizable composition in an amount from about 40 unit parts to about 55 unit parts, or from 45 to 50 unit parts. If the hydrophilic monomers, N,N-dimethylacrylamide (DMA), 2-hydroxyethyl methacrylate (HEMA), or 2-hydroxylbutyl methacrylate (HOB), are present in the polymerizable composition as an optional second hydrophilic monomer or mixture of monomers, they can be present in amounts from about 3 to about 10 unit parts.

As used herein, a molecular weight is understood to refer to the number average molecular weight. The number average molecular weight is the ordinary arithmetic mean or average of the molecular weights of the individual molecules present in the sample of a monomer. As the individual molecules in a sample of monomer may vary slightly from one another in molar mass, some level of polydispersity may be present in the sample. As used herein, when the siloxane monomer, or any other monomer, macromer, pre-polymer, or polymer, of the polymerizable composition is polydisperse, the term "molecular weight" refers to the number average molecular weight of the monomer or ingredient. As one example, a sample of the siloxane monomer can have a number average molecular weight of about 15,000 daltons, but if the sample is polydisperse, the actual molecular weights of the individual monomers present in the sample may range from 12,000 daltons to 18,000 daltons.

The number average molecular weight can be the absolute number average molecular weight as determined by proton nuclear magnetic resonance (NMR) end group analysis, as understood by persons of ordinary skill in the art. Molecular weights may also be determined using gel permeation chromatography, as understood by persons of ordinary skill in the art, or may be provided by suppliers of the chemicals.

As used herein, unit parts is understood to mean unit parts by weight. For example, to prepare a formulation described as comprising x unit parts of a phosphine-containing compound and y unit parts of a hydrophilic monomer, the composition can be prepared by combining x grams of the phosphine-containing compound with y grams of the hydrophilic monomer to obtain a total of y+z grams of polymerizable composition, or by combining z ounces of the phosphine-containing compound with y ounces of the hydrophilic monomer to obtain a total of y+z ounces of polymerizable composition, and so on. When the composition further comprises additional optional ingredients such as, for example, x unit parts of a cross-linking agent, x grams of the cross-linking agent are combined with z grams of the phosphine-containing compound and y grams of the hydrophilic monomer to obtain a total of x+y+z grams of polymerizable composition, and so on. When the composition comprises an additional optional ingredient comprising an ingredient component composed of two ingredients, such as, for example, a hydrophobic monomer component consisting of a first hydrophobic monomer and a second hydrophobic monomer, in addition to the z unit parts of phosphine-containing compound, the y unit parts of hydrophilic monomer and the x unit parts of the cross-linker, w unit parts of the first hydrophobic monomer and v unit parts of the second hydrophobic monomer are combined to obtain a total amount of v+w+x+y+z unit parts of the polymerizable composition. It is understood that the unit parts of the at least one hydrophobic monomer present in such a polymerizable is the sum of the unit parts of the first hydrophobic monomer and the unit parts of the second hydrophobic monomer, e.g., v+w unit parts in this example. Typically, a formula for a polymerizable composition will be composed of ingredients in amounts totaling from about 90 to about 110 unit parts by weight. When amounts of components of the polymerizable composition are recited herein as being in unit parts, it is to be understood that the unit parts of these component are based on a formula providing a total weight of the composition ranging from about 90 to 110 unit parts. In one example, the unit parts by weight can be based on a formula providing a total weight of the composition ranging from about 95 to 105 unit parts by weight, or from about 98 to 102 unit parts by weight.

In one example, the present disclosure is directed to hydrogel contact lenses essentially free of silicon-containing ingredients, i.e., contact lenses formed of a hydrogel containing less than 0.1% (w/w) of a silicon-containing ingredient. In another example, the present disclosure is directed to silicone hydrogel contact lenses. As used herein, "silicone hydrogel" or "silicone hydrogel material" refers to a particular hydrogel that includes a silicone (SiO) component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material. A siloxane monomer is a monomer that contains at least one siloxane [—Si—O—Si—] linkage. In a siloxane monomer, each silicon atom may optionally possess one or more organic radical substituents ($R_1$, $R_2$) or substituted organic radical substituents that may be the same or different, e.g., —$SiR_1R_2O$—. Similarly, a non-silicon ingredient is an ingredient containing less than 0.1% (w/w) silicon.

In some examples of the present invention, the polymerizable composition can further comprise at least one siloxane monomer. In such an example, the polymeric lens body will include polymerized units of the at least one siloxane monomer, and the hydrogel contact lens will comprise a silicone hydrogel contact lens. As used herein, a reactive ingredient which can be reacted to form a unit part of a polymer is referred to as a monomer, regardless of its size. The optional at least one siloxane monomer can comprise a single siloxane monomer, or can comprise a siloxane monomer component composed of two or more siloxane monomers. The at least one siloxane monomer can be a hydrophilic siloxane monomer, or a hydrophobic siloxane monomer, or can have both hydrophilic regions and hydrophobic regions, depending on the amount and location of any hydrophilic components, such as units of ethylene glycol, polyethylene glycol and the like, present in the molecular structure of the siloxane monomers.

For example, the siloxane monomer can contain hydrophilic components within the main chain of the siloxane molecule, can contain hydrophilic components within one or more side chains of the siloxane molecule, or any combination thereof. For example, the siloxane monomer can have at least one unit of ethylene glycol adjacent to a polymerizable functional group in the main chain of the siloxane molecule. As used herein, adjacent is understood to mean both immediately adjacent, and separated only by 10 or fewer carbon atoms. The at least one unit of ethylene glycol adjacent to a polymerizable functional group in the main chain of the siloxane molecule can be separated from the polymerizable functional group by a carbon chain 1-5 units in length (i.e., where the ethylene glycol unit is bonded to the first carbon in the carbon chain 1-5 units in length, and the polymerizable functional group is bonded to the last carbon of the carbon chain 1-5 units in length, in other words, the ethylene glycol unit and the polymerizable group are not immediately adjacent but are separated by 1-5 carbon atoms). The siloxane monomer can have at least one unit of ethylene glycol adjacent to polymerizable functional groups present on both ends of the main chain of the siloxane molecule. The siloxane monomer can have at least one unit of ethylene glycol present in at least one side chain of the siloxane molecule. The at least one unit of ethylene glycol present in at least one side chain of the siloxane molecule can be part of a side chain bonded to a silicon atom of the main chain of the siloxane molecule. The siloxane molecule can have both at least one unit of ethylene glycol adjacent to polymerizable functional groups present on both ends of the main chain of the siloxane molecule, and at least one unit of ethylene glycol present in at least one side chain of the siloxane molecule.

In one example of the present disclosure, when present in the polymerizable composition, the optional at least one siloxane monomer can be a multifunctional siloxane monomer. If the siloxane monomer has two functional groups, such as two methacrylate groups, it is a bifunctional monomer. If the siloxane monomer has three functional groups, it is a trifunctional monomer.

The optional siloxane monomer can be a siloxane monomer having a polymerizable functional group present on one end of the main chain of the monomer. The siloxane monomer can be a siloxane monomer having a polymerizable functional group on both ends of the main chain of the monomer. The siloxane monomer can be a siloxane monomer having a polymerizable functional group present on at least one side chain of the monomer. The siloxane monomer can be a siloxane monomer having a polymerizable functional group present on only one side chain of the monomer.

The optional siloxane monomer of the polymerizable composition can be an acrylate-containing siloxane monomer, in other words, a siloxane monomer having at least one acrylate polymerizable functional group as part of its molecular structure. In one example, the acrylate-containing siloxane monomer can be a methacrylate-containing siloxane monomer, i.e., a siloxane monomer having at least one methacrylate polymerizable functional group as part of its molecular structure.

The optional siloxane monomer can be a siloxane monomer having a number average molecular weight of at least 3,000 daltons. In another example, the siloxane monomer can be a siloxane monomer having a molecular weight of at least 4,000 daltons, or of at least 7,000 daltons, or of at least 9,000 daltons, or of at least 11,000 daltons.

The optional siloxane monomer can be a siloxane monomer having a molecular weight less than 20,000 daltons. In another example, the siloxane monomer can be a siloxane monomer having a molecular weight less than 15,000 daltons, or less than 11,000 daltons, or less than 9,000 daltons, or less than 7,000 daltons, or less than 5,000 daltons.

The optional siloxane monomer can be a siloxane monomer having a molecular weight from 3,000 daltons to 20,000 daltons. In another example, the siloxane monomer can be a siloxane monomer having a molecular weight from 5,000 daltons to 20,000 daltons, or from 5,000 daltons to 10,000 daltons, or from 7,000 daltons to 15,000 daltons.

In one example, the optional siloxane monomer has more than one functional group and has a number average molecular weight of at least 3,000 daltons.

The optional siloxane monomer can include poly(organosiloxane) monomers or macromers or prepolymers, such as, for example, 3-[tris(trimethylsiloxy)silyl]propyl allyl carbamate, or 3-[tris(trimethylsiloxy)silyl]propyl vinyl carbamate, or trimethylsilylethyl vinyl carbonate, or trimethylsilylmethyl vinyl carbonate, or 3-[tris(trimethylsiloxy)silyl]propyl methacrylate (TRIS), or 3-methaycryloxy-2-hydroxypropyloxy)propylbis(trimethylsiloxy) methylsilane (SiGMA), or methyl di(trimethylsiloxy)silyl-propylglycerolethyl methacrylate (SiGEMA), or monomethacryloxypropyl terminated polydimethylsiloxane (MCS-M11), MCR-M07, or monomethacryloxypropyl terminated mono-n-butyl terminated polydimethyl siloxane (mPDMS), or any combination thereof. In one example of a polymerizable composition of the present disclosure, the optional siloxane monomer can comprise a first siloxane monomer and a second siloxane monomer, wherein the second siloxane monomer differs from the first siloxane present in the polymerizable composition based on molecular weight, molecular structure, or both molecular weight and structure. For example, the optional second siloxane monomer or at least one third siloxane monomer can be a siloxane monomer of formula (1) having a different molecular weight than the first siloxane monomer of the polymerizable composition. In another example, the optional second siloxane monomer or at least one third siloxane can comprise at least one of the siloxanes disclosed in the following patents: US2007/0066706, US2008/0048350, U.S. Pat. No. 3,808,178, U.S. Pat. No. 4,120,570, U.S. Pat. No. 4,136,250, U.S. Pat. No. 4,153,641, U.S. Pat. No. 470,533, U.S. Pat. No. 5,070,215, U.S. Pat. No. 5,998,498, U.S. Pat. No. 5,760,100, U.S. Pat. No. 6,367,929, and EP080539, the entire content of which are hereby incorporated by reference.

In another example of the present contact lenses, the optional siloxane monomer can be a dual-end methacrylate end-capped polydimethylsiloxane having a number average molecular weight of at least 4,000 daltons. It will be understood that such siloxane monomers are bifunctional.

In one example of the present contact lenses, the optional siloxane monomer can have a number average molecular weight of at least 4,000 daltons, or at least 7,000 daltons, or at least 9,000 daltons, or at least 11,000 daltons. The number average molecular weight of the siloxane monomer can be less than 20,000 daltons. Thus, in some contexts, the siloxane monomer can be considered a macromer, but it will be referred to as a monomer herein since it forms a unit part of a polymer formed with the other reactive components of the polymerizable composition.

Examples of siloxane monomers can include monofunctional siloxane monomers having at least one urethane linkage, such as the examples of the monofunctional siloxane monomers represented by formula (4):

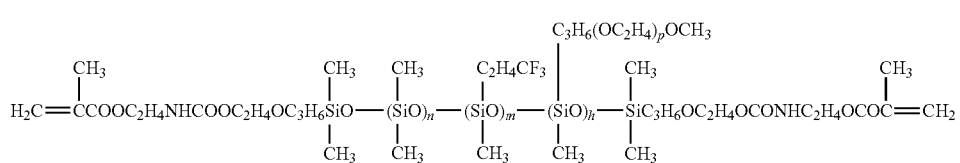

where n of formula (4) is 0-30, or is 10-15. In a particular example, the siloxane monomer can be the monomer of formula (4) where n of formula (4) is 12-13 and having a molecular weight of about 1,500 daltons. Examples of such monofunctional siloxane monomers described in U.S. Pat. No. 6,867,245, which is hereby incorporated by reference.

Examples of siloxane monomers can include bifunctional siloxane monomers having at least two urethane linkages, such as the examples of the bifunctional siloxane monomers represented by formula (5):

wherein n of formula (5) is an integer of about 100-150, m of formula (5) is an integer of about 5 to about 10, and h is an integer of about 2 to 8. Additional example of such bifunctional siloxane monomer, and methods of making compounds of formula (5) are described in U.S. Pat. No. 6,867,245, which is hereby incorporated by reference. In a particular example, the siloxane monomer can be a bifunctional siloxane monomer having two urethane linkages and having a molecular weight greater than 10,000 daltons, such as, for example, a molecular weight of greater than about 15,000 daltons.

The siloxane monomer can be a monofunctional siloxane monomer represented by formula (6):

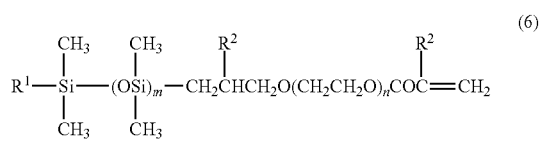

wherein m of formula (6) represents one integer from 3 to 10, n of formula (6) represents one integer from 1 to 10, $R^1$ of formula (6) is an alkyl group having from 1 to 4 carbon atoms, and each $R^2$ of formula (6) is independently either a hydrogen atom or a methyl group. In other words, on a single molecule of the siloxane monomer represented by formula 1, the first $R^2$ of formula (6), which is bonded to the $CH_2$ group adjacent to the siloxane group, can be either a hydrogen atom or a methyl group, and the second $R^2$ of formula (6), which is bonded to the C of the methacrylate end group, can also be either a hydrogen atom or a methyl group, regardless of whether the first $R^2$ of formula (6) is a hydrogen atom or a methyl group. In a particular example of the siloxane monomer of formula (6), m of formula (6) is 4, n of formula (6) is 1, $R^1$ of formula (6) is a butyl group, and each $R^2$ of formula (6) is independently either a hydrogen atom or a methyl group. The molecular weight of the siloxane monomer of formula (6) can be less than 2,000 daltons. In some examples, the molecular weight of the siloxane monomer of formula (6) is less than 1,000 daltons. Frequently, the molecular weight of the first siloxane mono-

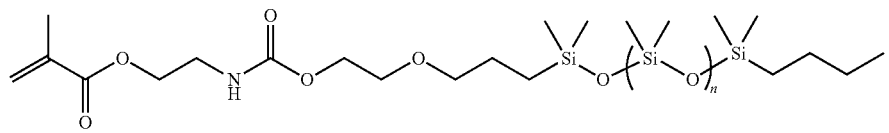

mer is from 400 to 700 daltons. Additional details of the siloxane monomer of formula (6) can be understood from US20090299022, the entire content of which is hereby incorporated by reference. As can be appreciated from formula (6), the first siloxane monomer has a single methacrylic functional end group.

The siloxane monomer can be a bifunctional siloxane monomer represented by formula (7):

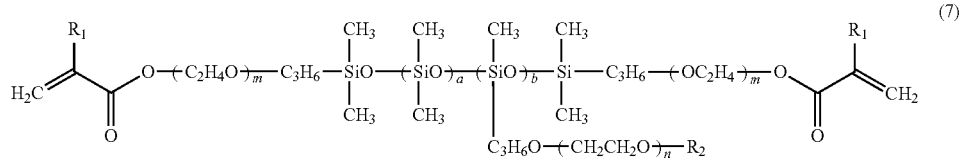

wherein $R_1$ of formula (7) is selected from either hydrogen atom or a methyl group; $R_2$ of formula (7) is selected from either of hydrogen atom or a hydrocarbon group having 1 to 4 carbon atoms; m of formula (7) represents an integer of from 0 to 10; n of formula (7) represents an integer of from 4 to 100; a and b represent integers of 1 or more; a+b is equal to 20-500; b/(a+b) is equal to 0.01-0.22; and the configuration of siloxane units includes a random configuration. In some examples in which the second siloxane monomer is a monomer represented by formula (7), m of formula (7) is 0, n of formula (7) is an integer from 5 to 15, a is an integer from 65 to 90, b is an integer from 1 to 10, $R_1$ of formula (7) is a methyl group, and $R_2$ of formula (7) is either a hydrogen atom or a hydrocarbon group having 1 to 4 carbon atoms. One example of such a second siloxane monomer as represented by formula (7) is abbreviated Si2 in the examples. In certain examples, the number average molecular weight for this second siloxane monomer represented by formula (7) is from about 9,000 daltons to about 10,000 daltons. In other examples, the second siloxane monomer represented by formula (7) is from about 5,000 daltons to about 10,000 daltons. It can be appreciated that the second siloxane represented by formula (7) is a bifunctional siloxane having two terminal methacrylic groups. Additional details of this second siloxane monomer can be found in US20090234089, the entire content of which is incorporated herein by reference.

The siloxane monomer can be a bifunctional siloxane monomer represented by formula (8):

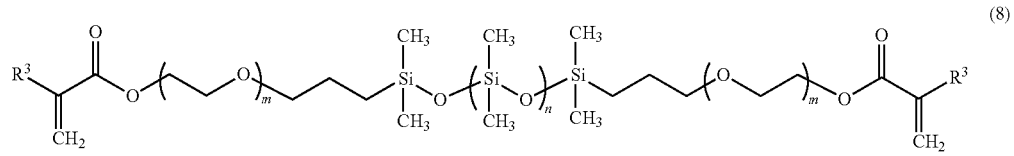

wherein $R^3$ is selected from either hydrogen atom or a methyl group, m of formula (8) represents an integer from 0 to 15, and n of formula (8) represents an integer from 1 to 500. In one example, the siloxane monomer is represented by formula (8), and $R^3$ is a methyl group, m of formula (8) is 0, and n of formula (8) is one integer from 40 to 60.

In another example, the siloxane monomer can be a bifunctional siloxane monomer represented by formula (9), and is abbreviated Si3 in the examples (available from Gelest, Inc., Morrisville, Pa. as product code DMS-R[18]):

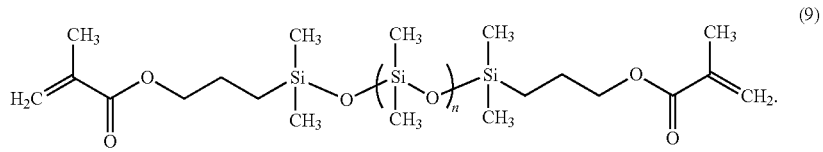

In certain examples, the siloxane of formula (9) has a number average molecular weight of about 4,000 to about 4,500 daltons.

In certain examples, the polymerizable composition can also comprise a second siloxane monomer. The second siloxane monomer can have more than one functional group, or can have a number average molecular weight of at least 3,000 daltons, or can have both more than one functional group and a number average molecular weight of at least 3,000 daltons. If the second siloxane monomer has two functional groups, such as two methacrylate groups, it is a bifunctional monomer. If the second siloxane monomer has three functional groups, it is a trifunctional monomer.

When the polymerizable composition comprises a first siloxane and a second siloxane, the first siloxane monomer and the second siloxane monomer can be present in amounts such that the ratio of the first siloxane monomer to the second siloxane monomer is at least 1:1 based on unit parts, or is at least 2:1 based on unit parts. For example, the first siloxane monomer and the second siloxane monomer can be present in the polymerizable composition in a ratio from about 2:1 to about 10:1 based on unit parts. In another example, the first siloxane monomer and the second siloxane monomer can be present in the polymerizable composition in a ratio from about 3:1 to about 6:1 based on unit parts. In one example, the first siloxane monomer and the second siloxane monomer can be present in the polymerizable composition in a ratio of about 4:1 based on unit parts.

When the polymerizable composition comprises at least one siloxane monomer, the total amount of siloxane monomers present in the polymerizable composition (e.g., the sum of the unit parts of the optional first siloxane monomer, the optional second siloxane monomer, and any other optional siloxane monomers present in the polymerizable composition) can be from about 10 to about 60 unit parts, or from about 25 to about 50 unit parts, or from about 35 to about 40 unit parts.

In one particular example, when the siloxane monomer component comprises a combination of at least two siloxane monomers each having a different molecular weight, the molecular weight of the first siloxane monomer can be less than 2,000 daltons. In some examples, the molecular weight of the first siloxane monomer can be less than 1,000 daltons. Frequently, the molecular weight of the first siloxane monomer is from 400 to 700 daltons.

When the at least one siloxane monomer is present in the polymerizable composition, as previously discussed, the at least one siloxane monomer can comprise a first siloxane monomer and a second siloxane monomer. In one example, the first siloxane monomer can consist of a siloxane monomer of formula (5) and the second siloxane monomer can consist of a siloxane monomer of formula (4). In another example, the first siloxane monomer can consist of a siloxane monomer of formula (4), and the second siloxane monomer con consist of a siloxane monomer of formula (5). In another example, the first siloxane monomer can consist of a siloxane monomer of formula (6), and the second siloxane can consist of a siloxane monomer of formula (7). In another example, the first siloxane monomer can consist of a siloxane monomer of formula (7), and the second siloxane monomer can consist of a siloxane monomer of formula (6). In another example, the first siloxane monomer can consist of a siloxane monomer of formula (4), and the second siloxane monomer can consist of a siloxane monomer of formula (7). In yet another example, the first siloxane monomer can consist of a siloxane monomer of formula (7), and the second siloxane monomer can consist of a siloxane monomer of formula (4). In any or all of the examples described herein, the siloxane monomer component can comprise a third siloxane monomer. For example, the third siloxane monomer can consist of a siloxane monomer of formula (8).

Optionally, the polymerizable compositions of the present disclosure can optionally comprise at least one non-silicon hydrophobic monomer. The hydrophobic monomer is understood to be a non-silicone polymerizable ingredient having only one polymerizable functional group present in its molecular structure. The at least one hydrophobic monomer of the polymerizable composition can be one hydrophobic monomer, or can comprise a hydrophobic monomer component composed of at least two hydrophobic monomers. Examples of hydrophobic monomers that can be used in the polymerizable compositions disclosed herein, include, without limitation, acrylate-containing hydrophobic monomers, or methacrylate-containing hydrophobic monomers, or any combination thereof. Examples of hydrophobic monomers include, without limitation, methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propyl methacrylate, or butyl acrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate, or trifluoroethyl methacrylate, or hexafluoroisopropyl methacrylate, or hexafluorobutyl methacrylate, or ethylene glycol methyl ether methacrylate (EGMA), or any combination thereof. In one particular example, the hydrophobic monomer or monomer component can comprise or consist of MMA, or EGMA, or both.

When present in the polymerizable composition, the hydrophobic monomer or monomer component can be present in an amount from about 5 to about 25 unit parts, or from about 10 to about 20 unit parts.

In one example, the hydrophobic monomer component can comprise at least two hydrophobic monomers each having different polymerizable functional groups. In another example, the hydrophobic monomer component can comprise at least two hydrophobic monomers each having the same polymerizable functional group. The hydrophobic monomer component can comprise or consist of two hydrophobic monomers, both having the same polymerizable functional group. In one example, the hydrophobic monomer component can comprise or consist of two hydrophobic methacrylate-containing monomers. The hydrophobic monomer component can comprise or consist of MMA and EGMA. In one example, the at least two hydrophobic monomers of the hydrophobic monomer component can comprise or consist of MMA and EGMA, and the ratio of the unit parts of MMA to the unit parts of EGMA present in the polymerizable composition can be from about 6:1 to about 1:1. The ratio of the unit parts of MMA and EGMA present in the polymerizable composition can be about 2:1 based on the unit parts of MMA to the unit parts of EGMA.

In accordance with the present disclosure, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer. Non-silicon cross-linking agents that can be used in the polymerizable compositions disclosed herein include, for example, without limitation, allyl(meth)acrylate, or lower alkylene glycol di(meth)acrylate, or poly(lower alkylene) glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth)acrylamide, or triallyl phthalate and diallyl phthalate, or any combination thereof. Cross-linking agents, as disclosed in Examples 1-37, include, for example, ethylene glycol dimethacrylate (EGDMA), or triethylene glycol dimethacrylate (TEGDMA), or triethylene glycol divinyl ether (TEGDVE), or any combination thereof. In one example, the cross-linking agent can have a molecular weight less than 1500 daltons, or less than 1000 daltons, or less than 500 daltons, or less than 200 daltons.

In one example, the cross-linking agent or cross-linking agent component can comprise or consist of a vinyl-containing cross-linking agent. As used herein, a vinyl-containing cross-linking agent is a monomer having at least two polymerizable carbon-carbon double bonds (i.e., at least two vinyl polymerizable functional groups) present in its molecular structure, where each of the at least two polymerizable carbon-carbon double bonds present in the vinyl polymerizable functional groups of the vinyl-containing cross-linking agent is less reactive than a carbon-carbon double bond present in an acrylate or methacrylate polymerizable functional group. Although carbon-carbon double bonds are present in acrylate and methacrylate polymerizable functional groups, as understood herein, cross-linking agents comprising one or more acrylate or methacrylate polymerizable group (e.g., an acrylate-containing cross-linking agent or a methacrylate-containing cross-linking agent) are not considered to be vinyl-containing cross-linking agents. Polymerizable functional groups having carbon-carbon double bonds which are less reactive than the carbon-carbon double bonds of acrylate or methacrylate polymerizable groups include, for example, vinyl amide, vinyl ester, vinyl ether and allyl ester polymerizable functional groups. Thus, as used herein, vinyl-containing cross-linking agents include, for example, cross-linking agents having at least two polymerizable functional groups selected from a vinyl amide, a vinyl ether, a vinyl ester, an allyl ester, and any combination thereof. As used herein, a mixed vinyl-containing cross-linking agent is a cross-linking agent having at least one polymerizable carbon-carbon double bond (i.e., at least one vinyl polymerizable functional group) present in its structure which is less reactive than the carbon-carbon double bond present in an acrylate or methacrylate polymerizable functional group, and at least one polymerizable functional group present in its structure having a carbon-carbon double bond which is at least as reactive as the carbon-carbon double bond in an acrylate or methacrylate polymerizable functional group.

When present in the polymerizable composition, the vinyl-containing cross-linking agent or cross-linking agent component can be present in an amount from about 0.01 unit parts to from about 2.0 unit parts, or from about 0.01 unit parts to about 0.80 unit parts, or from about 0.01 unit parts to about 0.30 unit parts, or from about 0.05 unit parts to about 0.20 unit parts, or in an amount of about 0.1 unit parts.

In one example, the cross-linking agent or cross-linking agent component can comprise or consist of a non-vinyl-containing cross-linking agent, i.e., a cross-linking agent which is not a vinyl-containing cross-linking agent. For example, the non-vinyl-containing cross-linking agent or cross-linking agent component can comprise or consist of an acrylate-containing cross-linking agent (i.e., a cross-linking agent having at least two acrylate polymerizable functional groups), or a methacrylate-containing cross-linking agent (i.e., at least two methacrylate polymerizable functional groups), or at least one acrylate-containing cross-linking agent and at least one methacrylate-containing cross-linking agent.

When present in the polymerizable composition, the non-vinyl cross-linking agent or cross-linking agent can be present in an amount from about 0.01 unit parts to about 5 unit parts, or from about 0.1 unit parts to about 4 unit parts, or from about 0.3 unit parts to about 3.0 unit parts, or from about 0.2 unit parts to about 2.0 unit parts.

The cross-linking agent component can comprise or consist of a combination of two or more cross-linking agents, each of which has a different polymerizable functional group. For example, the cross-linking agent component can comprise one vinyl-containing cross-linking agent, and one acrylate-containing cross-linking agent. The cross-linking agent component can comprise one vinyl-containing cross-linking agent and one methacrylate-containing cross-linking group. The cross-linking agent component can comprise or consist of one vinyl ether-containing cross-linking agent, and one methacrylate-containing cross-linking agent.

When the polymerizable composition comprises at least one cross-linking agent, the total amount of cross-linking agents (i.e., the total unit parts of all cross-linking agents present in the polymerizable composition) can be an amount from about 0.01 unit parts to about 5 unit parts, or from about 0.1 unit parts to about 4 unit parts, or from about 0.3 unit parts to about 3.0 unit parts, or from about 0.2 unit parts to about 2.0 unit parts, or from about 0.6 to about 1.5 unit parts.

In one example, when the present polymerizable composition comprises at least one vinyl-containing crosslinking agent, the total amount of vinyl-containing cross-linking agents present in the polymerizable composition can be an amount from about 0.01 unit parts to from about 2.0 unit parts, or from about 0.01 unit parts to about 0.80 unit parts, or from about 0.01 unit parts to about 0.30 unit parts, or from about 0.05 unit parts to about 0.20 unit parts, or in an amount of about 0.1 unit parts.

When the polymerizable composition comprises a first siloxane monomer and at least one cross-linking agent, the first siloxane monomer (e.g., a first siloxane monomer present as the only siloxane monomer of the polymerizable composition, or a first siloxane monomer present as part of a siloxane monomer component comprised of two or more siloxane monomers) and the at least one cross-linking agent (i.e., a single cross-linking agent or a cross-linking agent component composed of two or more cross-linking agents) can be present in the polymerizable composition in a ratio of at least 10:1 based on the total unit parts by weight of the first siloxane monomer to the total unit parts by weight of the at least one cross-linking agent (i.e., the sum of the unit parts of all vinyl-containing cross-linking agents present in the polymerizable composition). For example, the ratio can be at least 25:1 or at least 50:1 or at least 100:1 based on unit parts by weight.

In one example, the at least one cross-linking agent can comprise at least one vinyl-containing cross-linking agent, and at least one methacrylate-containing cross-linking agent. In another example, the at least one cross-linking agent can consist of only one or more vinyl-containing cross linking agents. In another example, the at least one cross-linking agent can comprise or consist of at least one vinyl ether-containing cross-linking agent. In yet another example, the at least one cross-linking agent can consist of only one or more vinyl-containing cross linking agents. In one particular example, the at least one cross-linking agent can comprise or consist of at least one vinyl ether-containing cross-linking agent.

When the at least one cross-linking agent comprises or consists of at least one vinyl-containing cross-linking agent (i.e., a single vinyl-containing cross-linking agent or a vinyl-containing cross-linking agent component composed of two or more vinyl-containing cross-linking agents), the first siloxane monomer and the at least one vinyl-containing cross-linking agent can be present in the polymerizable composition in a ratio of at least about 50:1 based on a ratio of a total number of unit parts of the first siloxane monomer to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

When the polymerizable composition comprises a first siloxane monomer and at least one additional siloxane monomer (i.e., a second siloxane, and optionally a third siloxane monomer, a fourth siloxane monomer, etc.) in combination with at least one cross-linking agent, the siloxane monomers and the at least one vinyl-containing monomer can be present in the polymerizable composition in a ratio of at least about 100:1 based on a ratio of a total number of unit parts of the each siloxane monomer present in the polymerizable composition (i.e., the sum of the unit parts of the first siloxane and the second siloxane monomer and, if present, the third siloxane monomer, etc.) to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

In one example, a total amount of siloxane monomers present in the polymerizable composition (i.e., the total unit parts of the first siloxane monomer, and, if present, a second siloxane monomer, and an at least one third siloxane monomer) can be an amount from about 30 to 45 unit parts, or from about 36 to 40 unit parts.

The polymerizable composition can optionally include one or more organic diluents, one or more polymerization initiators (i.e., ultraviolet (UV) initiators or thermal initiators, or both), or one or more UV absorbing agents, or one or more tinting agents, or one or more oxygen scavengers, or one or more chain transfer agents, or any combination thereof. These optional ingredients can be polymerizable or non-polymerizable ingredients. In one example, the polymerizable compositions can be diluent-free in that they do not contain any organic diluent to achieve miscibility between the siloxanes and the other lens forming ingredients, such as the optional hydrophilic monomers, hydrophobic monomer, and cross-linking agents. In addition, many of the present polymerizable compositions are essentially free of water (e.g., contain no more than 3.0% or 2.0% water by weight).

The polymerizable compositions disclosed herein can optionally comprise one or more organic diluents, i.e., the polymerizable composition can comprise an organic diluent, or can comprise an organic diluent component comprising two or more organic diluents. Organic diluents that can optionally be included in the present polymerizable compositions include alcohols, including lower alcohols, such as, for example, without limitation, pentanol, or hexanol, or octanol, or decanol, or any combination thereof. When included, the organic diluent or organic diluent component can be provided in the polymerizable composition in an amount from about 1 to about 70 unit parts, or from about 2 unit parts to about 50 unit parts, or from about 5 unit parts to about 30 unit parts.

The present polymerizable compositions can optionally comprise one or more polymerization initiators, i.e., the polymerizable composition can comprise an initiator, or can comprise an initiator component comprising two or more polymerization initiators. Polymerization initiators that can be included in the present polymerizable compositions include, for example, azo compounds, or organic peroxides, or both. Initiators that can be present in the polymerizable composition include, for example, without limitation, benzoin ethyl ether, or benzyl dimethyl ketal, or alpha,alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof. UV photoinitiators can include, for example, phosphine oxides such as diphenyl (2,4,6-trimethyl benzoyl)phosphine oxide, or benzoin methyl ether, or 1-hydroxycyclohexylphenyl ketone, or Darocur (available from BASF, Florham Park, N.J., USA), or Irgacur (also available from BASF), or any combination thereof. In many of Examples 1-37 disclosed herein, the polymerization initiator is the thermal initiator 2,2'-azobis-2-methyl propanenitrile (VAZO-64 from E.I. DuPont de Nemours & Co., Wilmington, Del., USA). Other commonly used thermoinitiators can include 2,2'-azobis(2,4-dimethylpentanenitrile) (VAZO-52) and 1,1'-azo bis(cyanocyclohexane) (VAZO-88). The polymerization initiator or initiator component can be present in the polymerizable composition in an amount from about 0.01 unit parts to about 2.0 unit parts, or in an amount from about 0.1 unit parts to about 1.0 unit parts, or from about 0.2 unit parts to about 0.6 unit parts by weight.

Optionally, the present polymerizable compositions can comprise one or more UV absorbing agents, i.e., the polymerizable composition can comprise an UV absorbing agent, or can comprise an UV absorbing agent component comprising two or more UV absorbing agents. UV absorbing agents that can be included in the present polymerizable compositions include, for example, benzophenones, or benzotriazoles, or any combination thereof. In many of Examples 1-37 disclosed herein, the UV absorbing agent is 2-(4-Benzoyl-3-hydroxyphenoxy)ethyl acrylate (UV-416) or 2-(3-(2H-benzotriazol-2-YL)-4-hydroxy-phenyl)ethyl methacrylate (NORBLOC® 7966 from Noramco, Athens, Ga., USA). The UV absorbing agent or UV absorbing agent component can be present in the polymerizable composition in an amount from about 0.01 unit parts to about 5.0 unit parts, or in an amount from about 0.1 unit parts to about 3.0 unit parts, or from about 0.2 unit parts to about 2.0 unit parts by weight.

The polymerizable compositions of the present disclosure can also optionally include at least one tinting agent (i.e., one tinting agent or a tinting agent component comprising two or more tinting agents), although both tinted and clear lens products are contemplated. In one example, the tinting agent can be a reactive dye or pigment effective to provide color to the resulting lens product. The tinting agent or tinting agent component of the polymerizable composition can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. The molecular structure of the tinting agent can comprise a beta sulfone functional group, or can comprise a triazine functional group. Tinting agents can include, for example, VAT Blue 6 (7,16-Dichloro-6,15-dihydroanthrazine-5,9,14, 18-tetrone), or 1-Amino-4-[3-(beta-sulfatoethylsulfonyl)anilio]-2-anthraquinonesulfonic acid (C. I. Reactive Blue 19, RB-19), or a monomer-dye compound of Reactive Blue 19 and hydroxyethylmethacrylate (RB-19 HEMA), or 1,4-bis[4[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis(2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-274, or RB-4 HEMA, or RB-19 HEMA, or any combination thereof. Examples of monomer-dye compounds include RB-4 HEMA and RB-19 HEMA. Additional examples of monomer-dye compounds are described in U.S. Pat. No. 5,944,853 and U.S. Pat. No. 7,216,975, both of which are incorporated in their entirety by reference herein. Other exemplary tinting agents are disclosed, for example, in U.S. Patent Application Publication No. 2008/0048350, the disclosure of which is incorporated in its entirety herein by reference. In many of Examples 1-37 disclosed herein, the tinting agent is a reactive blue dye, such as those described in U.S. Pat. No. 4,997,897, the disclosure of which is incorporated in its entirety herein by reference. Other suitable tinting agents for use in accordance with the present invention are phthalocyanine pigments such as phthalocyanine blue, or phthalocyanine green, or chromic-alumina-cobaltous oxide, or chromium oxides, or various iron oxides for red, yellow, brown and black colors, or any combination thereof. Opaquing agents such as titanium dioxide can also be incorporated. For certain applications, a combination of tinting agents having different colors can be employed as the tinting agent component. If employed, the tinting agent or tinting agent component can be present in the polymerizable composition in an amount ranging from about 0.001 unit parts to about 15.0 unit parts, or about 0.005 unit parts to about 10.0 unit parts, or about 0.01 unit parts to about 8.0 unit parts.

Chain transfer is a polymerization reaction in which the activity of a growing polymer chain is transferred to another molecule, reducing the average molecular weight of the final polymer. The polymerizable compositions of the present disclosure can optionally comprise at least one chain transfer agent, i.e., can comprise one chain transfer agent or can comprise a chain transfer agent component comprising at least two chain transfer agents. Examples of chain transfer agents which can be included as the chain transfer agent or the chain transfer component of the present polymerizable compositions include, for example, thiol compounds, or halocarbon compounds, or C3-C5 hydrocarbons, or any combination thereof. In many of Examples 1-37 disclosed herein, the chain transfer agent is allyloxy ethanol. When present in the polymerizable composition, the chain transfer agent or chain transfer agent component can be present in an amount from about 0.01 unit parts to about 1.5 unit parts, for example from about 0.1 unit parts to about 0.5 unit parts.

Various methods of measuring contact angles are known to those of ordinary skill in the art, including the captive bubble method. The contact angle can be a static or dynamic contact angle.

Silicone hydrogel contact lenses of the present invention can have captive bubble dynamic advancing contact angles of less than 120 degrees, such as, for example, less than 90 degrees when fully hydrated, less than 80 degrees when fully hydrated, less than 70 degrees when fully hydrated, or less than 65 degrees when fully hydrated, or less than 60 degrees when fully hydrated, or less than 50 degrees when fully hydrated.

Silicone hydrogel contact lenses of the present invention can have captive bubble static contact angles of less than 70 degrees when fully hydrated, or less than 60 degrees when fully hydrated, or less than 55 degrees when fully hydrated, or less than 50 degrees when fully hydrated, or less than 45 degrees when fully hydrated.

In accordance with the present disclosure, the silicone hydrogel contact lenses can have, when fully hydrated, equilibrium water contents (EWC)s from about 30 to about 70%. For example, the contact lenses can have an EWC from about 45% to about 65%, or from about 50% to about 63%, or from about 50% to about 67%, or from about 55% to about 65% by weight when fully hydrated. Methods of determining EWC are known to those of ordinary skill in the art, and can be based on weight loss from a lens during a drying process.

The present contact lenses can have an oxygen permeability (or Dk) of at least 55 barrers (Dk≥55 barrers), or an oxygen permeability of at least 60 barrers (Dk≥60 barrers), or an oxygen permeability of at least 65 barrers (Dk≥65 barrers). The lenses can have an oxygen permeability from about 55 barrers to about 135 barrers, or from about 60 barrers to about 120 barrers, or from about 65 barrers to about 90 barrers, or from about 50 barrers to about 75 barrers. Various methods of determining oxygen permeability are known to those of ordinary skill in the art.

The present contact lenses can have an oxygen permeability of at least 55 barrers (Dk≥55 barrers), or an EWC from about 30% to about 70%, or a captive bubble dynamic advancing contact angle less than 90 degrees, or a captive bubble static contact angle less than 70 degrees, or any combination thereof. In one example, the contact lenses can have an oxygen permeability of at least 60 barrers (Dk≥60 barrers), or an EWC from about 35% to about 65%, or a captive bubble dynamic advancing contact angle less than 70 degrees, or a captive bubble static contact angle less than 55 degrees, or any combination thereof. In another example, the present contact lenses can have an oxygen permeability of at least 65 barrers, or an EWC from about 45% to about 65%, or a captive bubble dynamic advancing contact angle less than 70 degrees, or a captive bubble static contact angle less than 55 degrees, or any combination thereof.

In one example, the present contact lenses have an oxygen permeability of at least 55 barrers, an EWC from about 30% to about 70%, a captive bubble dynamic advancing contact angle less than 70 degrees, and a captive bubble static contact angle less than 55 degrees.

In one example, the present contact lenses can have, when fully hydrated, an oxygen permeability of at least 55 barrers (Dk≥55 barrers), and a tensile modulus from about 0.2 MPa to about 0.9 MPa, and a captive bubble dynamic advancing contact angle less than 70 degrees, and a captive bubble static contact angle less than 55 degrees.

The silicone hydrogel contact lenses of the present disclosure can have, when fully hydrated, an average tensile modulus about 0.20 MPa to about 0.90 MPa. For example, the average modulus can be from about 0.30 MPa to about 0.80 MPa, or from about 0.40 MPa to about 0.75 MPa, or from about 0.50 MPa to about 0.70 MPa.

As used herein, the modulus of a contact lens or lens body is understood to refer to the tensile modulus, also know as Young's modulus. It is a measure of the stiffness of an elastic material. The tensile modulus can be measured using a method in accordance with ANSI Z80.20 standard. In one example, the tensile modulus can be measured using an Instron Model 3342 or Model 3343 mechanical testing system.

The silicone hydrogel contact lenses of the present disclosure can have, when fully hydrated, an average percentage of energy loss from about 25% to about 40%. For example, the average percentage of energy loss can be from about 27% to about 40%, or can be from about 30% to about 37%.

As used herein, percentage of energy loss is a measure of the energy lost as heat when energy loading and unloading cycles are applied to viscoelastic materials. Percentage of energy loss can be determined using a number of methods known to those of ordinary skill in the art. For example, the force involved in stretching a sample to 100% strain, and then returning it to 0% at a constant rate can be determined and used to calculate the percentage energy loss for the material.

The present contact lenses, when fully hydrated, can have an ionoflux less than about $8.0 \times 10^{-3}$ mm$^2$/min, or less than about $7.0 \times 10^{-3}$ mm$^2$/min, or less than about $5.0 \times 10^{-3}$ mm$^2$/min. Various methods of determining ionoflux are conventional and are known to those of ordinary skill in the art.

In one example, the present contact lenses can have a wet extractable component. The wet extractable component is determined based on the weight lost during methanol extraction of contact lenses which have been fully hydrated and sterilized prior to drying and extraction testing. The wet extractable component can comprise unreacted or partially reacted polymerizable ingredients of the polymerizable composition. The wet extractable component consists of organic solvent-extractable materials remaining in the lens body after the lens body has been fully processed to form a sterilized contact lens, for lenses formed from polymerizable compositions comprising non-polymerizable ingredients. For lenses extracted during manufacturing in either an extraction liquid comprising a volatile organic solvent or an extraction liquid free of an organic solvent, in most cases, substantially all of the non-polymerizable ingredients will have been removed from the lens body, and so the wet extractable component may consist essentially of extractable components formed from reactive polymerizable ingredients of the polymerizable composition, i.e., unreacted polymerizable components and partially reacted polymerizable ingredients. In lenses made from a polymerizable composition free of a diluent, the wet extractable component can be present in the contact lens in an amount from about 1% wt/wt to about 15% wt/wt, or from about 2% wt/wt to about 10% wt/wt, or from about 3% wt/wt to about 8% wt/wt based on the dry weight of the lens body prior to extraction testing. In lenses made from a polymerizable composition comprising a diluent, the wet extractable component may consist of a portion of the diluent as well as unreacted and partially reacted polymerizable ingredients, and can be present in the contact lens in an amount from about 1% wt/wt to about 20% wt/wt, or from about 2% wt/wt to about 15% wt/wt of the lens, or from about 3% wt/wt to about 10% wt/wt based on the dry weight of the lens body prior to extraction testing.

In one example, the present contact lenses have a dry extractable component. The dry extractable component is determined based on the weight lost during extraction in methanol of polymeric lens bodies which have not been washed, extracted (as part of a manufacturing process), hydrated or sterilized prior to the drying and extraction testing. The dry extractable component can comprise unreacted or partially reacted polymerizable ingredients of the polymerizable composition. When optional non-polymerizable ingredients such as diluents and the like are present in the polymerizable composition, the dry extractable component may further comprise the non-polymerizable ingredients.

In lenses made from a polymerizable composition free of a diluent, the dry extractable component of the lens consists primarily of dry extractable components contributed by polymerizable ingredients of the polymerizable composition (i.e., unreacted or partially reacted polymerizable ingredients), and may also include dry extractable materials contributed by optional non-polymerizable components present in the polymerizable composition in small amounts (e.g., less than 3% wt/wt), such as, for example, tinting agents, oxygen scavengers, and the like. In lenses made from a polymerizable composition free of a diluent, the dry extractable component can be present in the polymeric lens body in an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

In lenses made from a polymerizable composition comprising a large amount (e.g., more than 3% wt/wt) of an optional non-polymerizable ingredient such as a diluent, the dry extractable component consists of extractable materials contributed by reactive ingredients as well as extractable components contributed by non-polymerizable ingredients of the polymerizable composition. The total amount of dry extractable components contributed by reactive ingredients and non-polymerizable ingredients present in the contact lens can consist of an amount from about 1% wt/wt to about 75% wt/wt, or from about 2% wt/wt to about 50% wt/wt of the lens, or from about 3% wt/wt to about 40% wt/wt, or from about 4% wt/wt to about 20% wt/wt, or from about 5% to about 10% based on the dry weight of the polymeric lens body prior to extraction testing. The total amount of dry extractable components contributed by polymerizable ingredients (i.e., unreacted or partially reacted polymerizable ingredients) can be an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

It is also to be understood that reference to the contact lens formed from the compositions described herein is a lens body with an anterior surface and a posterior surface, the posterior surface being configured to be placed in contact with the cornea of an eye of a contact lens wearer. The lens body of the present invention can be entirely transparent. Alternatively, when the contact lens is a cosmetic lens configured to alter the appearance of an iris of a contact lens wearer, the lens body can comprise a transparent optic zone.

This invention is useful for contact lenses which, when worn, can be in contact with epithelial tissue or other eye tissues. This invention is useful for all known types of contact lenses, including both soft and rigid lens materials. In an example of the contact lens of the present invention, the contact lens is a lens with at least one optic zone configured to provide vision correction, to improve visual acuity, or to both provide vision correction and improve visual acuity. For example, the optic zone can be configured to provide a spherical correction, a toric correction, or a third order or higher correction. The optic zone can be configured to improve visual acuity at near viewing distances, at far viewing distances, or at both near and fax viewing distances. Other features and examples of the contact lenses of the present invention are illustrated in the following sections.

The present hydrogel contact lenses are vision correcting or vision enhancing contact lenses. The lenses may be spheric lenses or aspheric lenses. The lenses may be monofocal lenses or multifocal lenses, including bifocal lenses. In certain examples, the present lenses are rotationally stabilized lenses, such as a rotationally stabilized toric contact lens. A rotationally stabilized contact lens may be a contact lens that comprises a lens body that includes a ballast. For example, the lens body may have a prism ballast, a periballast, and/or one or more thinned superior and inferior regions.

The present lenses also comprise lens bodies that include a peripheral edge region. The peripheral edge region may include a rounded portion. For example, the peripheral edge region may comprise a rounded posterior edge surface, a rounded anterior edge surface, or a combination thereof. The peripheral edge can be completely rounded from the anterior surface to the posterior surface. Therefore, it can be understood that the lens body of the present lenses may comprise a rounded peripheral edge.

The contact lenses of the present disclosure, as they are configured to be placed or disposed on a cornea of an animal or human eye, are ophthalmically acceptable contact lenses. As used herein, an ophthalmically acceptable contact lens is understood to be a contact lens having at least one of a number of different properties as described below. An ophthalmically acceptable contact lens can be formed of, and packaged in, ophthalmically acceptable ingredients such that the lens is not cytotoxic and does not release irritating and/or toxic ingredients during wear. An ophthalmically acceptable contact lens can have a level of clarity in the optic zone of the lens (i.e., the portion of the lens providing vision correction) sufficient for its intended use in contact with the cornea of an eye, for example, a transmittance of at least 80%, or at least 90%, or at least 95% of visible light. An ophthalmically acceptable contact lens can have sufficient mechanical properties to facilitate lens handling and care for a duration of time based on its intended lifetime. For example, its modulus, tensile strength, and elongation can be sufficient to withstand insertion, wear, removal and, optionally, cleaning over the intended lifetime of the lens. The level of these properties which are appropriate will vary depending upon the intended lifetime and usage of the lens (e.g., single use daily disposable, multiple use monthly, etc). An ophthalmically acceptable contact lens can have an effective or appropriate ionoflux to substantially inhibit or substantially prevent corneal staining, such as corneal staining more severe than superficial or moderate corneal staining after continuous wear of the lens on a cornea for 8 or more hours. An ophthalmically acceptable contact lens can have a level of oxygen permeability sufficient to allow oxygen to reach the cornea of an eye wearing the lens in an amount sufficient for long term corneal health. An ophthalmically acceptable contact lens can be a lens which does not cause substantial or undue corneal swelling in an eye wearing the lens, for example, no more than about 5% or 10% corneal swelling after being worn on a cornea of an eye during an overnight sleep. An ophthalmically acceptable contact lens can be a lens which allows movement of the lens on the cornea of an eye wearing the lens sufficient to facilitate tear flow between the lens and the eye, in other words, does not cause the lens to adhere to the eye with sufficient force to prevent normal lens movement, and that has a low enough level of movement on the eye to allow vision correction. An ophthalmically acceptable contact lens can be a lens which allows wearing of the lens on the eye without undue or significant discomfort and/or irritation and/or pain. An ophthalmically acceptable contact lens can be a lens which inhibits or substantially prevents lipid and/or protein deposition sufficient to cause the lens wearer to remove the lens because of such deposits. An ophthalmically acceptable contact lens can have at least one of a water content, or a surface wettability, or a modulus or a design, or any combination thereof, that is effective to facilitate ophthalmically compatible wearing of the contact lens by a contact lens wearer at least for one day. Ophthalmically compatible wearing is understood to refer to the wearing of a lens by a lens wearer with little or no discomfort, and with little or no occurrence of corneal staining. Determining whether a contact lens is ophthalmically acceptable can be achieved using conventional clinical methods, such as those performed by an eye care practitioner, and as understood by persons of ordinary skill in the art.

In one example of the present disclosure, the contact lens can have ophthalmically acceptably wettable lens surfaces. For example, the contact lens can have the ophthalmically acceptably wettable lens surfaces when the polymerizable composition used to form the polymeric lens body is free of an internal wetting agent, or when the polymerizable composition used to form the polymeric lens body is free of an organic diluent, or when the polymeric lens body is extracted in water or an aqueous solution free of a volatile organic solvent, or when the polymeric lens body is free of a surface plasma treatment, or any combination thereof.

One approach commonly used in the art to increase the wettability of contact lens surfaces is to apply treatments to the lens surfaces or to modify the lens surfaces. In accordance with the present disclosure, the silicone hydrogel contact lenses can have ophthalmically acceptably wettable lens surfaces without the presence of a surface treatment or surface modification. Surface treatments include, for example, plasma and corona treatments which increase the hydrophilicity of the lens surface. While it is possible to apply one or more surface plasma treatments to the present lens bodies, it is not necessary to do so in order to obtain a silicone hydrogel contact lens having ophthalmically acceptably wettable lens surfaces when fully hydrated. In other words, in one example, the silicone hydrogel contact lenses of the present disclosure can be can be free of a surface plasma or corona treatment.

Surface modifications include binding wetting agents to the lens surface, such as, for example, binding a wetting agent such as a hydrophilic polymer to at least a lens surface by chemical bonding or another form of chemical interaction. In some cases, the wetting agent may be bound to the lens surface as well as at least a portion of the polymeric matrix of the lens, i.e., at least a portion of the bulk of the lens, by chemical bonding or another form of chemical interaction. The ophthalmically acceptably wettable lens surfaces of the present disclosure can be ophthalmically acceptably wettable without the presence of a wetting agent (e.g., a polymeric material or a non-polymeric material) bound to at least the lens surface. While it is possible to bind one or more wetting agents to the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, bound to a surface of the lens. Alternatively, in another example, the silicone hydrogel contact lenses of the present disclosure can be free of a wetting agent bound to the lens surface.

Another method of increasing lens wettability is to physically entrap a wetting agent within the lens body or contact lens, such as by introducing the wetting agent into the lens body when the lens body is swollen, and then returning the lens body to a less swollen state, thereby entrapping a portion of a wetting agent within the lens body. The wetting agent can be permanently trapped within the lens body, or can be released from the lens over time, such as during wear. The ophthalmically acceptably wettable lens surfaces of the present disclosure can be ophthalmically acceptably wettable without the presence of a wetting agent (e.g., a polymeric material or a non-polymeric material) physically entrapped in the lens body following formation of the polymeric lens body. While it is possible to physically entrap one or more wetting agents in the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, entrapped within the lenses. Alternatively, the hydrogel contact lenses of the present disclosure, for example the silicone hydrogel contact lenses of the present disclosure, can be free of a wetting agent physically entrapped within the lens. As used herein, physically entrapped refers to immobilizing a wetting agent, or other ingredient, in the polymeric matrix of the lens with little or no chemical bonding or chemical interaction being present between the wetting agent and or other ingredient and the polymeric matrix. This is in contrast to ingredients that are chemically bound to the polymeric matrix, such as by ionic bonds, covalent bonds, van der Waals forces, and the like.

Another approach commonly used in the art to increase the wettability hydrogel contact lenses, for example silicone hydrogel contact lenses, includes adding one or more wetting agents to the polymerizable composition. In one example, the wetting agent can be a polymeric wetting agent. However, the contact lenses of the present disclosure can have ophthalmically acceptably wettable lens surfaces when the polymerizable composition used to form the polymeric lens body is free of a wetting agent. While it is possible to include one or more wetting agents in the present polymerizable compositions to increase the wettability of the hydrogel contact lenses of the present disclosure, it is not necessary to do so in order to obtain a hydrogel contact lens having ophthalmically acceptably wettable lens surfaces. In other words, in one example, the hydrogel contact lenses of the present disclosure can be formed from polymerizable compositions free of wetting agents. Alternatively, in another example, the polymerizable compositions of the present invention can further comprise a wetting agent.

In one example, the wetting agent can be an internal wetting agent. The internal wetting agent can be bound within at least a portion of the polymeric matrix of the lens. For example, the internal wetting agent can be bound within at least a portion of the polymeric matrix of the lens by chemical bonding or another form of chemical interaction. In some cases, the wetting agent may be bound to the lens surface as well. The internal wetting agent can comprise a polymeric material or a non-polymeric material. While it is possible to bind one or more internal wetting agents within the polymeric matrix of the present lenses, it is not necessary to do so in order to obtain a hydrogel contact lens having ophthalmically acceptably wettable lens surfaces when fully hydrated. Thus, in one example, the lenses of the present disclosure can comprise internal wetting agents bound to at least a portion of the polymeric matrix of the lens. Alternatively, in another example, the hydrogel contact lenses of the present disclosure can be free of an internal wetting agent bound to at least a portion of the polymeric matrix of the lens.

In another example, the wetting agent can be an internal polymeric wetting agent. The internal polymeric wetting agent can be present in the polymeric lens body as part of an interpenetrating polymer network (IPN) or a semi-IPN. An interpenetrating polymer network is formed by at least two polymers, each of which is crosslinked to itself, but none of which are crosslinked to each other. Similarly, a semi-IPN is formed by at least two polymers, at least one of which is crosslinked to itself but not to the other polymer, and the other of which is not crosslinked either to itself or the other polymer. In one example of the present disclosure, the contact lens can have ophthalmically acceptably wettable lens surfaces when the polymeric lens body is free of an internal polymeric wetting agent present in the lens body as an IPN or a semi-IPN. Alternatively, the contact lens can comprise an internal polymeric wetting agent present in the lens body as an IPN or a semi-IPN.

In yet another example, the wetting agent can be a linking compound present in the polymerizable composition used to form the lens body, or a linking agent physically entrapped within the polymeric lens body after the lens body has been formed. When the wetting agent is a linking compound, after polymerization of the lens body or entrapment of the linking agent in the polymeric lens body, the linking compound can subsequently link a second wetting agent to the lens body when the lens body is contacted by the wetting agent. The linking can occur as part of the manufacturing process, for example as a washing process, or can take place when the lens body is contacted by a packaging solution. The linking can take the form of an ionic bond, or a covalent bond, or a form of van der Waals attraction. The linking agent can comprise a boronic acid moiety or group such that a polymerized boronic acid moiety or group is present in the polymeric lens body, or such that a boronic acid moiety or group is physically entrapped in the polymeric lens body. For example, when the linking agent comprises a form of boronic acid, the second wetting agent can comprise a form of poly(vinyl alcohol) which becomes bound to the form of boronic acid. Optionally, silicone hydrogel contact lenses of the present disclosure can be understood to be free of linking agents. In one example, the silicone hydrogel contact lenses can be free of boronic acid moieties or groups, including polymerized boronic acid moieties or groups, that is, specifically, the silicone hydrogel contact lenses can be formed from a polymerizable composition free of a form of boronic acid such as, for example, a polymerizable form of boronic acid including vinyl phenyl boronic acid (VPB), can be formed of a polymer free of units derived from a polymerizable form of boronic acid such as vinyl phenyl boronic acid (VPB), and the polymeric lens body and the silicone hydrogel contact lenses can be free of a form of boronic acid, including polymeric or non-polymeric form of boronic acid, physically entrapped therein. Alternatively, the polymerizable composition, or the polymeric lens body, or the hydrogel contact lens, or any combination thereof, can comprise at least one linking agent.

In addition to including wetting agents in the polymerizable composition and modifying the lens surfaces, washing polymeric lens bodies in volatile organic solvents or aqueous solutions of volatile organic solvent has been used to increase the wettability of lens surfaces, particularly silicone hydrogel contact lens surfaces. While it is possible to wash the present polymeric lens bodies in a volatile organic solvent or an aqueous solution of a volatile organic solvent, in accordance with the present disclosure, it is not necessary to do so in order to obtain a hydrogel contact lens having ophthalmically acceptably wettable lens surfaces when fully hydrated. In other words, in one example, the hydrogel contact lenses of the present invention have not been exposed to a volatile organic solvent, including a solution of a volatile organic solvent, as part of a manufacturing process. In one example, the hydrogel contact lenses of the present invention can be formed from a polymerizable composition free of a wetting agent, or the polymeric lens body and/or hydrated contact lens can be free of a wetting agent, or free of surface treatment, or free of a surface modification, or was not exposed to a volatile organic solvent during the manufacturing process, or any combination thereof. Instead, for example, the hydrogel contact lenses can be washed in washing liquid free of a volatile organic solvent, such as, for example, water or an aqueous solution free of a volatile organic solvent, including liquids free of a volatile lower alcohol.

The use of volatile organic solvents to extract lens bodies contributes significantly to production costs, due to factors such as the cost of the organic solvents, the cost of disposal of the solvents, the need to employ explosion-proof production equipment, the need to remove the solvents from the lenses prior to packaging, and the like. However, development of polymerizable compositions capable of consistently producing contact lenses with ophthalmically acceptably wettable lens surfaces when extracted in aqueous liquid free of volatile organic solvents can be challenging. For example, it is common to find non-wetting regions present on the lens surfaces of contact lenses which have been extracted in aqueous liquid free of volatile organic solvents.

As previously discussed, in one example of the present disclosure, the contact lenses are contact lenses which have not been exposed to a volatile organic solvent, such as a lower alcohol, during their manufacture. In other words, the washing, extraction and hydration liquid used for such lenses, as well as all liquids used during wet demolding, or wet delensing, or washing, or any other manufacturing step, are all free of volatile organic solvents. In one example, the polymerizable composition used to form these lenses which are not contacted by a volatile organic solvent can comprise a hydrophilic vinyl-containing monomer or monomer component, such as, for example, a hydrophilic vinyl ether-containing monomer. The vinyl-containing hydrophilic monomer or monomer component can include, for example, VMA. The vinyl ether-containing monomers can include, for example, BVE, or EGVE, or DEGVE, or any combination thereof. In one particular example, the vinyl ether-containing monomer can be a vinyl ether-containing monomer which is more hydrophilic than BVE, such as, for example, DEGVE. In another example, the hydrophilic monomer component of the polymerizable composition can be a mixture of a first hydrophilic monomer which is a vinyl-containing monomer but which is not a vinyl ether-containing monomer, and a second hydrophilic monomer which is a vinyl ether-containing monomer. Such mixtures include, for example, mixtures of VMA and one or more vinyl ethers such as, for example, BVE, or DEGVE, or EGVE, or any combination thereof.

When present, the hydrophilic vinyl ether-containing monomer or monomer component can be present in the polymerizable composition in an amount from about 1 to about 15 unit parts, or from about 3 to about 10 unit parts. When present as a mixture with a hydrophilic vinyl-containing monomer which is not a vinyl ether, the portion of the hydrophilic vinyl-containing monomer or monomer component which is not a vinyl ether and the hydrophilic vinyl ether-containing monomer or monomer component can be present in the polymerizable composition in a ratio of at least 3:1, or from about 3:1 to about 15:1, or of about 4:1 based on the ratio of the unit parts by weight of the hydrophilic vinyl-containing monomer or monomer component which is not a vinyl ether to the unit parts by weight of the hydrophilic vinyl ether-containing monomer or monomer component.

Another approach for producing contact lenses having ophthalmically acceptably wettable lens surfaces in accordance with the present disclosure, particularly lenses extracted in a liquid free of a volatile organic solvent and including lenses which are not contacted by a volatile organic solvent during manufacturing, can be to limit the amount of a vinyl-containing cross-linking agent or cross-linking agent component included in the polymerizable composition. For example, a vinyl-containing cross-linking agent or cross-linking agent component can be present in the polymerizable composition in an amount from about 0.01 to about 0.80 unit parts, or from 0.01 to about 0.30 unit parts, or from about 0.05 to about 0.20 unit parts, or in an amount of about 0.1 unit parts. In one example, a vinyl-containing cross-linking agent or cross-linking agent component can be present in the polymerizable composition in an amount effective to produce a contact lens having improved wettability as compared to a contact lens produced from the same polymerizable composition but having an amount of the vinyl-containing cross-linking agent or cross-linking agent component greater than about 2.0 unit parts, or greater than 1.0 unit parts, or greater than about 0.8 unit parts, or greater than about 0.5 unit parts, or greater than about 0.3 unit parts.

While limiting the amount of the vinyl-containing cross-linking agent or cross-linking agent component can improve wettability, in one example, the inclusion of a vinyl-containing cross-linking agent or cross-linking agent component in the polymerizable composition can improve the dimensional stability of the resulting contact lens formed from the polymerizable composition. Thus, in some polymerizable compositions, a vinyl-containing cross-linking agent or cross-linking agent component can be present in the polymerizable in an amount effective to produce a contact lens having improved dimensional stability as compared to a contact lens produced from the same polymerizable composition but without the vinyl-containing cross-linking agent or cross-linking agent component.

Yet another approach for producing contact lenses having ophthalmically acceptably wettable surfaces in accordance with the present disclosure, particularly lenses washed in a liquid free of a volatile organic solvent, can be to include an amount of a vinyl-containing cross-linking agent or cross-linking agent component in the polymerizable composition based on the ratio of the unit parts by weight of the hydrophilic vinyl-containing monomer or monomer component present in the composition to the unit parts by weight of the vinyl-containing cross-linking agent or cross-linking agent component present in the composition. For example, the total unit parts of the hydrophilic vinyl-containing monomer or monomer component and the total unit parts of the vinyl-containing cross-linking agent or cross-linking agent component can be present in the polymerizable composition in a ratio greater than about 125:1, or from about 150:1 to about 625:1, or from about 200:1 to about 600:1, or from about 250:1 to about 500:1, or from about 450:1 to about 500:1, based on the ratio of the unit parts by weight of all the hydrophilic vinyl-containing monomers present in the polymerizable composition to the total unit parts by weight of all the vinyl-containing cross-linking agents present in the polymerizable composition.

In one example, the contact lenses of the present disclosure are ophthalmically compatible silicone hydrogel contact lenses. Many different criteria can be evaluated to determine whether or not a contact lens is ophthalmically compatible, as will be discussed later. In one example, ophthalmically acceptable contact lenses have ophthalmically acceptably wettable surfaces when fully hydrated. A silicone hydrogel contact lens having an ophthalmically acceptably wettable surfaces can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye.

An example of the disclosed polymerizable composition can be miscible when initially prepared, and can remain miscible over a period of time adequate for the commercial manufacture of contact lenses, such as, for example, for about 2 weeks, or about 1 week, or about 5 days. Typically, when polymerized and processed into contact lenses, miscible polymerizable compositions result in contact lenses having ophthalmically acceptable clarities.

Approaches commonly employed to increase the miscibility of hydrophilic monomers and less hydrophilic or relatively hydrophobic monomers, including siloxane monomers, include adding organic diluents to the polymerizable composition to act as compatiblizers between the more hydrophilic monomers and the less hydrophilic monomers. For example, siloxane monomers which typically are more hydrophobic. Also, when using siloxane monomers, using only siloxane monomers having low molecular weights (e.g., molecular weights below 2500 daltons) can also increase the miscibility. In one example where the polymerizable composition comprises a first siloxane and a second siloxane monomer, the use of a first siloxane of formula (6) as described above makes it possible to both include both an optional high molecular weight second siloxane and a high level of the at least one hydrophilic monomer in the polymerizable compositions of the present disclosure. And while it is possible to include one or more organic diluents in the present polymerizable compositions disclosed herein, it may not be necessary to do so in order to obtain a miscible polymerizable composition in accordance with the present disclosure. In other words, in one example, the hydrogel contact lenses of the present disclosure are formed from polymerizable compositions which are free of an organic diluent.

The present hydrogel contact lenses may be provided in a sealed package. For example, the present hydrogel contact lenses may be provided in sealed blister packs or other similar containers suitable for delivery to lens wearers. The lenses may be stored in an aqueous solution, such as a saline solution, within the package. Some suitable solutions include phosphate buffered saline solutions and borate buffered solutions. The solutions may include a disinfecting agent if desired, or may be free of a disinfecting or preservative agent. The solutions may also include a surfactant, such as a poloxamer and the like, if desired.

The lenses in the sealed packages are preferably sterile. For example, the lenses can be sterilized prior to sealing the package or can be sterilized in the sealed package. The sterilized lenses may be lenses that have been exposed to sterilizing amounts of radiation. For example, the lenses may be autoclaved lenses, gamma radiated lenses, ultraviolet radiation exposed lenses, and the like.

With respect to the contact lens package, the package can further comprise a base member with a cavity configured to hold the contact lens body and the packaging solution, and a seal attached to the base member configured to maintain the contact lens and the packaging solution in a sterile condition for a duration of time equivalent to a shelf life of the contact lens.

Certain specific examples of silicone hydrogel contact lenses will now be described, in accordance with the present teachings.

As one example (example A), a silicone hydrogel contact lens comprises a polymeric lens body that is the reaction product of a polymerizable composition comprising at least one hydrophilic monomer, at least one phosphine-containing compound, and at least one siloxane monomer. In one example, the at least one monomer comprises a first siloxane monomer represented by formula (6), wherein m of formula (6) represents one integer from 3 to 10, n of formula (6) represents one integer from 1 to 10, $R^1$ is an alkyl group having from 1 to 4 carbon atoms, and each $R^2$ of formula (6) is independently either a hydrogen atom or a methyl group.

As a second example (example B), a silicone hydrogel contact lens comprises a polymeric lens body that is the reaction product of a polymerizable composition as described in example A, and wherein the polymerizable further comprises a second siloxane monomer. In one example, the first siloxane monomer and the second siloxane monomer can be present in a ratio of at least 2:1 based on the unit parts by weight of the first siloxane monomer to the unit parts by weight of the second siloxane monomer present in the polymerizable composition.

As a third example (example C), a silicone hydrogel contact lens comprises a polymeric lens body that is the reaction product of a polymerizable composition as described in example A or B, and wherein the polymerizable composition further comprises a hydrophobic monomer or monomer component. For example, the hydrophilic monomer can comprise or consist of methyl methacrylate (MMA), or of EGMA, or any combination thereof.

As a fourth example (example D), a silicone hydrogel contact lens comprises a polymeric lens body that is the reaction product of a polymerizable composition as described in example A or B or C, and wherein the polymerizable composition further comprises a vinyl-containing cross-linking agent or cross-linking agent component. In one example, the cross-linking agent or cross-linking agent component can comprise or consist of a vinyl ether-containing cross-linking agent or cross-linking agent component, specifically the cross-linking agent or cross-linking agent component can comprise or consist of triethylene glycol divinyl ether (TEGVE).

As a fifth example (example E), a silicone hydrogel contact lens comprises a polymeric lens body that is the reaction product of a polymerizable composition as described in example A or B or C or D, and wherein the polymerizable composition further comprises a thermal initiator or thermal initiator component.

As a sixth example (example F), a silicone hydrogel contact lens comprises a polymeric lens body that is the reaction product of a polymerizable composition as described in example A or B or C or D or E, and wherein the at least one hydrophilic monomer comprises a hydrophilic monomer component comprising a first hydrophilic monomer and a second hydrophilic monomer. In one example, the first hydrophilic monomer can comprise a hydrophilic amide-containing monomer, and the second hydrophilic monomer can comprise a vinyl ether-containing monomer.

As a seventh example (example G), a silicone hydrogel contact lens comprises a polymeric lens body that is the reaction product of a polymerizable composition as described in example A or B or C or D or E or F, and wherein the polymerizable composition further comprises a UV absorbing agent or UV absorbing agent component.

As a eighth example (example H), a silicone hydrogel contact lens comprises a polymeric lens body that is the reaction product of a polymerizable composition as described in example A or B or C or D or E or F or G, and wherein the polymerizable composition further comprises a tinting agent or tinting agent component.

As an ninth example (example I), a silicone hydrogel contact lens comprises a polymeric lens body that is the reaction product of a polymerizable composition as described in example A or B or C or D or E or F or G or H, and wherein the polymerizable composition comprises a siloxane monomer represented by formula (5), wherein $R_1$ of formula (5) is selected from either hydrogen atom or a methyl group; $R_2$ of formula (5) is selected from either of hydrogen or a hydrocarbon group having 1 to 4 carbon atoms; m of formula (5) represents an integer of from 0 to 10; n of formula (5) represents an integer of from 4 to 100; a and b represent integers of 1 or more; a+b is equal to 20-500; b/(a+b) is equal to 0.01-0.22; and the configuration of siloxane units includes a random configuration. As one example, the siloxane monomer can be represented by formula (5), wherein m of formula (5) is 0, n of formula (5) is one integer from 5 to 10, a is one integer from 65 to 90, b is one integer from 1 to 10, $R_1$ of formula (5) is a methyl group, and $R_2$ of formula (5) is either a hydrogen atom or a hydrocarbon group having 1 to 4 carbon atoms.

As a tenth example (example J), a silicone hydrogel contact lens comprises a polymeric lens body that is the reaction product of a polymerizable composition as described in example A or B or C or D or E or F or G or H or I, and wherein the polymerizable composition further comprises a methacrylate-containing cross-linking agent or cross-linking agent component, specifically the cross-linking agent or agent component can comprise or consist of ethylene glycol dimethacrylate (EGDMA). In this example, when the polymerizable composition also comprises a vinyl ether-containing cross-linking agent as part of the cross-linking agent component, specifically the cross-linking agent component can comprise or consist of triethylene glycol divinyl ether (TGDVE) in combination with a methacrylate-containing cross-linking agent, which can specifically comprise or consist of ethylene glycol dimethacrylate (EGDMA). In this example, it can be appreciated that the polymerizable composition comprises two cross-linking agents, each having different reactivity ratios, i.e., the polymerizable composition comprises a cross-linking agent component comprising or consisting of a vinyl-containing cross-linking agent and a methacrylate-containing cross-linking agent, the methacrylate-containing cross-linking agent having polymerizable functional groups which are more reactive and which thus react at a faster rate than the vinyl polymerizable functional groups present in the vinyl-containing cross-linking agent.

As an eleventh example (example K), a silicone hydrogel contact lens comprises a polymeric lens body that is the reaction product of a polymerizable composition as described in example A or B or C or D or E or F or G or H or I or J, and wherein the polymerizable composition further comprises a chain transfer agent or chain transfer agent component which can specifically comprise or consist of allyloxy ethanol (AE).

As a twelfth example (example L), a silicone hydrogel contact lens comprises a polymeric lens body that is the reaction product of a polymerizable composition as described in example A or B or C or D or E or F or G or H or I or J or K, and wherein the at least one hydrophilic monomer comprises a hydrophilic vinyl ether-containing monomer or monomer component, for example, the hydrophilic vinyl ether-containing monomer or monomer component can comprise or consist of 1,4-butanediol vinyl ether (BVE), or ethylene glycol vinyl ether (EGVE), or diethylene glycol vinyl ether (DEGVE), or any combination thereof.

As a thirteenth example (example M), a silicone hydrogel contact lens comprises a polymeric lens body that is the reaction product of a polymerizable composition as described in example A or B or C or D or E or F or G or H or I or J or K or L, wherein the contact lens has the ophthalmically acceptably wettable lens surfaces when the polymerizable composition used to form the lens is free of an internal wetting agent, or when the polymerizable composition used to form the polymeric lens body is free of an organic diluent, or when the polymeric lens body is extracted in a liquid free of a volatile organic solvent, or when the lens is free of a surface plasma treatment, or any combination thereof.

In any or each of the foregoing examples A-M, as well as any or all other examples disclosed herein, the amount of the first siloxane monomer can be from 20 to 45 unit parts of the polymerizable composition. The amount of the first siloxane monomer can be from 25 to 40 unit parts of the polymerizable composition. The amount of the first siloxane monomer can be from 27 to 35 unit parts of the polymerizable composition.

In any or each of the foregoing examples A-M, as well as any or all other examples disclosed herein, the amount of the optional second siloxane monomer can be from 1 to 20 unit parts of the polymerizable composition. The amount of the second siloxane monomer can be from 2 to 15 unit parts of the polymerizable composition. The amount of the second siloxane monomer can be from 5 to 13 unit parts of the polymerizable composition. In another example, the ratio of the unit parts of the first siloxane monomer to the second siloxane can be at least 1:1, or at least 2:1.

In any or each of the foregoing examples A-M, as well as any or all other examples disclosed herein, the amount of the hydrophilic monomer or monomer component present in the polymerizable composition can be from 1 to 60 unit parts of the polymerizable composition. The hydrophilic monomer component can constitute from 4 to 60 unit parts of the polymerizable composition. When the hydrophilic monomer comprises or consists of VMA, it can be present in an amount from 30 unit parts to 60 unit parts. VMA can be present in the polymerizable composition in an amount from about 40 unit parts to about 50 unit parts. When the hydrophilic monomers, N,N-dimethylacrylamide (DMA), 2-hydroxyethyl methacrylate (HEMA), or 2-hydroxylbutyl methacrylate (HOB), or any combination thereof are present in the polymerizable composition as the hydrophilic monomer in the hydrophilic monomer component, each or all can be present in amounts from about 3 to about 10 unit parts.

In any or each of the foregoing examples A-M as well as any or all other examples disclosed herein, the amount of the hydrophobic monomer or monomer component present in the polymerizable composition can be from 1 to 30 unit parts of the polymerizable composition. For example, the total amount of hydrophobic monomer or monomer component can be from about 5 to about 20 unit parts of the polymerizable composition. In polymerizable compositions in which the hydrophobic monomer MMA is present as the hydrophobic monomer or as part of the hydrophobic monomer component, the MMA can be present in an amount from about 5 to about 20 unit parts, or from about 8 to about 15 unit parts.

In any or each of the foregoing examples A-M, as well as any or all other examples disclosed herein, the amount of the cross-linking agent or cross-linking agent component present in the polymerizable composition can be from 0.01 to 4 unit parts of the polymerizable composition. TEGDVE can be present in amounts from 0.01 to 1.0 unit parts. EGDMA can be present in amounts from 0.01 to 1.0 unit parts. TEGDMA can be present in amounts from 0.1 to 2.0 unit parts. Each of these non-silicon cross-linking agents can be present alone or in any combination in the polymerizable composition.

In any or each of the foregoing examples A-M as well as any or all other examples disclosed herein, when the polymerizable composition contains EGMA, BVE, DEGVE, EGVE, or any combination thereof, they are each present in amounts from 1 unit part to 20 unit parts of the polymerizable composition. EGMA can be present in an amount from about 2 unit parts to about 15 unit parts. BVE can be present in an amount from 1 unit part to about 15 unit parts. BVE can be present in an amount from about 3 unit parts to about 0.7 unit parts. DEGVE can be present in an amount from 1 unit part to about 15 unit parts. DEGVE can be present in an amount from about 7 unit parts to about 10 unit parts. EGVE can be present in an amount from 1 unit part to about 15 unit parts, or in an amount from about 3 unit parts to about 7 unit parts.

In any or each of the foregoing examples A-M, as well as any or all other examples disclosed herein, the other optional components, such as initiators or initiator component, tinting agents or tinting agent components, UV absorbing agents or UV absorbing agent components, chain transfer agents or chain transfer agent components, can each be present in amounts from about 0.01 unit parts to about 3 unit parts. An initiator or initiator component can be present in the polymerizable in an amount from 0.1 unit parts to 1.0 unit parts. When a thermal initiator or thermal initiator component is present, such as Vazo-64, it can be present in an amount from about 0.3 to about 0.5 unit parts. Tinting agents or tinting agent components can be present in amounts from 0.01 unit parts to 1 unit part. When reactive dyes are used as tinting agents or as part of a tinting agent component, such as Reactive Blue 246 or Reactive Blue 247, they can each be present in amounts of about 0.01 unit parts. UV absorbing agents or UV absorbing agent components can be present in amounts from 0.1 unit parts to 2.0 unit parts. For example, the UV absorbing agent UV1 described in the Examples 1-37 below can be present in an amount from about 0.8 to about 1.0 unit parts, such as 0.9 unit parts; or the UV absorbing agent UV2 described in the Examples 1-37 below, can be present in an amount from 0.5 unit parts to 2.5 unit parts, such as from about 0.9 unit parts to about 2.1 unit parts. Oxygen scavengers or oxygen scavenger components can be present in amounts from 0.1 unit parts to 1.0 unit parts. As an example, when triphenyl phosphine (TPP) or diphenyl(P-vinylphenyl)phosphine (pTPP) or any combination thereof is used as the phosphine-containing compound in the polymerizable composition, each or the combination can be present in an amount from 0.3 unit parts to 0.7 unit parts, such as about 0.5 unit parts. Chain transfer reagents or chain transfer reagent components can be present in the polymerizable composition in an amount from 0.1 unit parts to 2.0 unit parts, and in many of Examples 1-37 below is present in an amount from 0.2 unit parts to 1.6 unit parts. For example, the chain transfer reagent allyloxy ethanol (AE) can be present in an amount from about 0.3 to about 1.4 unit parts.

In any or each of the foregoing examples A-M, as well as any or all other examples disclosed herein, the silicone hydrogel contact lenses can be free of a wetting agent that is present in the polymerizable composition, or in the polymeric lens body, or in the silicone hydrogel contact lens. Similarly, the silicone hydrogel contact lens can have lens surfaces that are free of a surface treatment or a surface modification. However, in another example, the silicone hydrogel contact lens can include at least one wetting agent (i.e., a single wetting agent or two or more wetting agents present as a wetting agent component) in the polymerizable composition, in the polymeric lens body, or in the silicone hydrogel contact lens. The silicone hydrogel contact lens can have treated or modified lens surfaces. In addition or alternatively, any or each of the foregoing examples A-M, as well as any or all other examples of silicone hydrogel contact lenses disclosed herein, the contact lenses can be understood to be free of a linking agent such as, for example, a form of boronic acid.

In another example, new polymerizable compositions are provided, including each and every polymerizable composition described herein in reference to the silicone hydrogel contact lenses and methods. The polymerizable compositions can be diluent-free in that they do not contain an organic solvent, such as alcohols and the like, which can help reduce phase separation of the polymerizable composition. However, such diluent-free polymerizable compositions can still contain one or more chain transfer agents, such as allyloxy ethanol. However, if desired, the polymerizable composition can include a diluent or a diluent component, which can be present in an amount from 1 to 20 unit parts.

As described herein, the present hydrogel contact lenses which comprise polymeric lens bodies that comprise units derived from the at least one hydrophilic monomer, including silicone hydrogel contact lenses that comprise units derived from the at least one hydrophilic monomer and at least one siloxane monomer; when fully hydrated, have an average equilibrium water content (EWC) from about 30% wt/wt to about 70% wt/wt, or an average oxygen permeability of at least 55 barrers, or an average captive bubble dynamic advancing contact angle less than 70 degrees, or an average captive bubble static contact angle less than 55 degrees, or any combination thereof, based on averages of values determined for at least 20 individual lenses of the batch. Thus, the present disclosure also relates to a batch of hydrogel contact lenses.

As used herein, a batch of hydrogel contact lenses refers to a group of two or more hydrogel contact lenses, and frequently, a batch refers to at least 10, or at least 100, or at least 1,000 hydrogel contact lenses. In accordance with the present disclosure, a batch of hydrogel contact lenses comprises a plurality of any of the hydrogel contact lenses described herein, including the silicone hydrogel contact lenses described herein.

In one example, the hydrogel contact lenses of the batch can have an average axial edge lift (AEL) variance based on averaging the AEL measurements of a representative number of lenses from the batch at different time points. For a batch of lenses, an average AEL variance of less than plus or minus one hundred percent (±100%), or of less than plus or minus fifty percent (±50%), or of less than twenty percent (±20%) over a time period from two weeks to seven years at room temperature or, when stored under accelerated shelf life testing conditions, for a period of time and temperature equivalent to storage from two weeks to seven years at room temperature, may be considered to be acceptable. In one example, accelerated shelf life testing conditions which are especially useful in determining average AEL variance are for 4 weeks at 70 degrees C., although other periods of time and temperature can be used. The average AEL variance is determined by averaging the AEL values for each of the representative lenses using the actual AEL measurements of the representative lenses before ($AEL_{Initial}$) and following ($AEL_{Final}$) storage at room temperature or under accelerated shelf life conditions. The average AEL variability is determined using the following equation (A):

$$((AEL_{Final} - AEL_{Initial})/AEL_{Initial}) \times 100 \quad (A).$$

On average, the AELs of the hydrogel contact lenses of the batch vary by less than twenty percent in either direction of a target value, or less than ten percent in either direction of a target value, or less than five percent in either direction of a target value. As one example, if a contact lens has a target AEL of 20 µm±50%, the present batch of hydrogel contact lenses will have an average AEL from 10 µm to 30 µm over the course of the shelf life study. A representative number of lenses tested from the batch can be 20 or more individual lenses.

In accelerated shelf life studies, the lens properties such as AEL or color value can be determined for contact lenses that were stored for a period of time at an elevated temperature, such as above 40 degrees C., such as 50 degrees C., or 55 degrees C., or 65 degrees C., or 70 degrees C., or 80 degrees C., or 95 degrees C., and the like. Or, the lens properties can be determined for contact lenses that were stored for a period of time at room temperature (e.g., about 20-25 degrees C.).

For accelerated shelf life studies, the following formula can be used to determine the number of months of storage at a particular temperature that are equivalent to storage of the desired length of time at room temperature:

$$\text{Desired shelf life} = [N \times 2y] + n \quad (B)$$

where

N=number of months of storage under accelerated conditions

2y=acceleration factor y=2.0 for each 10° C. above room temperature (25° C.), for storage at or above 45° C.

y=1.0 for each 10° C. above room temperature (25° C.), for storage from 35° C. to 45° C.

n=age of lenses (in months) at start of the study

Based on this equation, the following storage times have been calculated: 6 months of storage at 35 degrees C. is equivalent to 1 year aging at 25 degrees C., 3 months of storage at 45 degrees C. is equivalent to 1 year of aging at 25 degrees C., 3 months of storage at 55 degrees C. is equivalent to 2 years of aging at 25 degrees C., and 3 months of storage at 65 degrees C. is equivalent to 4 years of aging at 25 degrees C.

In one example, the batch comprises a batch of hydrogel contact lenses comprising a plurality of the hydrogel contact lenses in accordance with the present disclosure, wherein the batch of hydrogel contact lenses has at least two average values selected from an average oxygen permeability of at least 55 barrers, an average tensile modulus from about 0.2 MPa to about 0.9 MPa when fully hydrated, and an average EWC from about 30% wt/wt to about 70% wt/wt; based on averages of values determined for at least 20 individual lenses of the batch.

In one example, when initially tested shortly after manufacturing and then tested again at a later time point, a batch of lenses can exhibit a change in its average physical dimensions. As batches of lenses in accordance with the present disclosure are dimensionally stable, they can exhibit an acceptable level of change in their average physical dimensions. As used herein, dimensional stability variance is understood to refer to a variance in a value of a physical dimension between a value of the physical dimension determined when the batch of lenses is initially tested shortly after its manufacture, and the value of the physical dimension determined when the batch of lenses is tested again at a later time point. The later time point can be, for example, from at least 2 weeks after the initial time point, to up to 7 years after the initial time point. The silicone hydrogel contact lenses of the batch have an average dimensional stability variance of less than plus or minus three percent (±3.0%) based on averaging the lens diameter measurements of a representative number of lenses from the batch, such as, for example, 20 lenses from the batch. For a batch of lenses, an average dimensional stability variance of less than plus or minus three percent (±3.0%), where the average dimensional stability variance is the variance in a value of a physical dimension when measured at an initial time point within one day of a manufacturing date of the batch of lenses, and at a second time point, where the second time point is from two weeks to seven years after the initial time point when the batch is stored at room temperature, or, when the batch is stored at a higher temperature (i.e., under accelerated shelf life testing conditions), the second time point is a time point representative of storage of the batch from two weeks to seven years at room temperature, is considered to be a dimensionally stable batch. In one example, accelerated shelf life testing conditions which are especially useful in determining average dimensional stability variance are for 4 weeks at 70 degrees C., although other periods of time and other temperatures can be used. The average dimensional stability variance is determined by averaging the individual dimensional stability variances for each of the representative lenses using the actual diameters of representative lenses measured initially ($Diameter_{Original}$) and the actual diameters of representative lenses measured following ($Diameter_{Final}$) storage at room temperature or under accelerated shelf life conditions. The representative lenses measured initially and the representative lenses measured following storage can be the same lenses or can be different lenses. As used herein, the average dimensional stability variance is represented as a percent (%). The individual dimensional stability variances are determined using the following equation (C):

$$((Diameter_{Final} - Diameter_{Original})/Diameter_{Original}) \times 100 \quad (C).$$

On average, the diameters of the silicone hydrogel contact lenses of the batch vary by less than three percent in either direction of a target value (±3.0%). As one example, if a contact lens has a target diameter (chord diameter) of 14.20 mm, the present batch of hydrogel contact lenses will have an average diameter (average of the population in the batch) from 13.77 mm to 14.63 mm. In one example, the dimensional stability variance is less than plus or minus two percent (±2.0%). As one example, if a contact lens has a target diameter (chord diameter) of 14.20 mm, the present batch of hydrogel contact lenses will have an average diameter (average of the population in the batch) from 13.92 mm to 14.48 mm. Preferably, the average diameter of the batch of hydrogel contact lenses does not vary by more than plus or minus 0.20 mm from the target diameter, which is commonly from 13.00 mm to 15.00 mm.

In accelerated shelf life studies, the average dimensional stability variance can be determined for contact lenses that were stored for a period of time at an elevated temperature, such as above 40 degrees C., including, for example, 50 degrees C., or 55 degrees C., or 65 degrees C., or 70 degrees C., or 80 degrees C., or 95 degrees C., and the like. Or, the average dimensional stability can be determined for contact lenses that were stored for a period of time at room temperature (e.g., about 20-25 degrees C.).

Another example of the present disclosure provides methods of manufacturing hydrogel contact lenses. In accordance with the present teachings, the method comprises providing a polymerizable composition.

The method can also comprise a step of polymerizing the polymerizable composition to form a polymeric lens body. The step of polymerizing the polymerizable composition can be conducted in a contact lens mold assembly. The polymerizable composition can be cast molded between molds formed of a thermoplastic polymer. The thermoplastic polymer used to form the molding surfaces of the mold can comprise a polar polymer, or can comprise a non-polar polymer. Alternatively, the polymerizable composition can be formed into a lens via various methods known to those of ordinary skill in the art, such as spin casting, injection molding, forming a polymerized rod that is subsequently lathed to form a lens body, etc.

The polymerization of the polymerizable composition can be initiated thermally or using light, such as using ultraviolet (UV) light. In some examples, the polymerization can be conducted in an atmosphere comprising air, or in an inert atmosphere.

The method can also comprise contacting the polymeric lens body with a washing liquid to remove extractable material, such as unreacted monomers, uncross-linked materials that are otherwise not physically immobilized in the polymeric lens body, diluents, and the like. The washing liquid can be a liquid free of a volatile organic solvent, or can comprise a volatile organic solvent (e.g., can be a volatile organic solvent or a solution of a volatile organic solvent).

The contacting can be effective to remove at least a portion of phosphine-containing or phosphine oxide-containing components from the polymeric lens body. As previously discussed, the washing liquid can be water or an aqueous solution free of a volatile organic solvent, or can be an organic solvent or a solution of an organic solvent. Alternatively, in some examples, the method does not comprise a step of contacting the polymeric lens body with a washing liquid or any liquid, i.e., where the polymeric lens body is not contacted with any liquid prior to being placed into a blister package with packaging solution and sealed.

The method can be a method not comprising a washing step involving the use of a washing liquid comprising a volatile organic solvent, i.e., where the polymeric lens body is contacted by a washing liquid, but is not contacted with a washing liquid comprising a volatile organic solvent, and is not contacted by a volatile organic solvent prior to being placed into a blister package with packaging solution and sealed.

In methods including a step of contacting the lens body with a washing liquid, the step of contacting the polymeric lens body with a washing liquid can be understood to be an extraction step because extractable materials are removed from the polymeric lens body. In some methods, the contacting step comprises contacting the polymeric lens body with a washing liquid comprising a volatile organic solvent, such as a liquid containing a primary alcohol, such as methanol, ethanol, n-propyl alcohol, and the like. Some washing liquid may contain a secondary alcohol, such as isopropyl alcohol, and the like. Using a washing liquid containing one or more volatile organic solvents can be helpful in removing hydrophobic materials from the polymeric lens body, and thus may increase the wettability of the lens surfaces. Such methods may be understood to be alcohol-based extraction steps. In other methods, the contacting step comprises contacting the polymeric lens body with an aqueous washing liquid that is free of a volatile organic solvent. Such methods may be understood to be aqueous extractions steps. Examples of aqueous washing liquid that can be used in such methods include water, such as deionized water, saline solutions, buffered solutions, or aqueous solutions containing surfactants or other non-volatile ingredients that may improve the removal of hydrophobic components from the polymeric contact lens bodies, or may reduce distortion of the polymeric contact lens bodies, compared to the use of deionized water alone. In one example, when washed using a washing liquid free of volatile organic solvents, the surfaces of the lens bodies of the present disclosure have ophthalmically acceptable wettable surfaces.

In some examples, the polymeric lens body can be exposed to an oxidizing step to oxidize the phosphine-containing compound present in the polymeric lens body. The oxidizing step can be effective to oxidize the majority of the phosphine-containing compound present in the polymeric lens body, or to oxidize the majority of the phosphine-containing compound present on the surface of the lens body. The oxidizing step can comprise exposing the polymeric lens body to hydrogen peroxide, such as, for example, hydrogen peroxide gas or an aqueous solution of hydrogen peroxide or a solution of hydrogel peroxide free of a lower alcohol. For some phosphine-containing compounds, such as, for example, TPP, the oxidized form (the phosphine oxide) has greater aqueous solubility than the non-oxidized form. For formulations containing these forms of phosphine-containing compounds, it can be helpful to expose the polymeric lens bodies to an oxidizing agent prior to exposing the lens bodies to a washing step, in order to increase the amount of phosphine-containing compound extracted from the lens bodies (by extracting the phosphine-containing compound in its oxide form).

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and are sealed and sterilized. The packaging solution used to package the silicone hydrogel contact lenses of the present disclosure can comprise a wetting agent to increase wettability of the lens surfaces. However, it will be understood that the lens surfaces of the silicone hydrogel contact lenses of the present disclosure have ophthalmically acceptable wettable surfaces prior to contact with a packaging solution comprising a wetting agent, and the use of a wetting agent in the packaging solution is only to increase the wettability of the already ophthalmically acceptable wettable surfaces, and thus is not needed to provide the contact lens with an ophthalmically acceptable wettable surface.

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and can be sealed and sterilized.

In accordance with the present disclosure, the polymeric lens body can be packaged along with a contact lens packaging solution in a contact lens package, such as a blister pack or glass vial. Following packaging, the package can be sealed and the polymeric lens body and the contact lens packaging solution can be sterilized, for example, by autoclaving the sealed package, to produce a silicone hydrogel contact lens product.

The present method can further comprise repeating the steps to produce a plurality of the hydrogel contact lenses. The present method can further comprise manufacturing a batch of hydrogel contact lenses.

EXAMPLES

The following Examples 1-37 illustrate certain aspects and advantages of the present invention, which should be understood not to be limited thereby.

The following chemicals are referred to in Examples 1-37, and may be referred to by their abbreviations.

Si1: 2-propenoic acid, 2-methyl-, 2-[3-(9-butyl-1,1,3,3,5,5,7,7,9,9-decamethylpentasiloxane-1-yl)propoxy]ethyl ester (CAS number of 1052075-57-6). (Si1 was obtained from Shin-Etsu Chemical Co., Ltd. (Japan) as product number X-22-1622).

Si2: α,ω-Bis(methacryloxypropyl)-poly(dimethyl siloxane)-poly(w-methoxy-poly(ethylenegylcol)propylmethylsiloxane) (the synthesis of this compound can be performed as described in US20090234089)

Si3: Poly(dimethyl siloxane), methacryloxypropyl terminated (CAS number 58130-03-3; DMS-R18 available from Gelest, Morrisville, Pa.)

Si4: SiGMA: 3-methacryloxy-2-hydroxypropyloxy)propylbis(trimethylsiloxy) methylsilane (available from Gelest, Morrisville, Pa.)

Si5: TRIS: 3-[Tris(trimethylsilyloxy)silyl]propyl methacrylate

Si6: MCS-M11: A monomethacryloxypropyl terminated polydimethylsiloxane (Gelest, Morrisville, Pa., USA).

VMA: N-vinyl-N-methylacetamide (CAS number 003195786)

DMA: N,N-dimethylacrylamide (CAS number 2680-03-7)

HEMA: 2-hydroxyethyl methacrylate (CAS number 868-77-9)

HOB: 2-hydroxylbutyl methacrylate (CAS number 29008-35-3)

EGMA: Ethylene glycol methyl ether methacrylate (CAS number 6976-93-8)

MMA: Methyl methacrylate (CAS number 80-62-6)

EGDMA: Ethylene glycol dimethacrylate (CAS number 97-90-5)

TEGDMA: triethylene glycol dimethacrylate (CAS number 109-16-0)

BVE: 1,4-butanediol vinyl ether (CAS number 17832-28-9)

DEGVE: diethylene glycol vinyl ether (CAS number 929-37-3)

EGVE: ethylene glycol vinyl ether (CAS number 764-48-7)

TEGDVE: triethylene glycol divinyl ether (CAS number 765-12-8)

AE: 2-Allyloxy ethanol (CAS number 111-45-5)

V-64: 2,T-Azobis-2-methyl propanenitrile (CAS number 78-67-1)

UV1: 2-(4-benzoyl-3-hydroxyphenoxy)ethyl acrylate (CAS number 16432-81-8)

UV2: 2-(3-(2H-benzotriazol-2-YL)-4-hydroxy-phenyl) ethyl methacrylate (CAS number 96478-09-0)

RBT1: 1,4-Bis[4-(2-methacryloxyethyl)phenylamino]anthroquinone (CAS number 121888-69-5)

RBT2: 1,4-Bis[(2-hydroxyethyl)amino]-9,10-anthracenedione bis(2-propenoic)ester (CAS Reg. No. 109561071)

TPP: Triphenyl phosphine (CAS number 603-35-0)

pTPP: polymerizable TPP: diphenyl(P-vinylphenyl)phosphine (CAS number 40538-11-2)

Hydrogel Contact Lens Fabrication and Testing Procedure

The chemical compounds set forth in Examples 1-37 were, for each example, weighed out in amounts corresponding to the described unit parts, and combined to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions, or as used herein, polymerizable compositions. In Examples 1-37, the listed amounts of ingredients are given as unit parts of the polymerizable composition by weight.

A volume of the polymerizable composition was cast molded by placing the composition in contact with a lens defining surface of a female mold member. In all of the following Examples 1-37, the molding surface of the female mold member was formed of a non-polar resin, specifically polypropylene. A male mold member was placed in contact with the female mold member to form a contact lens mold assembly comprising a contact lens shaped cavity containing the polymerizable composition. In the following Examples 1-37, the molding surface of the male mold member was formed of a non-polar resin, specifically polypropylene.

Contact lens mold assemblies were placed in a nitrogen flushed oven to allow the precursor compositions to thermally cure. For all of Examples 1-37, the contact lens mold assemblies were exposed to temperatures of at least about 55° C. for about 2 hours. Examples of curing profiles which can be used to cure silicone hydrogel contact lenses described herein include exposing the contact lens mold assemblies to temperatures of 55° C. for 40 minutes, 80° C. for 40 minutes, and 100° C. for 40 minutes. Other contact lenses can be made with the same curing profile, but instead of the first temperature being at 55° C., it can be at 65° C.

After polymerizing the polymerizable compositions, the contact lens mold assemblies were demolded to separate the male and female mold members. The polymeric lens body remained adhered to the male mold or the female mold. A dry demolding process where the mold assembly is not contacted with a liquid medium can be used, or a wet demolding process where the mold assembly is contacted with a liquid medium such as, for example, water or an aqueous solution, can be used. A mechanical dry demolding process can involve applying mechanical force to a portion of one or both of the mold members in order to separate the mold members. In all of the following Examples 1-37, a dry demolding process was used.

The polymeric lens body was then delensed from the male mold or female mold to produce a delensed polymeric lens body. In one example of a delensing method, the polymeric lens body can be delensed from the male mold member using a dry delensing process, such as by manually peeling the lens from the male mold member or by compressing the male mold member and directing a gas toward the male mold member and the polymeric lens body, and lifting the dry polymeric lens body with a vacuum device from the male mold member, which is discarded. In other methods, the polymeric lens body can be delensed using a wet delensing process by contacting the dry polymeric lens body with a liquid releasing medium, such as water or an aqueous solution. For example, a male mold member with the attached polymeric lens body can be dipped into a receptacle containing a liquid until the polymeric lens body separates from the male mold member. Or, a volume of liquid releasing medium can be added to the female mold to soak the polymeric lens body in the liquid and to separate the lens body from the female mold member. In the following Examples 1-37, a dry delensing process was used. Following separation, the lens body can be lifted from the mold member manually using tweezers or using a vacuum device and placed into a tray.

The delensed lens product was then washed to remove extractable materials from the polymeric lens body, and hydrated. Extractable materials included polymerizable components such as, for example, monomers, or cross-linking agents, or any optional polymerizable ingredients such as tints or UV blockers, or combinations thereof, present in the polymerizable composition which remain present in the polymeric lens body in an unreacted form, in a partially reacted form, or in an uncross-linked form, or any combination thereof, following polymerization of the lens body and prior to extraction of the lens body. Extractable materials may have also included any non-polymerizable ingredients present in the polymerizable composition, for example, any optional non-polymerizable tinting agents, or UV blockers, or diluents, or chain transfer agent, or any combination thereof, remaining present in the polymeric lens body following polymerization of the polymeric lens body but prior to extraction of the polymeric lens body.

In another method, such as a method involving delensing by compression of the male mold member and directing gas flow toward the male mold member, the delensed polymerized contact lens bodies can be placed in cavities of lens carriers or trays where the delensed polymeric lens bodies can then be contacted with one or more volumes of an extraction liquid, such as an aqueous extraction liquid free of a volatile organic solvent, for example deionized water or an aqueous solution of a surfactant such as Tween 80, or an organic solvent-based extraction liquid such as ethanol, or an aqueous solution of a volatile organic solvent such as ethanol.

In other methods, such as those involving wet delensing by contacting the mold and lens with a liquid releasing medium, the delensed polymerized contact lens bodies can be washed to remove extractable components from the lens bodies using a washing liquid that is free of a volatile organic solvent, such as a lower alcohol, for example, methanol, ethanol, or any combination thereof. For example, the delensed polymerized contact lens bodies can be washed to remove extractable components from the lens bodies by contacting the lens bodies with aqueous washing liquid free of a volatile organic solvent, such as, for example, deionized water, or a surfactant solution, or a saline solution, or a buffer solution, or any combination thereof. The washing can take place in the final contact lens package, or can take place a in washing tray or a washing tank.

In the following Examples 1-37, following the dry demolding and dry delensing steps, the dry delensed lens bodies were placed in cavities of trays, and the delensed polymeric lens bodies were extracted and hydrated by contacting the polymeric lens bodies with one or more volumes of extraction liquid. The extraction and hydration liquid used in the extraction and hydration process consisted of either a) a combination of volatile organic solvent-based extraction liquid and volatile organic solvent-free hydration liquid, or b) volatile organic solvent-free extraction and hydration liquid, i.e., entirely aqueous-based extraction and hydration liquid. Specifically, in Examples 1-5 below, the extraction and hydration process comprised at least two extraction steps in separate portions of ethanol, followed by at least one extraction step in a portion of a 50:50 wt/wt ethanol:water solution of Tween 80, followed by at least three extraction and hydration steps in separate portions of a solution of Tween 80 in deionized water, wherein each extraction or extraction and hydration step lasted from about 5 minutes to 3 hours. In Examples 6-25 below, the extraction and hydration process used comprised at least three extraction and hydration steps in separate portions of a solution of Tween 80 in deionized water, wherein the temperature of the Tween 80 solution of the portions ranged from room temperature to about 90 degrees C., and wherein each extraction and hydration step lasted from about 15 minutes to about 3 hours.

Washed, extracted and hydrated lenses were then placed individually in contact lens blister packages with a phosphate buffered saline packaging solution. The blister packages were sealed and sterilized by autoclaving.

Following sterilization, lens properties such as contact angle, including dynamic and static contact angle, oxygen permeability, ionoflux, modulus, elongation, tensile strength, water content, and the like were determined, as described herein.

For the present contact lenses, contact angles including dynamic and static contact angles, can be determined using routine methods known to persons of ordinary skill in the art. For example, the advancing contact angle and receding contact angle of the contact lenses provided herein can be measured using a conventional drop shape method, such as the sessile drop method or captive bubble method.

In the following Examples 1-37, the advancing and receding contact angle of silicone hydrogel contact lenses was determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated by reference herein.

As an example, the advancing contact angle and receding contact angle was be determined using a captive bubble method using phosphate buffered saline (PBS; pH=7.2). The lens was flattened onto a quartz surface and rehydrated with PBS for at least 10 minutes before testing. An air bubble was placed onto a lens surface using an automated syringe system. The size of the air bubble was increased and decreased to obtain the receding angle (the plateau obtained when increasing the bubble size) and the advancing angle (the plateau obtained when decreasing the bubble size).

The modulus, elongation, and tensile strength values of the present lenses can be determined using routine methods known to persons of ordinary skill in the art, such as, for example, a test method in accordance with ANSI Z80.20. The modulus, elongation, and tensile strength values reported herein were determined by using an Instron Model 3342 or 3343 mechanical testing system (Instron Corporation, Norwood, Mass., USA) and Bluehill Materials Testing Software, using a custom built rectangular contact lens cutting die to prepare the rectangular sample strip. The modulus, elongation and tensile strength were determined inside a chamber having a relative humidity of least 70%. The lens to be tested was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

The percent energy loss of the present silicone hydrogel contact lenses can be determined using routine methods known to persons of ordinary skill in the art. For the following Examples 1-37, the percent energy loss was determined using an Instron Model 3343 (Instron Corporation, Norwood, Mass., USA) mechanical testing system, with a 10N force transducer (Instron model no. 2519-101) and Bluehill Materials Testing Software including a TestProfiler module. The energy loss was determined inside a chamber having a relative humidity of least 70%. Before testing, each lens was soaked in phosphate buffered solution (PBS) for at least 10 minutes. Using tweezers, the lens was loaded into the grips of the calibrated Instron apparatus, with the lens loaded vertically between the grips as symmetrically as possible so that the lens fit over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished, energy loss was calculated using the following equation: Lost Energy (%)=(Energy to 100% strain−Energy to return to 0% strain)/Energy to 100% strain×100%.

The ionoflux of the present lenses can be determined using routine methods known to persons of ordinary skill in the art. For the lenses of the following Examples 1-37, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes. The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35 degrees C., measurements of conductivity were taken every 2 minutes for at least 10 minutes. The conductivity versus time data was substantially linear, and was used to calculate the ionoflux value for the lenses tested.

The oxygen permeability (Dk) of the present lenses can be determined using routine methods known to persons of ordinary skill in the art. For example, the Dk value can be determined using a commercially available instrument under the model designation of MOCON® Ox-Tran System (Mocon Inc., Minneapolis, Minn., USA), for example, using the Mocon Method, as described in U.S. Pat. No. 5,817,924, which is incorporated by reference herein. The Dk values of the lenses of the following Examples 1-37 were determined using the method described by Chhabra et al. (2007), *A single-lens polarographic measurement of oxygen permeability (Dk) for hypertransmissible soft contact lenses*. Biomaterials 28: 4331-4342, which is incorporated by reference herein.

The equilibrium water content (EWC) of the present lenses can be determined using routine methods known to persons of ordinary skill in the art. For the lenses of the following Examples 1-37 a hydrated silicone hydrogel contact lens was removed from an aqueous liquid, wiped to remove excess surface water, and weighed. The weighed lens was then dried in an oven at 80 degrees C. under a vacuum, and the dried lens was then weighed. The weight difference was determined by subtracting the weight of the dry lens from the weight of the hydrated lens. The water content (%) is the (weight difference/hydrated weight)×100.

The percentage of the wet extractable component or dry extractable component in a lens can be determined by extracting the lenses in an organic solvent in which the polymeric lens body is not soluble in accordance to methods known to those of ordinary skill in the art. For the lenses of the following Examples 1-37, an extraction in methanol using a Sohxlet extraction process was used. For determination of the wet extractable component, a sample (e.g., at least 5 lenses per lot) of fully hydrated and sterilized contact lenses was prepared by removing excess packaging solution from each lens and drying them overnight in an 80° C. vacuum oven. For determination of the dry extractable component, a sample of polymeric lens bodies which had not been washed, extracted, hydrated or sterilized was prepared by drying the lens bodies overnight in an 80° C. vacuum oven. When dried and cooled, each lens was weighed to determine its initial dry weight (W1). Each lens was then placed in a perforated, stackable Teflon thimble, and the thimbles were stacked to form an extraction column with an empty thimble placed at the top of the column. The extraction column was placed into a small Sohxlet extractor attached to a condenser and a round bottom flask containing 70-80 ml methanol. Water was circulated through the condenser and the methanol was heated until it gently boiled. The lenses were extracted for at least 4 hours from the time condensed methanol first appeared. The extracted lenses were again dried overnight at 80° C. in a vacuum oven. When dried and cooled, each lens was weighed to obtain the dry weight of the extracted lens (W2), and the following calculation was made for each lens to determine the percent wet extractable component: [(W1−W2)/W1]×100.

Examples 1-28

Table 1 lists the ingredients of polymerizable compositions 1-14. Table 2 lists the ingredients of polymerizable compositions 15-28. Polymerizable compositions 1-28 were prepared as described in the Hydrogel Contact Lens Fabrication and Testing Procedure given above, and were used to prepare and test hydrogel contact lenses as described in the Hydrogel Contact Lens Fabrication and Testing Procedure. All of the lenses prepared in Examples 1-28 were manually dry demolded and delensed. With the exception of polymerizable composition 1, all of the polymerizable compositions include a phosphine-containing component (either TPP or pTPP).

Table 3 shows the lens properties for lenses formed using polymerizable compositions 1-14 when initially manufactured. Table 4 shows the lens properties for lenses formed using polymerizable compositions 15-28 when initially manufactured. Hydrogel contact lenses formed from polymerizable compositions 2-28 had acceptable lens properties when initially manufactured, as shown in Tables 3 and 4.

The hydrogel contact lenses formed from polymerizable compositions 2-28 also had acceptable shape retention and color value both when initially manufactured and after storage for at least 1 month at room temperature, and at least 2 weeks at elevated temperatures. For example, lenses of formulations 2, 3, and 4 had acceptable shape retention after being stored for at least 20 days at 95 degrees C. Lenses of formulations 5, 6, 7, 8, 11, 12, 14, 15, 16, 18, 19, 20, 24 and 25 had acceptable shape retention after being stored for at least 14 days at 80 degrees C. Lenses of formulation 9 had acceptable shape retention after being stored for at least 6 days at 95 degrees C. Lenses of formulation 10 and 13 had acceptable shape retention after being stored for at least 7 days at 80 degrees C. Lenses of formulation 17, 21, 22, and 23 had acceptable shape retention after being stored for at least 4.4 weeks at 80 degrees C.

TABLE 1

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Si1 | 30 | 30 | 30 | 30 | 30 | 32 | 32 | 23 | 23 | 26 | 26 | 26 | 26 | 26 |
| Si2 |  |  |  | 10 | 10 |  |  | 15 | 15 | 10 | 10 | 10 | 10 | 10 |
| Si3 | 3 | 3 | 3 |  |  | 4 | 4 |  |  |  |  | 2 |  | 2 |
| VMA | 45 | 45 | 45 | 45 | 48 | 40 | 50 | 40 | 45 | 40 | 45 | 45 | 40 | 45 |
| DMA |  |  |  |  |  |  |  |  |  |  |  |  |  |  |
| HEMA |  |  |  |  |  |  |  |  |  |  |  |  |  |  |
| HOB |  |  |  |  |  |  |  |  |  |  |  |  |  |  |
| BVE |  |  |  |  |  | 7 |  | 7 | 7 | 7 | 5 | 5 | 7 | 5 |
| DEGVE |  |  |  |  |  |  |  |  |  |  |  |  |  |  |
| EGVE |  |  |  |  |  |  |  |  |  |  |  |  |  |  |
| MMA | 15 | 15 | 15 | 15 | 15 | 12 | 14 | 10 | 10 | 12 | 12 | 12 | 12 | 12 |
| EGMA | 7 | 7 | 7 | 7 | 7 | 5 |  | 5 |  | 5 | 2 |  | 5 |  |
| TEGDVE |  | 0.10 | 0.10 | 0.10 | 0.10 | 0.30 | 0.20 | 0.10 | 0.10 | 0.10 | 0.20 | 0.20 | 0.20 | 0.20 |
| EGDMA |  | 0.50 | 0.50 | 0.50 | 0.50 |  |  |  |  |  |  |  |  |  |
| TEGDMA | 0.80 |  |  |  |  | 1.00 | 0.80 | 1.00 | 1.00 | 1.20 | 1.20 | 1.20 | 1.30 | 1.10 |
| AE | 0.5 | 0.8 | 1.4 | 1.4 | 1.4 |  |  |  |  |  |  |  |  |  |
| V64 | 0.30 | 0.30 | 0.50 | 0.50 | 0.50 | 0.50 | 0.50 | 0.50 | 0.50 | 0.50 | 0.50 | 0.50 | 0.50 | 0.50 |
| UV2 |  | 0.90 | 0.90 | 0.90 | 0.90 | 0.90 | 0.90 | 0.90 | 0.90 | 0.90 | 0.90 | 0.90 | 0.90 | 0.90 |
| UV1 | 0.90 |  |  |  |  |  |  |  |  |  |  |  |  |  |
| RBT1 |  | 0.01 | 0.01 | 0.01 | 0.01 |  |  |  |  |  |  |  |  |  |
| RBT2 |  |  |  |  |  | 0.01 | 0.01 | 0.01 | 0.01 | 0.01 | 0.01 | 0.01 | 0.01 | 0.01 |
| pTPP |  |  |  |  |  | 0.50 | 0.50 | 0.50 | 0.50 | 0.50 | 0.50 | 0.50 | 0.50 | 0.50 |
| TPP |  | 0.50 | 0.50 | 0.50 | 0.50 |  |  |  |  |  |  |  |  |  |

TABLE 2

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Si1 | 26 | 32 | 26 | 26 | 29 | 29 | 29 | 29 | 29 | 30 | 30 | 31 | 26 | 21 |
| Si2 | 10 |  | 10 | 10 | 8 | 8 | 8 | 8 | 8 | 7 | 7 | 5 | 10 | 15 |
| Si3 | 2 | 4 |  |  |  |  |  |  |  |  |  |  |  |  |
| VMA | 40 | 45 | 40 | 40 | 42 | 44 | 45 | 42 | 45 | 44 | 45 | 40 | 40 | 40 |
| DMA |  |  |  |  |  |  |  |  |  |  |  |  |  |  |
| HEMA |  |  |  |  |  |  |  | 4 |  |  |  |  |  |  |
| HOB |  |  |  |  |  |  |  |  |  | 7 |  |  |  |  |
| BVE | 7 | 3 | 7 | 3 |  |  |  |  |  | 4 | 5 | 9 | 9 | 9 |
| DEGVE |  |  |  |  | 7 |  |  | 7 |  | 10 |  |  |  |  |
| EGVE |  |  |  |  |  | 5 |  |  |  |  |  |  |  |  |
| MMA |  | 13 | 12 | 12 | 14 | 14 | 13 | 8 |  | 8 | 12 | 10 | 10 | 10 |
| EGMA | 15 | 3 | 5 | 5 |  |  |  | 6 | 10 | 6 | 5 | 5 | 5 | 5 |
| TEGDVE | 0.20 | 0.20 | 0.20 | 0.10 | 0.08 | 0.15 | 0.10 | 0.10 | 0.10 | 0.10 | 0.20 | 0.10 | 0.10 | 0.10 |
| EGDMA |  |  |  | 0.50 | 0.60 | 0.60 | 0.50 | 0.60 | 0.50 | 0.60 |  | 1.00 |  |  |
| TEGDMA | 1.60 | 1.00 | 1.20 |  |  |  |  |  |  |  | 1.40 |  | 1.00 | 1.00 |
| AE |  |  |  |  |  |  | 0.3 | 0.4 | 0.3 |  |  |  |  |  |
| V64 | 0.50 | 0.50 | 0.50 | 0.50 | 0.50 | 0.50 | 0.50 | 0.50 | 0.50 | 0.50 | 0.50 | 0.50 | 0.50 | 0.50 |
| UV2 | 0.90 | 1.30 | 1.30 | 1.30 | 1.30 | 1.30 | 1.70 | 1.70 | 1.70 | 1.80 | 1.80 | 0.90 | 0.90 | 0.90 |

TABLE 2-continued

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| UV1 |  |  |  |  |  |  |  |  |  |  |  |  |  |  |
| RBT1 |  |  |  |  |  |  |  |  |  |  |  | 0.01 |  | 0.01 |
| RBT2 | 0.01 | 0.01 | 0.01 | 0.01 | 0.01 | 0.01 | 0.01 | 0.01 | 0.01 | 0.01 | 0.01 |  | 0.01 |  |
| pTPP | 0.50 | 0.50 | 0.50 | 0.50 | 0.50 |  | 0.50 | 0.50 | 0.50 | 0.50 | 0.50 | 0.50 | 0.50 | 0.50 |
| TPP |  |  |  |  |  |  |  |  |  |  |  |  |  |  |

TABLE 3

| Lens Processing and Properties | Formulation Number | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Demolding Process Used | Dry | Dry | Dry | Dry | Dry | Dry | Dry | Dry | Dry | Dry | Dry | Dry | Dry | Dry |
| Delensing Process Used | Dry | Dry | Dry | Dry | Dry | Dry | Dry | Dry | Dry | Dry | Dry | Dry | Dry | Dry |
| Extraction Media Used | O* | O* | O* | O* | O* | A* | A* | A* | A* | A* | A* | A* | A* | A* |
| EWC (%) |  | 52 | 52 | 53-54 | 53 | 55 | 58 | 55 | 58 | 56 | 57 | 55 | 54 |  |
| Dynamic CA (°) |  |  | 50.10 | 50.00 | 48-52 |  |  |  |  |  |  |  |  |  |
| Static CA (°) |  |  | 30 | 38 | 37 |  |  |  |  |  |  |  |  |  |
| WBUT (sec.) |  |  |  |  |  | >20 | >20 | >20 | >20 | >20 | >20 | >20 |  |  |
| Modulus (MPa) |  | 0.63 | 0.58 | 0.43 | 0.40 | 0.70 | 0.77 | 0.61 | 0.66 | 0.57 | 0.69 | 0.85 | 0.66 | 0.81 |
| Ionoflux (×10$^{-3}$ mm$_2$/min) |  | 3.62 |  | 2.5-3.0 | 2.90 | 3.10 | 4.14 | 4.19 | 2.75 | 3.54 | 3.68 | 3.06 | 3.57 |  |
| Dk (barrers) |  |  |  | 70 | >60 | 72 |  |  |  |  |  |  |  |  |
| Elongation (%) |  |  |  | 450 | 425 | 345 | 349 | 275 | 216 | 310 | 314 | 284 | 274 | 351 |
| Tensile Strength (MPa) |  |  |  | 1.40 | 1.40 | 2.40 | 1.75 | 1.51 | 0.87 | 1.90 | 130 | 1.88 | 1.40 | 1.61 |
| Transmittance (%) |  |  |  | 98.00 | 98.00 |  |  |  |  |  |  |  |  |  |
| Wet Ext. (%) |  |  | 0.67 | 1.23 | 1.30 | 3.90 | 4.42 | 4.10 | 4.56 | 4.47 | 1.81 | 2.38 | 3.80 |  |
| Dry Ext. (%) |  |  |  | 17.00 |  | 11.00 |  |  |  | 14.39 |  |  |  |  |
| Energy Loss (%) |  |  |  | 36 | 35-36 | 40 | 41 |  |  | 34-36 | 34 | 36 |  |  |
| Swell Factor (%) |  |  |  | 21 | 21 |  |  |  |  |  |  |  |  |  |

A* = extracted in a volatile organic solvent-free extraction media
O* = extracted in volatile organic solvent-based media and volatile organic solvent-free media

TABLE 4

| Lens Processing and Properties | Formulation Number | | | | | | | | | | | | | |
|---|---|---|---|---|---|---|---|---|---|---|---|---|---|---|
|  | 15 | 16 | 17 | 18 | 19 | 20 | 21 | 22 | 23 | 24 | 25 | 26 | 27 | 28 |
| Demolding Process Used | Dry | Dry | Dry | Dry | Dry | Dry | Dry | Dry | Dry | Dry | Dry | Dry | Dry | Dry |
| Delensing Process Used | Dry | Dry | Dry | Dry | Dry | Dry | Dry | Dry | Dry | Dry | Dry | Dry | Dry | Dry |
| Extraction Media | A* | A* | A* | A* | A* | A* | A* | A* | A* | A* | A* | A* | A* | A* |
| EWC (%) | 53 | 57 | 56 | 55 | 55-56 | 56 | 55-56 | 57-58 | 55-56 | 61 | 55-57 |  | 56 |  |
| Dynamic CA (°) |  | 50-56 | 47-51 | 47-55 | 45-47 |  | 51-53 | 44-48 | 55-58 | 45-47 | 47-53 |  |  |  |
| Static CA (°) |  |  |  |  |  |  |  |  |  |  |  |  |  |  |
| WBUT (sec.) |  |  |  |  |  |  |  |  |  |  |  |  |  |  |
| Modulus (MPa) | 0.74 | 0.70 | 0.50 | 0.60 | 0.71 | 0.65 | 0.53 | 0.70 | 0.60 | 0.50 | 0.70 |  | 0.46 | 0.51 |
| Ionoflux (×10$^{-3}$ mm$_2$/min) | 3.33 |  |  |  |  |  |  | 2.90 | 4.10 | 3.80 | 3.60 |  | 3.60 | 6.42 |
| Dk (barrers) |  |  |  |  |  |  |  |  |  | 59-71 | 59-67 |  | 81 |  |
| Elongation (%) | 222 |  |  |  |  |  |  | 300 | 275 | 279 | 285 |  | 196 | 200 |
| Tensile Strength (MPa) |  |  |  |  |  |  |  | 1.50 | 1.20 | 1.20 | 1.30 |  | 0.60 | 0.67 |
| Transmittance (%) |  |  |  |  |  |  |  | A* |  |  |  |  |  |  |
| Wet Ext. (%) |  |  |  |  |  |  |  | 5.10 | 4.60 | 4.55 | 4.10 |  | 7.28 |  |
| Dry Ext. (%) |  |  |  |  |  |  |  | 12.20 | 10.60 | 13.65 | 9.80 |  | 17.87 |  |
| Energy Loss (%) |  | 40 |  |  |  |  | 34 | 32-33 | 31-32 | 30-33 | 4.1-35. | 36-38 | 34-38 | 32-34 |
| Swell Factor (%) |  |  |  |  |  |  |  |  |  | 27 |  |  |  |  |

A* = extracted in a volatile organic solvent-free extraction media
O* = extracted in volatile organic solvent-based media and volatile organic solvent-free media

Examples 29-37

Table 5 lists the ingredients of polymerizable compositions 29-37. Polymerizable compositions 29-37 were prepared as described in the Hydrogel Contact Lens Fabrication and Testing Procedure given above, and were used to prepare and test hydrogel contact lenses as described in the Hydrogel Contact Lens Fabrication and Testing Procedure. All of these lenses were demolded using a dry demolding process, delensed using a dry delensing process, and extracted using liquid free of a volatile organic solvent. With the exception of polymerizable compositions 29, 32 and 35, all of the polymerizable compositions include a phosphine-containing component (either TPP or pTPP).

Table 6 shows the lens properties for lenses formed using polymerizable compositions 29-37 when initially manufactured. Hydrogel contact lenses formed from polymerizable compositions 30, 31, 33, 34, 36 and 37 (the lenses formed from a polymerizable composition with a phosphine-containing component) had acceptable lens properties when initially manufactured. As can be seen from Table 6, the lens properties of the lenses formed from formulations containing the phosphine-containing component were similar to the lens properties of the lenses formed from the same formulations except without the phosphine-containing components when prepared using the same manufacturing process. The lenses of formulations 30, 31, 33, 34, 36 and 37 also had acceptable shape retention and color value both when initially manufactured and for at least 1 month when stored at room temperature. The lenses formed from formulations without the phosphine-containing component, however, did not have acceptable shape retention or AEL when initially manufactured.

Formulations 30 and 31 were also used to prepare lenses using a preparation process as described in the Hydrogel Contact Lens Fabrication and Testing Procedure, demolded using a dry demolding process, delensed using a dry delensing process, and extracted using liquid free of a volatile organic solvent, except that the lenses were cured under an air atmosphere. The air-cured lenses had similar lens properties as air-cured lenses prepared from the same formulation except without the phosphine-containing component (formulation 29). However, the lenses of formulations 30 and 31 had acceptable shape retention (including acceptable AEL) and color value when air-cured, while the lenses of formulation 29 did not have acceptable shape retention or acceptable AEL when air-cured.

TABLE 5

| Ingredient | Formulation Number | | | | | | | | |
|---|---|---|---|---|---|---|---|---|---|
| (unit parts) | 29 | 30 | 31 | 32 | 33 | 34 | 35 | 36 | 37 |
| Si4 | 35 | 35 | 35 | 25 | 25 | 25 | 20 | 20 | 20 |
| Si5 | 25 | 25 | 25 | | | | | | |
| Si6 | | | | 25 | 25 | 25 | 25 | 25 | 25 |
| VMA | | | | 40 | 40 | 40 | 30 | 30 | 30 |
| DMA | 40 | 40 | 40 | 10 | 10 | 10 | 20 | 20 | 20 |
| TEGDVE | | | | 0.1 | 0.1 | 0.1 | | | |
| TEGDMA | 0.8 | 0.8 | 0.8 | 0.6 | 0.6 | 0.6 | | | |
| AE | | | | | | | | | |
| V64 | 0.3 | 0.3 | 0.3 | 0.3 | 0.3 | 0.3 | 0.3 | 0.3 | 0.3 |
| Glycerol | | | | 3 | 3 | 3 | | | |
| pTPP | | 0.5 | | | 0.5 | | | 0.5 | |
| TPP | | | 0.5 | | | 0.5 | | | 0.5 |

TABLE 6

| | Formulation Number | | | | | | | | |
|---|---|---|---|---|---|---|---|---|---|
| Lens Properties | 29 | 30 | 31 | 32 | 33 | 34 | 35 | 36 | 37 |
| $N_2$ Cured Lenses | | | | | | | | | |
| Modulus (MPa) | 0.27 | 0.25 | 0.23 | 0.32 | 0.36 | 0.36 | 0.42 | 0.41 | 0.40 |
| Tensile Strength (MPa) | 0.67 | 0.78 | 0.74 | 0.51 | 0.70 | 0.63 | | | |
| Elongation (%) | 379 | 466 | 476 | 192 | 217 | 208 | | | |
| Air Cured Lenses | | | | | | | | | |
| Modulus (MPa) | 0.21 | 0.25 | 0.23 | | | | | | |
| Tensile Strength (MPa) | 0.44 | 0.85 | 1.1 | | | | | | |
| Elongation (%) | 327 | 489 | 519 | | | | | | |

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A method of manufacturing a hydrogel contact lens, comprising:
   providing a polymerizable composition comprising
   (a) at least one hydrophilic monomer, and
   (b) at least one phosphine-containing compound, wherein the at least one phosphine-containing compound is present in an unoxidized form at the time it is combined with the at least one hydrophilic monomer in the polymerizable composition, and
   (c) at least one thermal initiator, wherein (b) and (c) are different from each other; and
   (d) thermally curing the polymerizable composition to form a polymeric lens body.

2. The method of claim 1, wherein the phosphine-containing compound has a structure represented by formula (1):

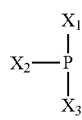

where X1, X2, and X3 are the same or different and are an alkyl group or an aryl group.

3. The method of claim 1, wherein the phosphine-containing compound is a polymerizable phosphine-containing compound.

4. The method of any claim 1, wherein the phosphine-containing compound comprises triphenylphosphine, or diphenyl(4-vinylphenyl)phosphine, or both.

5. The method of claim 1, wherein the phosphine compound is present in the polymerizable composition in an amount from 0.01 to 5 unit parts.

6. The method of claim 1, wherein the polymerizable composition contains an amount of the phosphine-containing compound effective to scavenge at least a portion of oxygen present in the polymerizable composition during the manufacturing.

7. The method of claim 1, wherein the polymerizable composition contains an amount of the phosphine-containing compound effective to produce a polymeric lens body having a reduced amount of axial edge lift (AEL) as compared to a second hydrogel contact lens body formed from a second polymerizable composition substantially identical to the polymerizable composition except without the phosphine-containing compound and using a manufacturing process substantially identical to the manufacturing process of the hydrogel contact lens.

8. The method of claim 1, wherein the polymerizable composition contains an amount of the phosphine-containing compound effective to reduce distortion of the hydrogel contact lens as compared to a second hydrogel contact lens body formed from a second polymerizable composition substantially identical to the polymerizable composition except without the phosphine-containing compound and using a manufacturing process substantially identical to the manufacturing process of the hydrogel contact lens.

9. The method of claim 1, wherein the thermally curing of the polymerizable composition is conducted in an atmosphere comprising air.

10. The method of claim 1, wherein the thermally curing of the polymerizable composition is conducted in an atmosphere comprising an inert gas at a concentration greater than is found in air.

11. The method of claim 1, wherein the polymerizable composition contains an amount of the phosphine-containing compound effective to reduce discoloration of the contact lens for at least 1 year when stored at room temperature, as compared to a second contact lens formed from a second polymerizable composition substantially identical to the first polymerizable composition except without the phosphine-containing compound and using a manufacturing process substantially identical to the manufacturing process of the hydrogel contact lens.

12. The method of claim 1, wherein the polymerizable composition further comprises at least one siloxane monomer.

13. The method of claim 1, wherein the reacting comprises cast molding the polymerizable composition in a contact lens mold assembly to form a polymeric lens body.

14. The method of claim 1, further comprising contacting the polymeric lens body with a washing liquid to remove extractable material from the polymeric lens body.

15. The method of claim 14, wherein the contacting removes a portion of the at least one phosphine compound from the polymeric lens body.

16. The method of claim 1, further comprising oxidizing at least a portion of the phosphine-containing compound present in the polymeric lens body, or in the hydrogel contact lens.

17. A hydrogel contact lens, comprising:
   a polymeric lens body that is the reaction product of a polymerizable composition, the polymerizable composition comprising
   (a) at least one hydrophilic monomer, and
   (b) at least one phosphine-containing compound, wherein the at least one phosphine-containing compound is present in an unoxidized form at the time it is combined with the at least one hydrophilic monomer in the polymerizable composition, and
   (c) at least one thermal initiator that is thermally activated, wherein (b) and (c) are different from each other.

18. A batch of hydrogel contact lenses comprising a plurality of hydrogel contact lenses of claim 17.

19. The batch of hydrogel contact lenses of claim 18, wherein the batch of hydrogel contact lenses has an average axial edge lift (AEL) variance of less than plus or minus 50% over a time period from two weeks to seven years when stored at room temperature, or, when stored under accelerated shelf life conditions for a time period and temperature equivalent to storage from two weeks to seven years at room temperature, as determined based on at least 20 individual lenses of the batch, the AEP variance percentage determined for each of the individual lenses by the following equation (A):

$$((AEL_{Final} - AEL_{Initial})/AEL_{Initial}) \times 100 \qquad (A).$$

20. A hydrogel contact lens package, comprising:
a polymeric lens body that is the reaction product of a polymerizable composition, the polymerizable composition comprising
   (a) at least one hydrophilic monomer, and
   (b) at least one phosphine-containing compound wherein the at least one phosphine-containing compound is present in an unoxidized form at the time it is combined with the at least one hydrophilic monomer in the polymerizable composition, and
   (c) at least one thermal initiator that is thermally activated, wherein (b) and (c) are different from each other;
a packaging solution comprising a lens hydrating agent; and
a contact lens package base member having a cavity configured to hold the contact lens body and the packaging solution, and a seal attached to the base member configured to maintain the contact lens and the packaging solution in a sterile condition for a duration of time equivalent to a room temperature shelf life of the contact lens.

21. A hydrogel contact lens, comprising:
a polymeric lens body that is the reaction product of a polymerizable composition, the polymerizable composition comprising
   (a) at least one hydrophilic monomer, and
   (b) at least one phosphine-containing compound, wherein the at least one phosphine-containing compound is present in an unoxidized form at the time it is combined with the at least one hydrophilic monomer in the polymerizable composition and said at least one phosphine-containing compound is not an initiator, and
   (c) at least one thermal initiator.

22. A batch of hydrogel contact lenses comprising a plurality of hydrogel contact lenses of claim 21.

23. The batch of hydrogel contact lenses of claim 22, wherein the batch of hydrogel contact lenses has an average axial edge lift (AEL) variance of less than plus or minus 50% over a time period from two weeks to seven years when stored at room temperature, or, when stored under accelerated shelf life conditions for a time period and temperature equivalent to storage from two weeks to seven years at room temperature, as determined based on at least 20 individual lenses of the batch, the AEP variance percentage determined for each of the individual lenses by the following equation (A):

$$((AEL_{Final} - AEL_{Initial})/AEL_{Initial}) \times 100 \qquad (A).$$

24. A hydrogel contact lens package, comprising:
a polymeric lens body that is the reaction product of a polymerizable composition, the polymerizable composition comprising
   (a) at least one hydrophilic monomer, and
   (b) at least one phosphine-containing compound wherein the at least one phosphine-containing compound is present in an unoxidized form at the time it is combined with the at least one hydrophilic monomer in the polymerizable composition and said at least one phosphine-containing compound is not an initiator, and
   (c) at least one thermal initiator, wherein (b) and (c) are different from each other;
a packaging solution comprising a lens hydrating agent; and
a contact lens package base member having a cavity configured to hold the polymeric lens body and the packaging solution, and a seal attached to the base member configured to maintain the contact lens and the packaging solution in a sterile condition for a duration of time equivalent to a room temperature shelf life of the contact lens.

25. The method of claim 1, wherein said at least one phosphine-containing compound is not an initiator.

26. The method of claim 1, wherein the thermal initiator is 2,T-azobis-2-methyl propanenitrile, 2,2'-azobis(2,4-dimethylpentanenitrile), 1,1'-azo bis(cyanocyclohexane), or a combination thereof.

27. The hydrogel contact lens of claim 17, wherein the thermal initiator is 2,2'-azobis-2-methyl propanenitrile, 2,2'-azobis(2,4-dimethylpentanenitrile), 1,1'-azo bis(cyanocyclohexane), or a combination thereof.

28. The hydrogel contact lens package of claim 20, wherein the thermal initiator is 2,2'-azobis-2-methyl propanenitrile, 2,2'-azobis(2,4-dimethylpentanenitrile), 1,1'-azo bis(cyanocyclohexane), or a combination thereof.

29. The hydrogel contact lens of claim 21, wherein the thermal initiator is 2,2'-azobis-2-methyl propanenitrile, 2,2'-azobis(2,4-dimethylpentanenitrile), 1,1'-azo bis(cyanocyclohexane), or a combination thereof.

30. The hydrogel contact lens package of claim 24, wherein the thermal initiator is 2,2'-azobis-2-methyl propanenitrile, 2,2'-azobis(2,4-dimethylpentanenitrile), 1,1'-azobis(cyanocyclohexane), or a combination thereof.

* * * * *

UNITED STATES PATENT AND TRADEMARK OFFICE
CERTIFICATE OF CORRECTION

PATENT NO. : 9,864,103 B2
APPLICATION NO. : 14/158879
DATED : January 9, 2018
INVENTOR(S) : Wang et al.

Page 1 of 1

It is certified that error appears in the above-identified patent and that said Letters Patent is hereby corrected as shown below:

In the Claims

Claim 26, Column 66, Line 27, "2,T-azobis-2-methyl propanenitrile," should read
-- 2,2'-azobis-2-methyl propanenitrile, --

Signed and Sealed this
Twentieth Day of February, 2018

Andrei Iancu
*Director of the United States Patent and Trademark Office*